United States Patent [19]

Sakuma et al.

[11] Patent Number: 5,426,298
[45] Date of Patent: Jun. 20, 1995

[54] OPTICAL SCANNER

[75] Inventors: Nobuo Sakuma, Inagi; Hiromichi Atsuumi, Yokohama; Osamu Endou, Kawasaki; Akihisa Itabashi, Mitaka, all of Japan

[73] Assignee: Ricoh Company, Ltd., Tokyo, Japan

[21] Appl. No.: 181,588

[22] Filed: Jan. 14, 1994

Related U.S. Application Data

[63] Continuation-in-part of Ser. No. 31,299, Mar. 12, 1993, abandoned.

[30] Foreign Application Priority Data

| Mar. 17, 1992 | [JP] | Japan | 4-060080 |
| Mar. 18, 1992 | [JP] | Japan | 4-062522 |
| Sep. 17, 1992 | [JP] | Japan | 4-248129 |
| Jan. 22, 1993 | [JP] | Japan | 5-009068 |
| Mar. 2, 1993 | [JP] | Japan | 5-041232 |

[51] Int. Cl.$^6$ ............................................. G02B 26/10
[52] U.S. Cl. ............................ 250/235; 359/205; 359/212
[58] Field of Search ................ 250/235, 236, 234; 359/212, 213, 214, 216, 217, 218, 219, 205, 207, 208

[56] References Cited

U.S. PATENT DOCUMENTS

| 4,196,961 | 4/1980 | Walter et al. | 359/208 X |
| 4,852,957 | 8/1989 | Wakimoto et al. | 359/208 |
| 4,984,858 | 1/1991 | Kuroda | 359/208 |
| 5,004,311 | 4/1991 | Peppers | 359/208 |
| 5,093,745 | 3/1992 | Kuroda | 250/235 X |
| 5,157,534 | 10/1992 | Endou et al. | 359/212 |
| 5,168,386 | 12/1992 | Galbraith | 359/208 X |
| 5,170,278 | 12/1992 | Wada et al. | 359/212 |
| 5,173,798 | 12/1992 | Naiki | 250/235 X |
| 5,233,457 | 8/1993 | Hamada et al. | 250/235 X |

FOREIGN PATENT DOCUMENTS 1-220221  9/1989  Japan.

Primary Examiner—David C. Nelms
Assistant Examiner—John R. Lee
Attorney, Agent, or Firm—Oblon, Spivak, McClelland, Maier & Neustadt

[57] ABSTRACT

In an optical scanner, an optical deflector has a deflecting reflecting face rotated at an equal speed. A light beam from a light source is deflected on a plane by the deflector at an equal angular velocity and is incident to a reflective image-forming element through a half mirror inclined with respect to a beam deflecting face. The light beam reflected on the reflective image-forming element is reflected on the half mirror and is converged by an image-forming action of the reflective image-forming element as a light spot on a scanned face to perform an optical scanning operation. The reflective image-forming element has a function for substantially performing the optical scanning operation using the light spot at an equal speed. The reflective image-forming element is arranged such that the reflective image-forming element is shifted by a predetermined shifting amount in a direction perpendicular to the beam deflecting face to correct the curve of a scanning line on the scanned face. Other optical scanners are also shown.

53 Claims, 58 Drawing Sheets

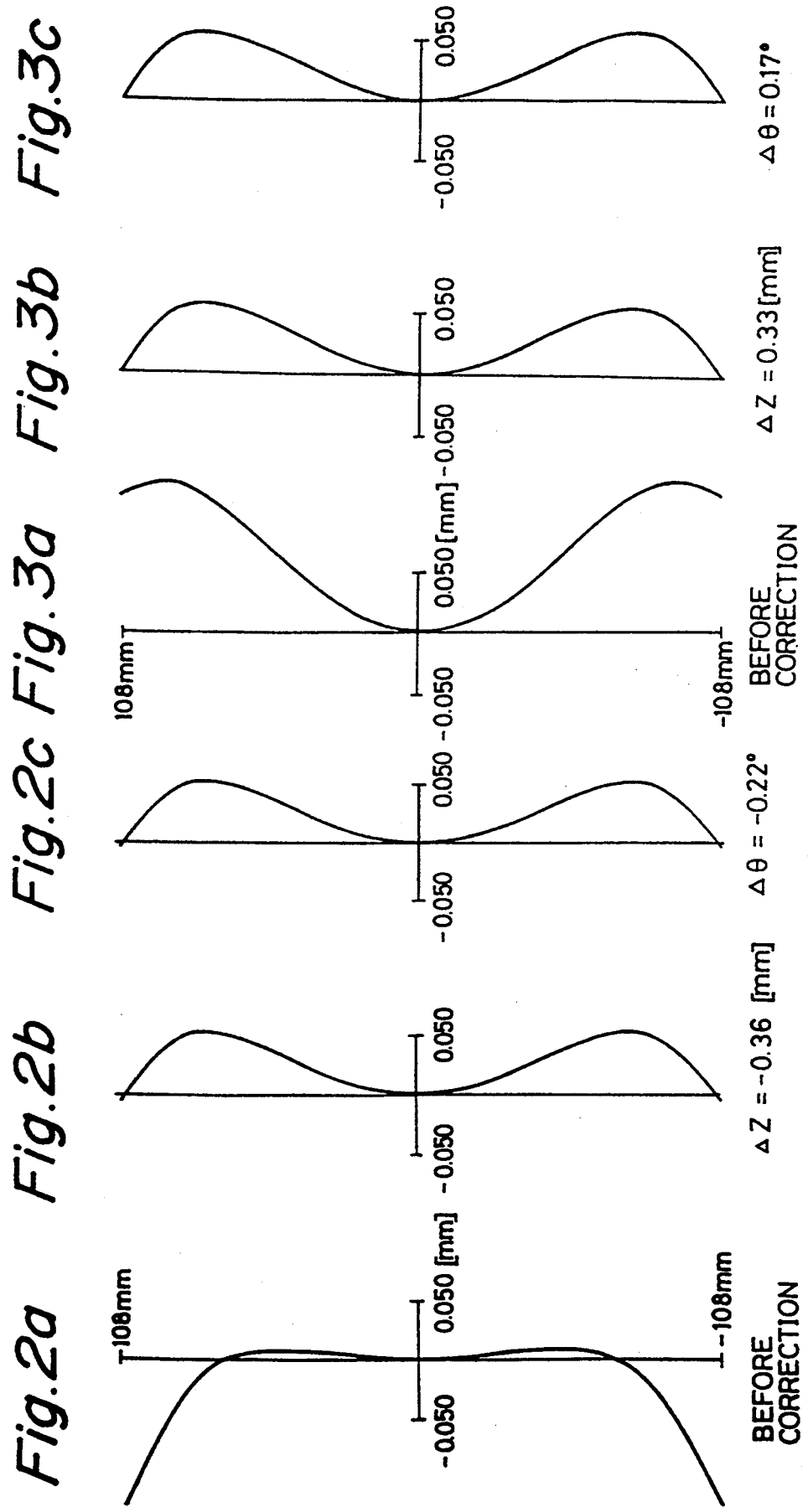

BEFORE CORRECTION $\Delta Z = 0.25$ [mm]

$\Delta \theta = 0.15°$

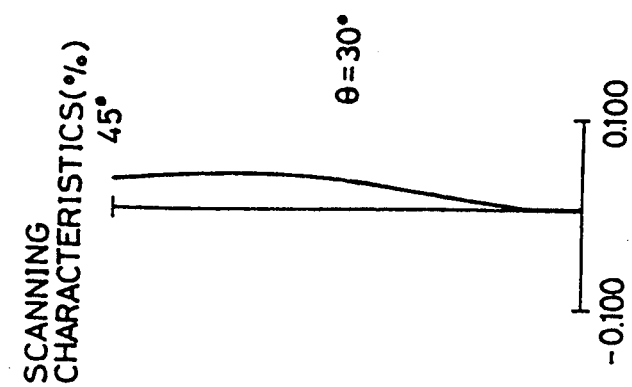
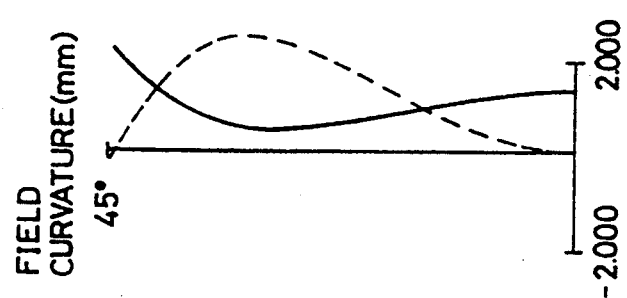
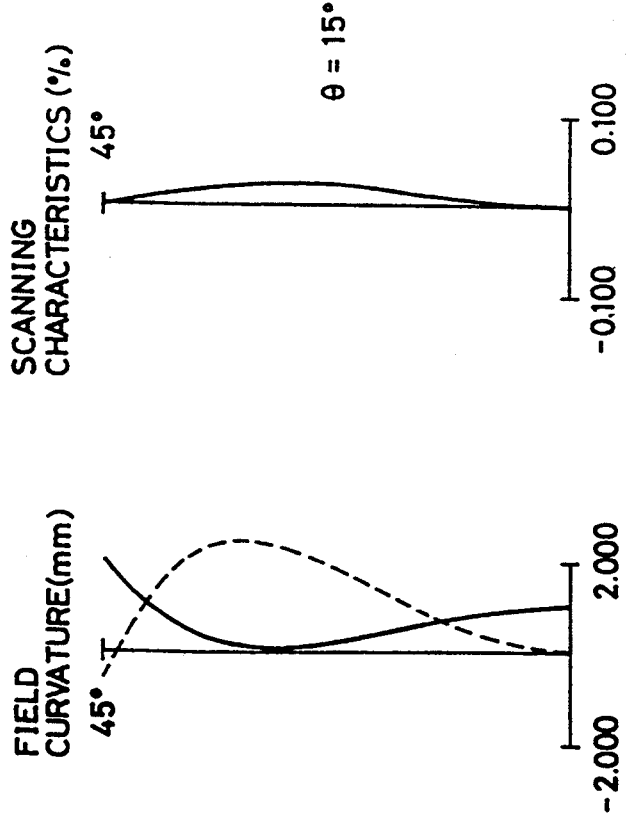

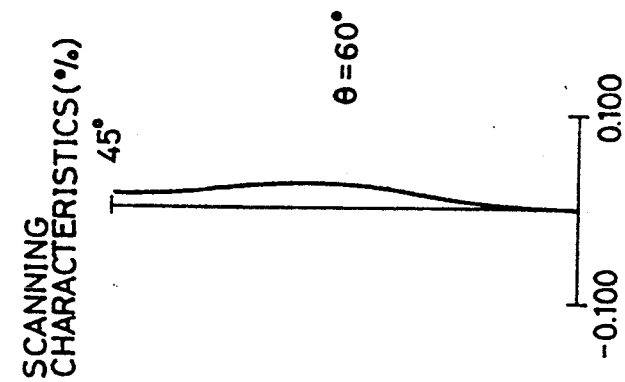
Fig.12a Fig.12b
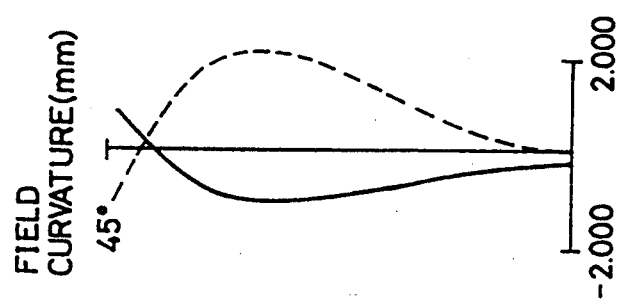
Fig.13a Fig.13b
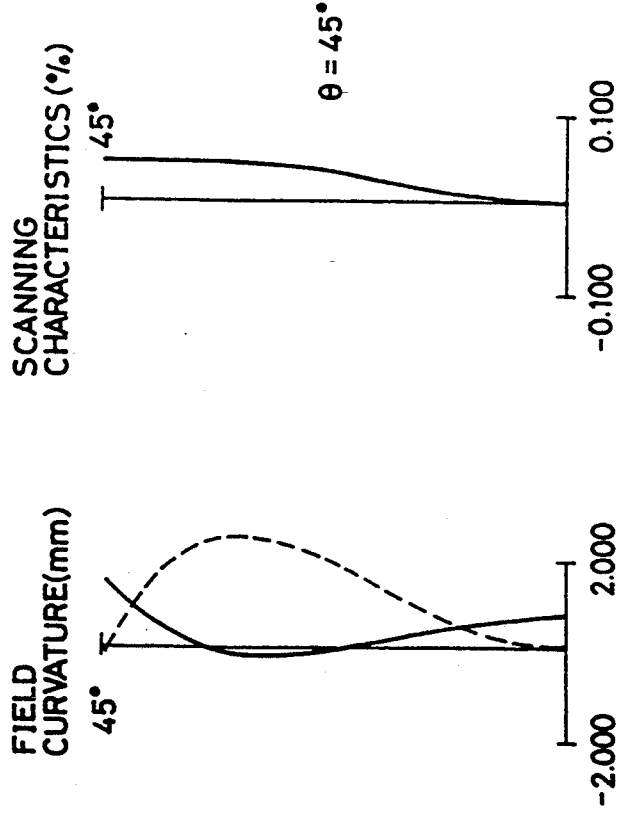

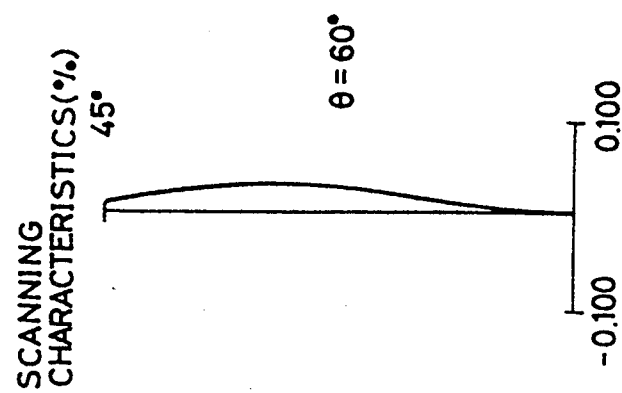
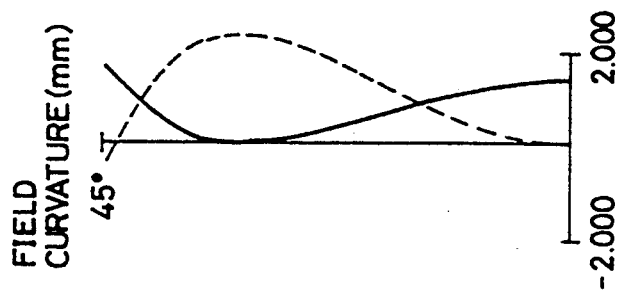
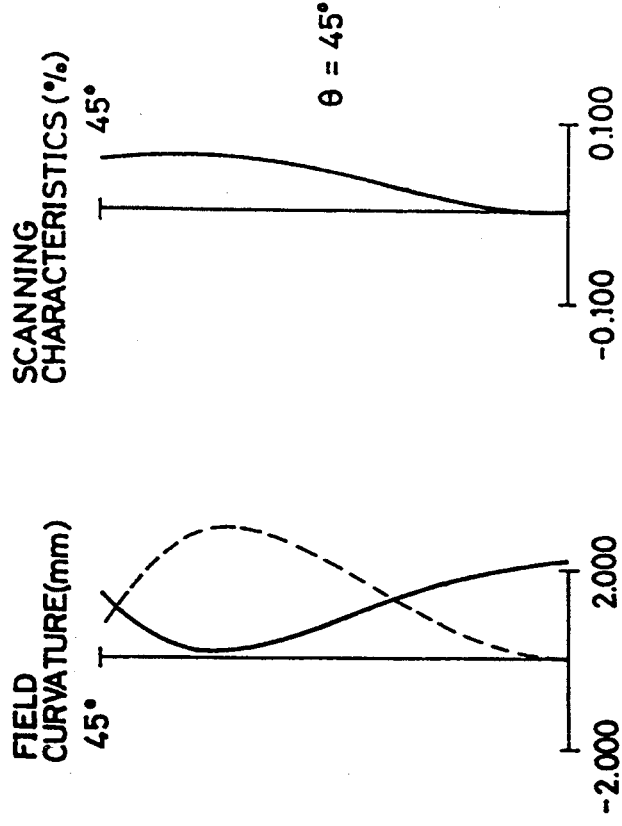

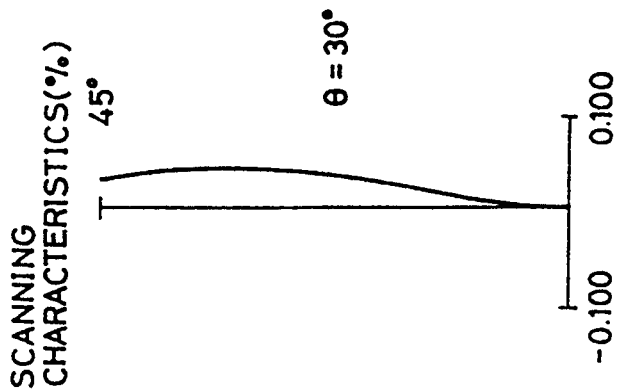
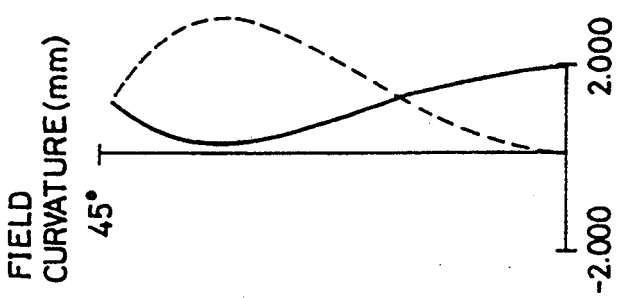
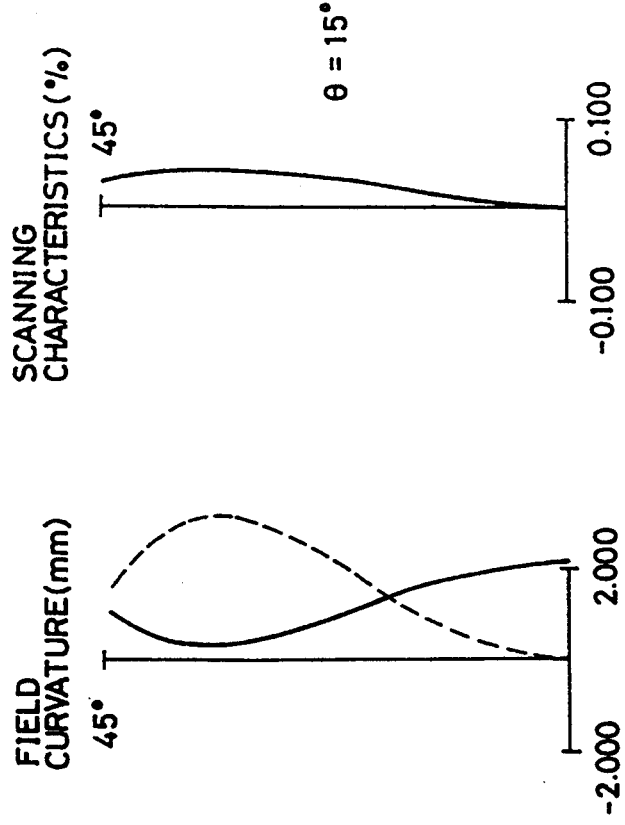

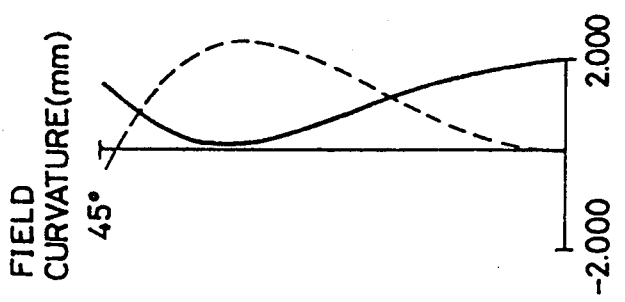
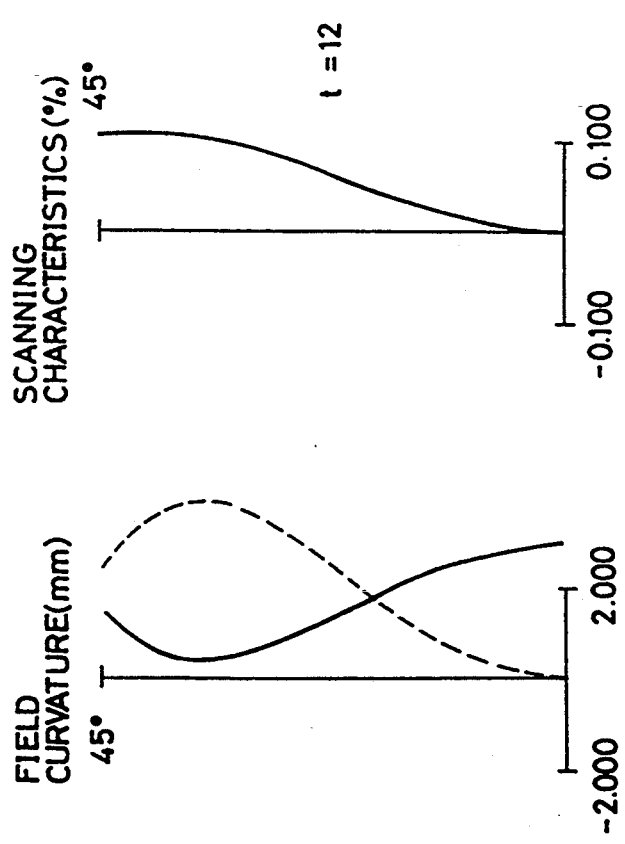

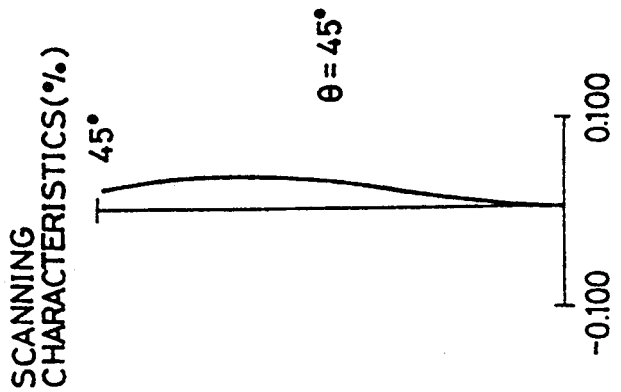
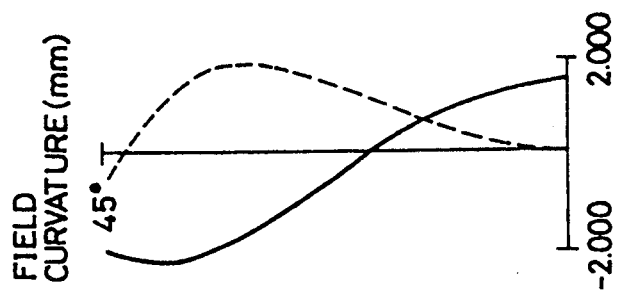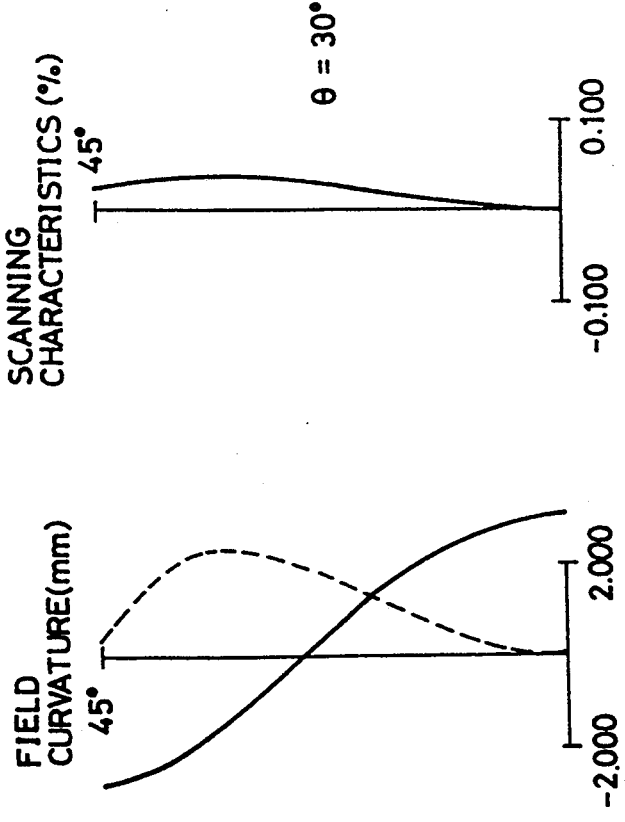

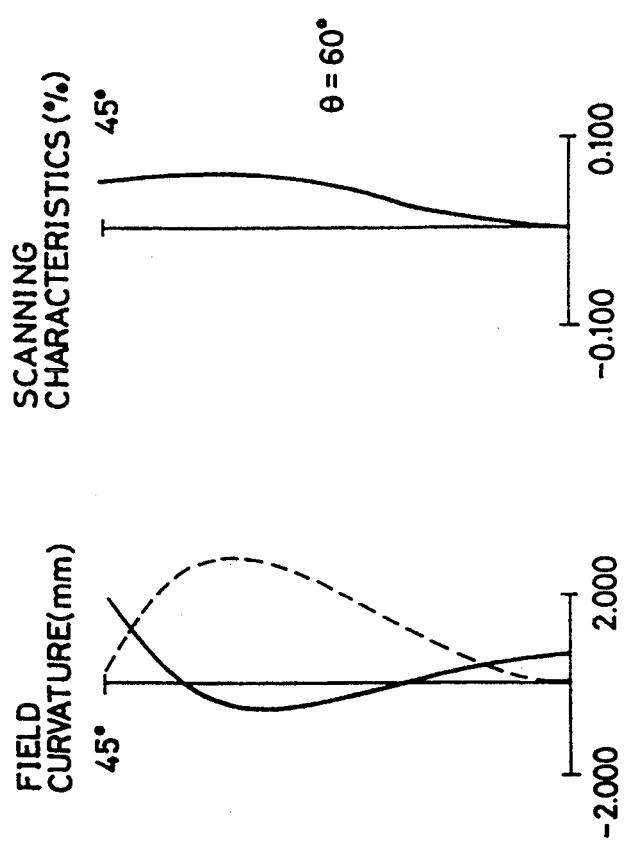

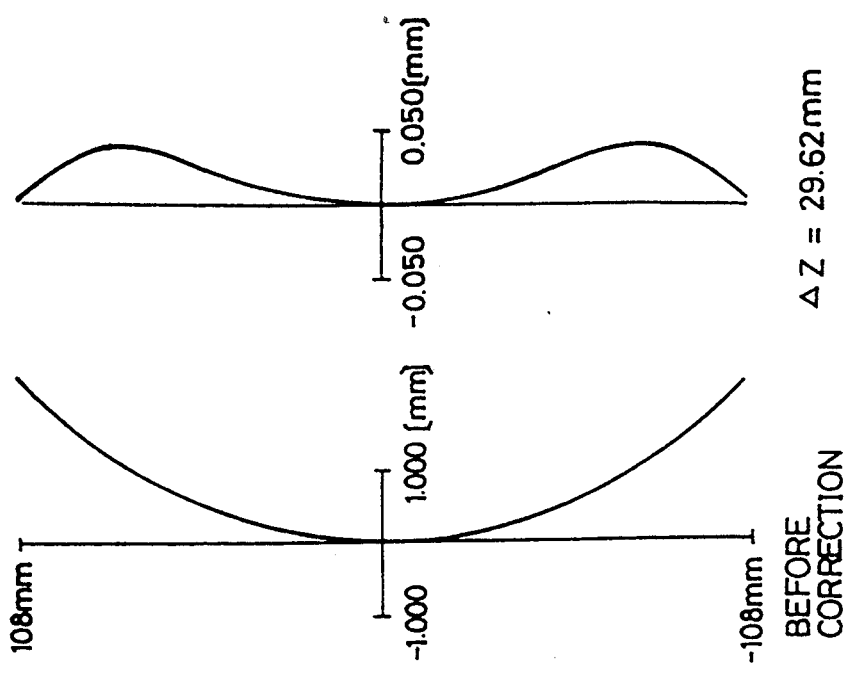
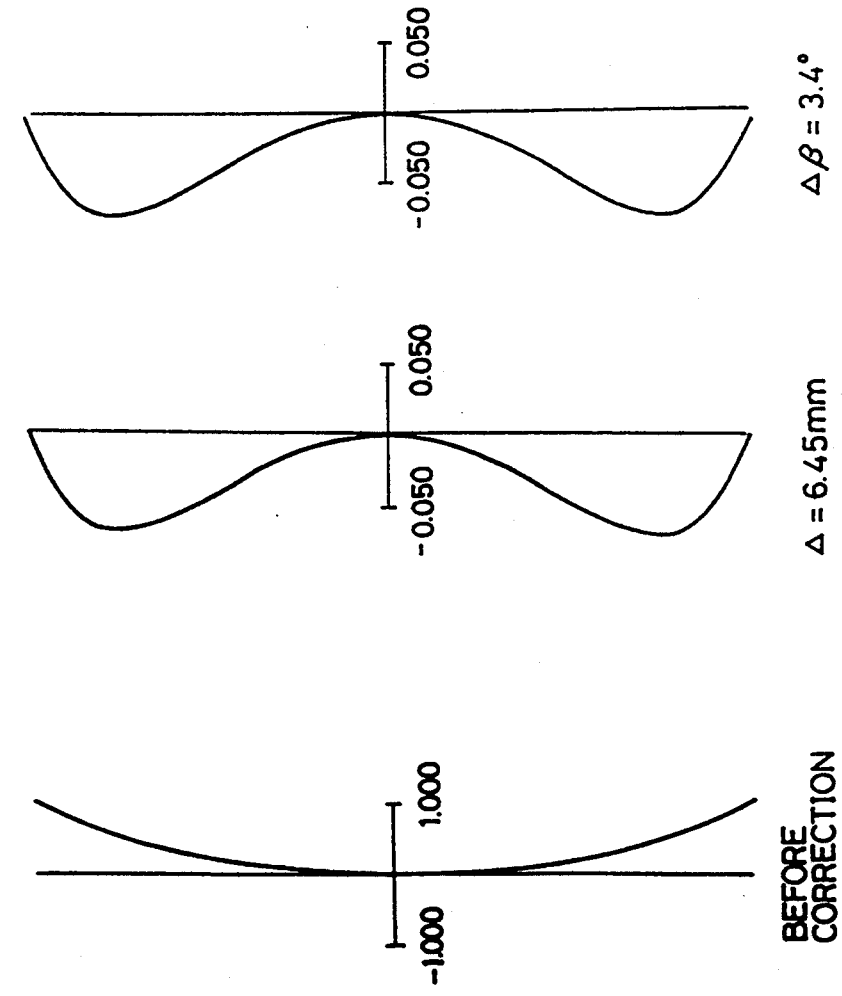

FIELD CURVATURE(mm)

-2.000    2.000

SCANNING CHARACTERISTICS(%)

-0.100    0.100

FIELD CURVATURE(mm)

-2.000    2.000

SCANNING CHARACTERISTICS(%)

-0.100    0.100

FIELD CURVATURE(mm)

SCANNING CHARACTERISTICS(%)

FIELD CURVATURE(mm)

SCANNING CHARACTERISTICS(%)

FIELD CURVATURE(mm)

SCANNING CHARACTERISTICS(%)

FIELD CURVATURE(mm)

SCANNING CHARACTERISTICS(%)

FIELD CURVATURE(mm)

SCANNING CHARACTERISTICS(‰)

FIELD CURVATURE(mm)

SCANNING CHARACTERISTICS(‰)

FIELD CURVATURE(mm)

SCANNING CHARACTERISTICS(%)

FIELD CURVATURE(mm)

SCANNING CHARACTERISTICS(%)

FIELD CURVATURE (mm)

-2.000   2.000

SCANNING CHARACTERISTICS (%)

-0.100   0.100

FIELD CURVATURE (mm)

-2.000   2.000

SCANNING CHARACTERISTICS (%)

-0.100   0.100

FIELD CURVATURE (mm)

-2.000   2.000

SCANNING CHARACTERISTICS(%)

-0.100   0.100

FIELD CURVATURE (mm)

-2.000   2.000

SCANNING CHARACTERISTICS(%)

-0.100   0.100

FIELD CURVATURE(mm)

-2.000　-2.000

SCANNING CHARACTERISTICS(%)

-0.100　0.100

FIELD CURVATURE(mm)

-2.000　2.000

SCANNING CHARACTERISTICS(%)

-0.100　0.100

FIELD CURVATURE(mm)

-2.000   2.000

SCANNING CHARACTERISTICS(%)

-0.100   0.100

FIELD CURVATURE(mm)

-2.000   2.000

SCANNING CHARACTERISTICS(%)

-0.100   0.100

FIELD CURVATURE(mm)

-2.000  2.000

SCANNING CHARACTERISTICS(%)

-0.100  0.100

FIELD CURVATURE(mm)

-2.000  2.000

SCANNING CHARACTERISTICS(%)

-0.100  0.100

FIELD CURVATURE (mm)

-2.000   2.000

SCANNING CHARACTERISTICS(%)

-0.100   0.100

FIELD CURVATURE (mm)

-2.000   2.000

SCANNING CHARACTERISTICS(%)

-0.100   0.100

FIELD CURVATURE (mm)

-2.000    2.00

SCANNING CHARACTERISTICS (%)

-0.100    0.100

FIELD CURVATURE (mm)

-2.000    2.000

SCANNING CHARACTERISTCS (%)

-0.100    0.100

FIELD CURVATURE (mm)

-2.000  2.000

SCANNING CHARACTERISTICS (%)

-0.100  0.100

FIELD CURVATURE (mm)

-2.000  2.000

SCANNING CHARACTERISTICS (%)

-0.100  0.100

FIELD CURVATURE (mm)

-2.000    2.000

SCANNING CHARACTERISTICS(%)

-0.100    0.100

FIELD CURVATURE (mm)

-2.000    2.000

SCANNIG CHARACTERISTICS(%)

-0.100    0.100

FIELD CURVATURE

-2.000    2.000

SCANNING CHARACTERISTICS(%)

-0.100    0.100

FIELD CURVATURE(mm)

-2.000    2.000

SCANNING CHARACTERISTICS(%)

-0.100    0.100

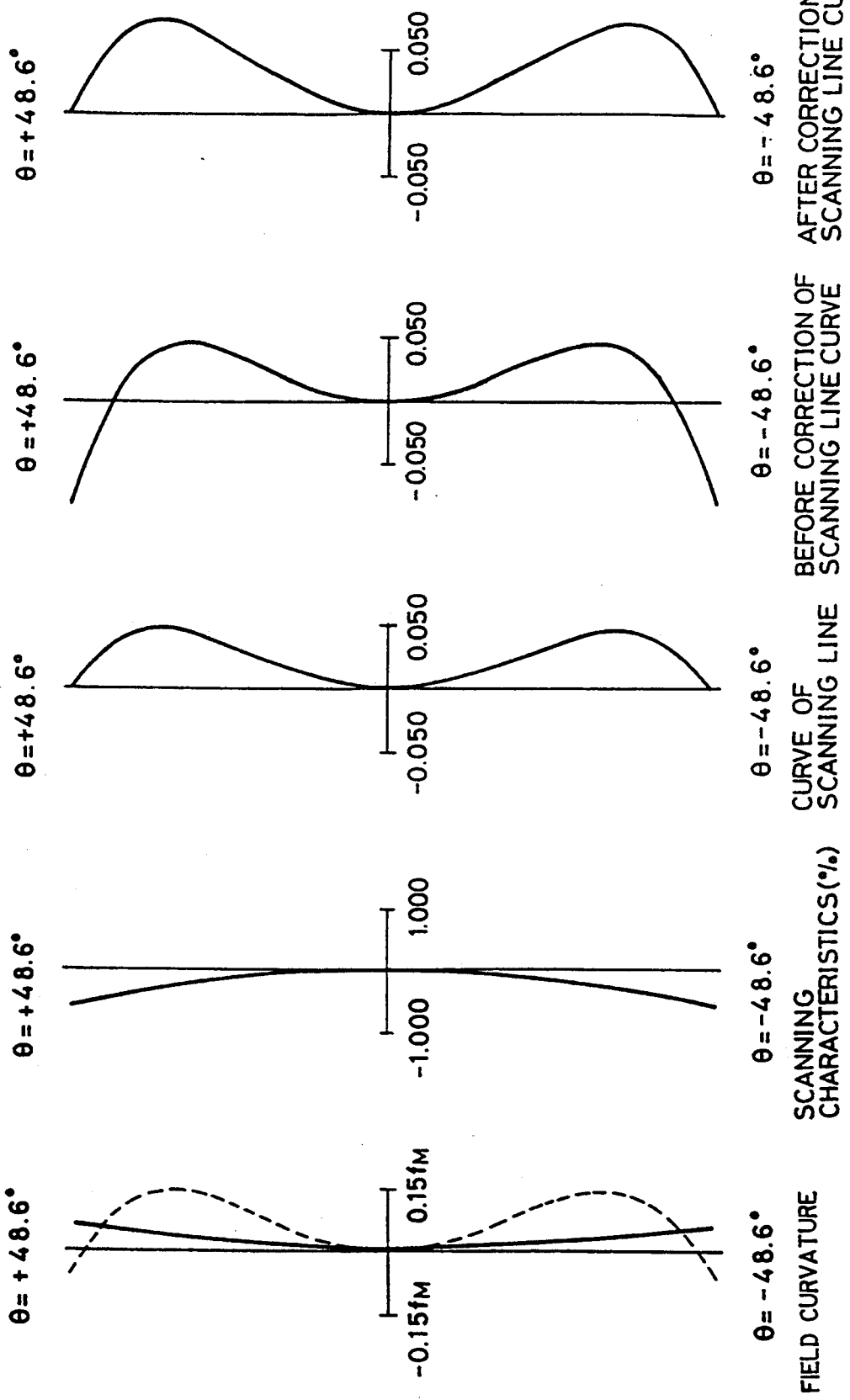

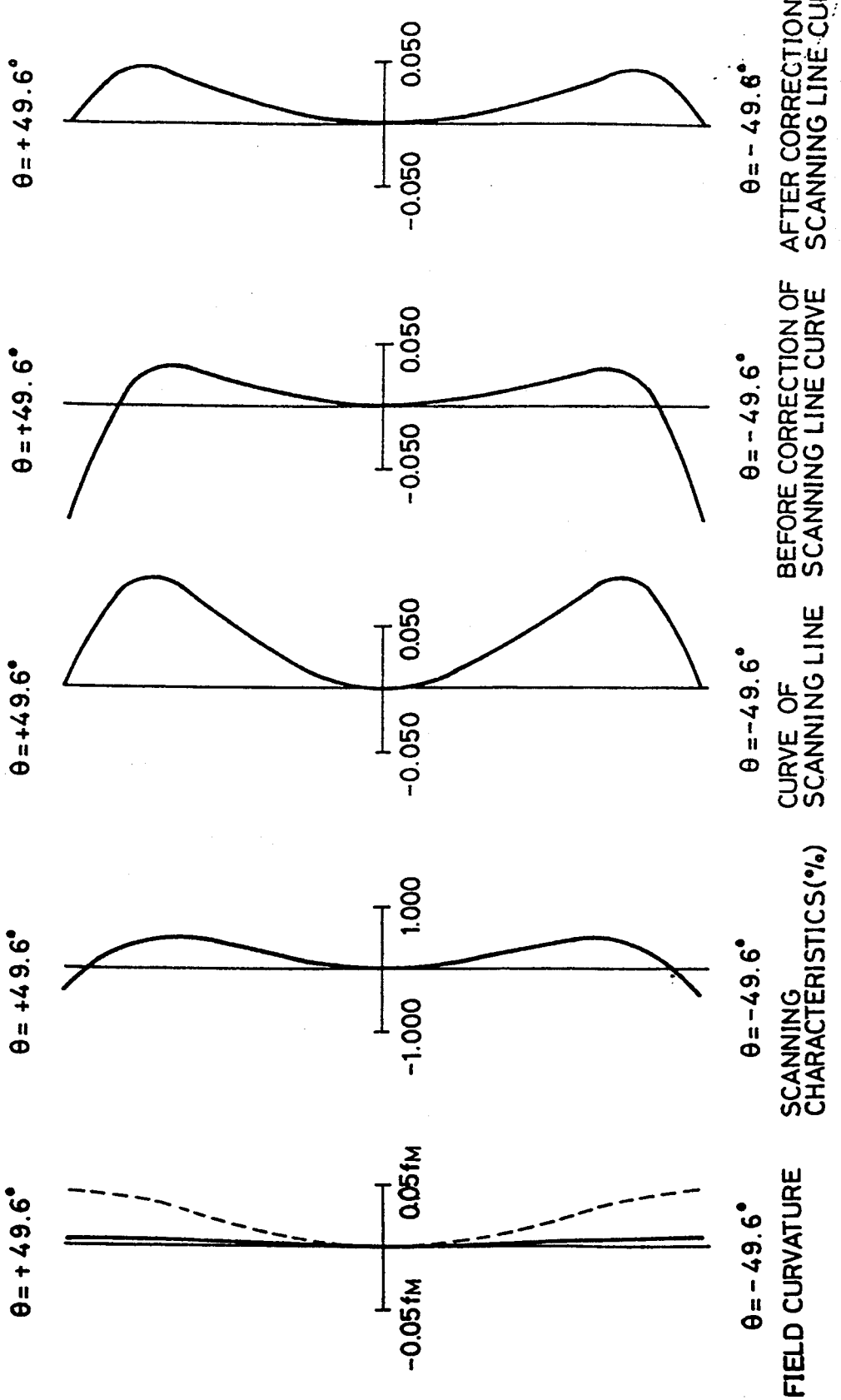

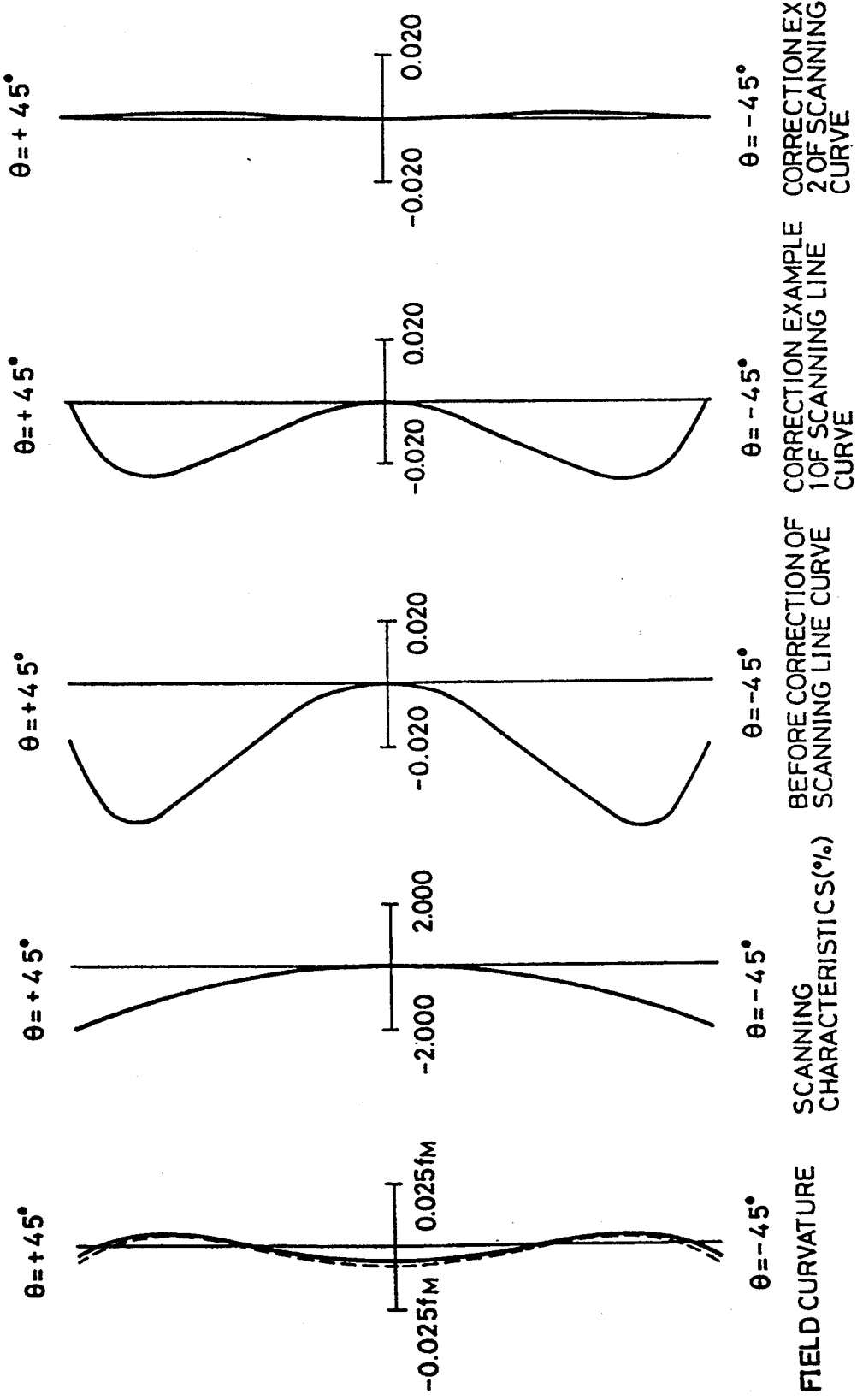

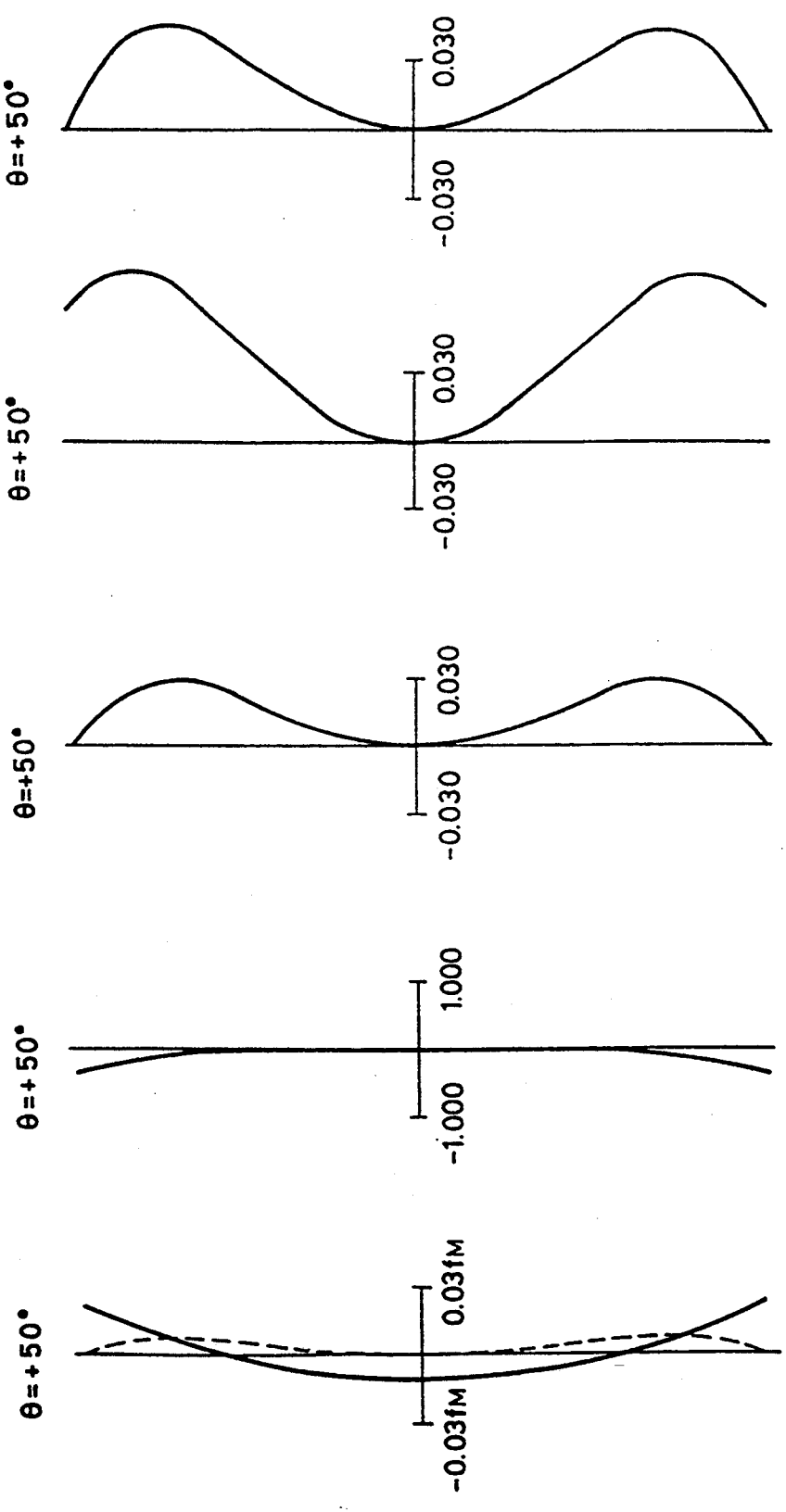

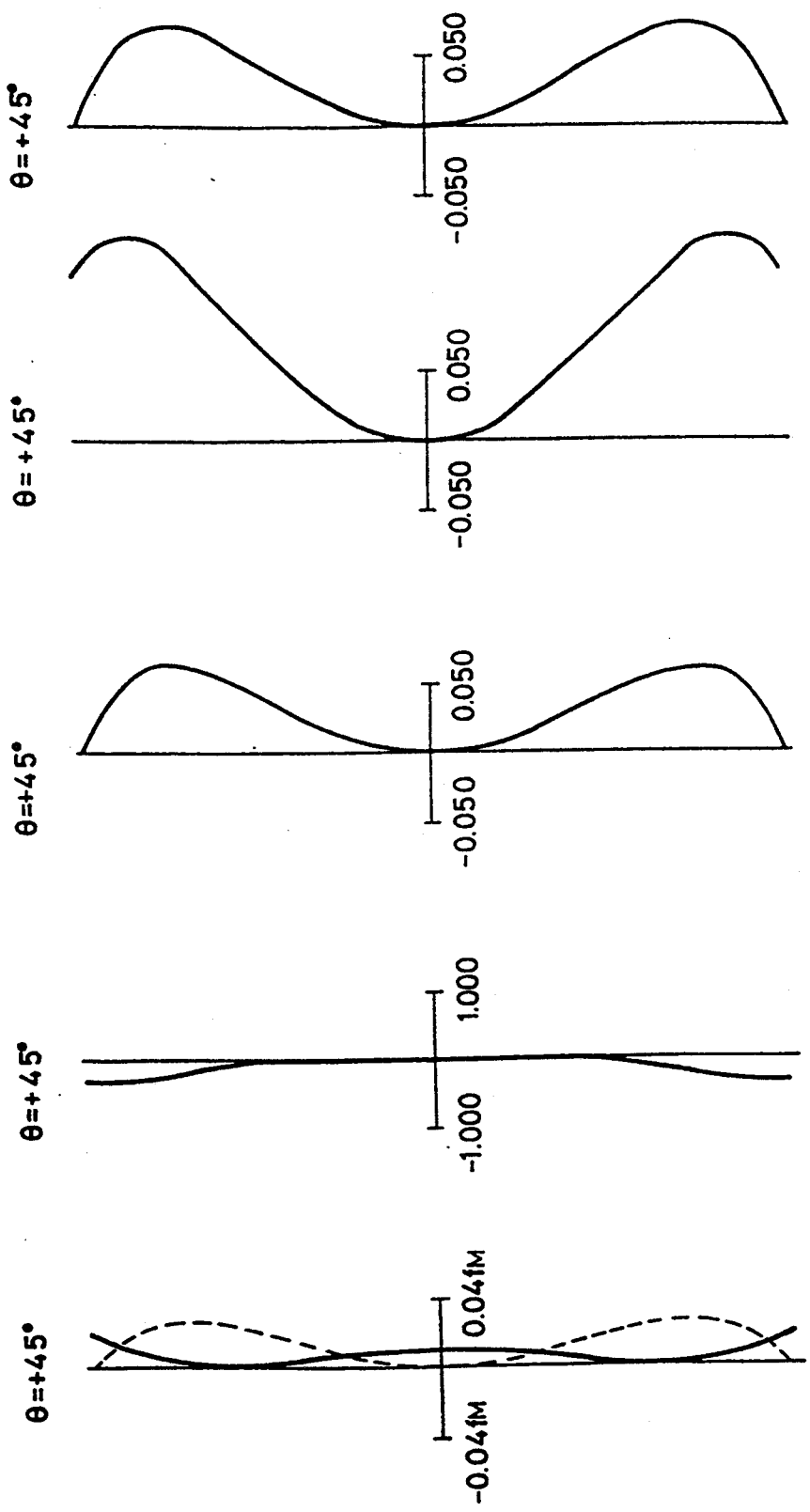

FIELD CURVATURE | SCANNING CHARACTERISTICS (%) | CURVE OF SCANNING LINE | BEFORE CORRECTION OF SCANNING LINE CURVE | AFTER CORRECTION OF SCANNING LINE CURVE

OPTICAL SCANNER

CROSS-REFERENCE TO RELATED APPLICATIONS

This application is a continuation-in-part of application Ser. No. 031,299, filed Mar. 12, 1993, now abandoned.

BACKGROUND OF THE INVENTION

1. Field of the Invention

The present invention relates to an optical scanner in which a light beam deflected by a deflecting means having a deflecting reflecting face rotated at an equal speed is converged as a light spot on a scanned face by the image forming action of a reflective image-forming element to substantially perform a scanning operation at an equal speed. The present invention can be utilized in a writing optical system in a digital copying machine, an optical printer, etc. and a scanning optical system in a measuring device, a display, etc.

2. Description of the Related Art

In an optical scanner, an $f\theta$ lens is generally known widely as an optical system for converging a deflected light beam as a light spot on a scanned face. Recently, a reflective image-forming element has been used instead of the $f\theta$ lens. This reflective image-forming element is an optical element having a function for reflecting and converging the deflected light beam as a light spot on the scanned face. In this patent specification, this optical element is called the reflective image-forming element. For example, the reflective image-forming element is shown in Japanese Patent Application Laying Open (KOKAI) No. 1-220221. Further, a mirror face shape of the reflective image-forming element used instead of the above $f\theta$ lens is set as a proposal to an aspherical surface to preferably correct field curvature and linearity of an image.

In the optical scanner using such a reflective image-forming element, the light beam deflected by the deflecting means is returned by the reflective image-forming element onto a side of the deflecting means. Accordingly, it is necessary to dispose an optical path separating means for separating an optical path of the light beam from the deflecting means toward the reflective image-forming element from an optical path of the light beam from the reflective image-forming element toward the scanned face.

For example, it is considered as one of the optical path separating means that the light beam is incident to the reflective image-forming element in a direction inclined with respect to the rotational axis of a deflecting reflecting face in the deflecting means. In this case, an advancing direction of the deflected light beam is inclined with respect to a plane perpendicular to this rotational axis. In such a structure, the direction of the deflected light beam incident to the reflective image-forming element is not in conformity with that of the light beam reflected on the reflective image-forming element so that an optical path of the incident deflected light beam can be separated from an optical path of the reflected light beam. However, when the optical paths are separated from each other by only such a separating means, an angle of the light beam incident to the deflecting reflecting face with respect to the above plane must be increased to a certain extent to enable a layout of each of optical elements. When this incident angle is increased, the locus of a light spot on the scanned face is greatly curved so that a scanning line is greatly curved and the curved scanning line prevents a preferable optical scanning operation.

In various kinds of general known optical scanners relative to an optical printer, etc., a light beam deflected at an equal angular velocity is converged as a light spot on a scanned face to scan the scanned face. $f\theta$ lens is generally used as an optical system in which the deflected light beam is converged as a light spot on the scanned face and an optical scanning operation using this light spot is performed at an equal speed. Recently, an image-forming reflecting mirror having a linearity correcting function has been proposed and used instead of this $f\theta$ lens. For example, this image-forming reflecting mirror is shown in the above Japanese Patent Application Laying Open (KOKAI) No. 1-200221.

In an optical scanner having such an image-forming reflecting mirror, a Scanning line as a moving locus of the light spot to be straight tends to be curved. In the following description, this is called "a curve of the scanning line is caused".

In the optical scanner using the above image-forming reflecting mirror, the deflected light beam incident to the image-forming reflecting mirror and the deflected light beam reflected on the image-forming reflecting mirror are located on the same side with respect to the image-forming reflecting mirror. Accordingly, it is necessary to use an optical arrangement in which these light beams are separated from each other and the deflected-reflected light beam is not returned onto the side of a light source, but is guided to a scanned face side. There is a case in which the scanning line curve is necessarily caused in accordance with a certain optical arrangement.

Such a curve of the scanning line caused by the optical arrangement can be corrected by shifting a position of the image-forming reflecting mirror in a cross-scan corresponding direction to such an extent that no practical problems are caused. Otherwise, such a curve of the scanning line can be also corrected by inclining the image-forming reflecting mirror to such an extent that no practical problems are caused. However, each of optical elements must be arranged on an optical path from the light source to the scanned face with very high accuracy to correct the scanning line curve as designed. Accordingly, when errors in arrangement accuracy of each of the optical elements are accumulated, a very large curve of the scanning line is caused.

For example, such a curve of the scanning line causes a serious problem in a two-color printer, etc. for waiting information every color by a separate optical scanning operation. For example, when reference numeral L in FIG. 80 is set to an ideal scanning line, there is a case in which scanning lines $L_1$ and $L_2$ for writing information of each of two colors are curved in opposite directions. In such a case, a shift $(d_1+d_2)$ is caused at its maximum between the written color information in both end portions of an optical scanning region. Accordingly, a so-called color shift is clearly caused.

SUMMARY OF THE INVENTION

It is therefore an object of the present invention to provide a novel optical scanner for separating optical paths of a light beam from each other by refraction, or both refraction and reflection.

Another object of the present invention is to provide a novel optical scanner for effectively correcting the curve of a scanning line caused by the above separation of the optical paths.

Another object of the present invention is to provide an optical scanner for achieving the above two objects and having a function for correcting the inclination of a deflecting reflecting face in a deflecting means.

Another object of the present invention is to provide a novel optical scanner using an image-forming reflecting mirror and effectively reducing the curve of a scanning line caused by an error in arrangement of an optical element.

In accordance with a first structure of the present invention, the above objects can be achieved by an optical scanner in which deflecting means has a deflecting reflecting face rotated at an equal speed;

- a light beam from a light source is deflected on a plane by the deflecting means at an equal angular velocity and is incident to a reflective image-forming element through a half mirror inclined with respect to a beam deflecting face; and
- the light beam reflected on the reflective image-forming element is reflected on the half mirror and is converged by an image-forming action of the reflective image-forming element as a light spot on a scanned face to perform an optical scanning operation;
- the reflective image-forming element having a function for substantially performing the optical scanning operation using the light spot at an equal speed; and
- the reflective image-forming element being arranged such that the reflective image-forming element is shifted by a predetermined shifting amount in a direction perpendicular to the beam deflecting face to correct the curve of a scanning line on the scanned face.

In accordance with a second structure of the present invention, the above objects can be achieved by an optical scanner in which deflecting means has a deflecting reflecting face rotated at an equal speed;

- a light beam from a light source is deflected on a plane by the deflecting means at an equal angular velocity and is incident to a reflective image-forming element through a half mirror inclined with respect to a beam deflecting face; and
- the light beam reflected on the reflective image-forming element is reflected on the half mirror and is converged by an image-forming action of the reflective image-forming element as a light spot on a scanned face to perform an optical scanning operation;
- the reflective image-forming element having a function for substantially performing the optical scanning operation using the light spot at an equal speed; and
- the reflective image-forming element being arranged such that an optical axis of the reflective image-forming element is inclined a predetermined tilt angle with respect to the beam deflecting face to correct the curve of a scanning line on the scanned face.

In accordance with a third structure of the present invention, the above objects can be achieved by an optical scanner in which deflecting means has a deflecting reflecting face rotated at an equal speed;

- a light beam from a light source is deflected on a plane by the deflecting means at an equal angular velocity and is incident to a reflective image-forming element through a half mirror inclined with respect to a beam deflecting face; and
- the light bean reflected on the reflective image-forming element is reflected on the half mirror and is converged by an image-forming action of the reflective image-forming element as a light spot on a scanned face to perform an optical scanning operation;
- the reflective image-forming element having a function for substantially performing the optical scanning operation using the light spot at an equal speed; and
- the half mirror having a semi-transparent mirror face on a side of the deflecting means.

In accordance with an eighth structure of the present invention, the above objects can be achieved by an optical scanner in which deflecting means has a deflecting reflecting face rotated at an equal speed;

- a light beam from a light source is deflected on a plane by the deflecting means at an equal angular velocity and is reflected on an anamorphic reflective image-forming element; and
- the reflected light beam is converged by an image-forming action of the reflective image-forming element as a light spot on a scanned face to perform an optical scanning operation;
- the reflective image-forming element having a function for substantially performing the optical scanning operation using the light spot at an equal speed;
- a transparent plane parallel plate being arranged between the deflecting means and the reflective image-forming element such that the plane parallel plate is inclined a finite inclination angle with respect to a rotational axis of the deflecting means;
- the plane parallel plate separating an optical path from the deflecting means to the reflective image-forming element from an optical path from the reflective image-forming element to a scanned face; and
- a material, a thickness and the inclination angle of the plane parallel plate being determined such that the curve of a scanning line is corrected.

In accordance with a fifteenth structure of the present invention, the above objects can be achieved by an optical scanner in which a light beam from a light source is deflected on a plane by deflecting means at an equal angular velocity and is reflected oh a reflective image-forming element, and the reflected light beam is converged by an image-forming action of the reflective image-forming element as a light spot on a scanned face to perform an optical scanning operation;

- the reflective image-forming element having a function for substantially performing the optical scanning operation using the light spot at an equal speed;
- an elongated prism having a wedge shape in cross section and arranged in parallel with a main scan-corresponding direction between the deflecting means and the reflective image-forming element; and
- the elongated prism separating an optical path from the deflecting means to the reflective image-forming element from an optical path from the reflective image-forming element to the scanned face.

In accordance with a twentieth structure of the present invention, the above objects can be achieved by an optical scanner in which deflecting means has a deflecting reflecting face rotated at an equal speed;

a light beam from a light source is deflected on a plane by the deflecting means at an equal angular velocity and is reflected on an anamorphic reflective image-forming element; and the reflected light beam is converged by an image-forming action of the reflective image-forming element as a light spot on a scanned face to perform an optical scanning operation;

the reflective image-forming element having a function for substantially performing the optical scanning operation using the light spot at an equal speed;

a transparent plane parallel plate being arranged between the deflecting means and the reflective image-forming element such that the plane parallel plate is inclined a finite inclination angle with respect to a rotational axis of the deflecting means;

the plane parallel plate separating an optical path from the deflecting means to the reflective image-forming element from an optical path from the reflective image-forming element to a scanned face;

the reflective image-forming element being inclined a predetermined tilt angle with respect to a beam deflecting face; and a material, a thickness and the inclination angle of the plane parallel plate and the tilt angle of the reflective image-forming element with respect to the beam deflecting face being determined such that the curve of a scanning line is corrected.

In accordance with a twenty-seventh structure of the present invention, the above objects can be achieved by an optical scanner in which a light beam from a light source is deflected by deflecting means having a deflecting reflecting face rotated at an equal speed and is reflected on an anamorphic reflective image-forming element; and the reflected light beam is converged by an image-forming action of the reflective image-forming element as a light spot on a scanned face to perform an optical scanning operation;

the reflective image-forming element having a function for substantially performing the optical scanning operation using the light spot at an equal speed;

a transparent plane parallel plate being arranged between the deflecting means and the reflective image-forming element such that the plane parallel plate is inclined a finite inclination angle with respect to a rotational axis of the deflecting means;

the light beam incident to the deflecting reflecting face of the deflecting means being set such that this light beam is slantingly incident to a beam deflecting face;

the plane parallel plate separating an optical path from the deflecting means to the reflective image-forming element from an optical path from the reflective image-forming element to the scanned face; and a material, a thickness and the inclination angle of the plane parallel plate and a shifting amount of the deflected light beam with respect to the reflective image-forming element being determined such that the curve of a scanning line is corrected.

In accordance with a twenty-eighth structure of the present invention, the above objects can be achieved by an optical scanner in which a light beam from a light source is deflected by deflecting means having a deflecting reflecting face rotated at an equal speed and is reflected on an anamorphic reflective image-forming element; and the reflected light beam is converged by an image-forming action of the reflective image-forming element as a light spot on a scanned face to perform an optical scanning operation;

the reflective image-forming element having a function for substantially performing the optical scanning operation using the light spot at an equal speed;

a transparent plane parallel plate being arranged between the deflecting means and the reflective image-forming element such that the plane parallel plate is inclined a finite inclination angle with respect to a rotational axis of the deflecting means;

the light beam incident to the deflecting reflecting face of the deflecting means being set such that this light beam is slantingly incident to a beam deflecting face;

the plane parallel plate separating an optical path from the deflecting means to the reflective image-forming element from an optical path from the reflective image-forming element to the scanned face;

the reflective image-forming element being arranged such that an optical axis of the reflective image-forming element is inclined a predetermined tilt angle with respect to the beam deflecting face; and a material, a thickness and the inclination angle of the plane parallel plate and the tilt angle of the reflective image-forming element being determined such that the curve of a scanning line is corrected.

In accordance with a thirty-sixth structure of the present invention, the above objects can be achieved by an optical scanner comprising:

a light source device for emitting a light beam for performing an optical scanning operation;

a linear image-forming optical system for focusing and forming the light beam from the light source device as a linear image extending in a main scan-corresponding direction;

an optical deflector for reflecting the light beam from this linear image-forming optical system on a deflecting reflecting face and deflecting the light beam at an equal angular velocity;

a light spot image-forming optical system for guiding the deflected light beam onto a scanned face and converging the deflected light beam as a light spot on the scanned face; and an adjusting mechanism for adjusting a posture of this light spot image-forming optical system;

the light spot image-forming optical system having an image-forming reflecting mirror which has a function for converging the deflected light beam onto the scanned face in at least the main scan-corresponding direction and performing the optical scanning operation at an equal speed; and the adjusting mechanism adjusting rotation of the image-forming reflecting mirror around an axis parallel to a deflecting scanning face and perpendicular to an optical axis.

In accordance with a thirty-seventh structure of the present invention, the above objects can be achieved by an optical scanner comprising:
- a light source device for emitting a light beam for performing an optical scanning operation;
- a linear image-forming optical system for focusing and forming the light beam from the light source device as a linear image extending in a main scan-corresponding direction;
- an optical deflector for reflecting the light beam from this linear image-forming optical system on a deflecting reflecting face and deflecting the light beam at an equal angular velocity;
- a light spot image-forming optical system for guiding the deflected light beam onto a scanned face and converging the deflected light beam as a light spot on the scanned face; and
- an adjusting mechanism for adjusting a posture of this light spot image-forming optical system;
- the light spot image-forming optical system having an image-forming reflecting mirror which has a function for converging the deflected light beam onto the scanned face in at least the main scan-corresponding direction and performing the optical scanning operation at an equal speed; and
- the adjusting mechanism adjusting movement of the image-forming reflecting mirror in a direction perpendicular to a deflecting scanning face.

In accordance with a thirty-eighth structure of the present invention, the above objects can be achieved by an optical scanner comprising:
- a light source device for emitting a light beam for performing an optical scanning operation;
- a linear image-forming optical system for focusing and forming the light beam from the light source device as a linear image extending in a main scan-corresponding direction;
- an optical deflector for reflecting the light beam from this linear image-forming optical system on a deflecting reflecting face and deflecting the light beam at an equal angular velocity;
- a light spot image-forming optical system for guiding the deflected light beam onto a scanned face and converging the deflected light beam as a light spot on the scanned face; and
- an adjusting mechanism for adjusting a posture of this light spot image-forming optical system;
- the light spot image-forming optical system having an image-forming reflecting mirror which has a function for converging the deflected light beam onto the scanned face in at least the main scan-corresponding direction and performing the optical scanning operation at an equal speed;
- the adjusting mechanism adjusting rotation of the image-forming reflecting mirror around an axis parallel to a deflecting scanning face and perpendicular to an optical axis; and
- the adjusting mechanism adjusting movement of the image-forming reflecting mirror in a direction perpendicular to the deflecting scanning face.

In accordance with the above structures of the present invention, the optical paths of the light beam can be separated from each other by refraction, or both refraction and reflection. It is also possible to effectively correct the curve of a scanning line caused by the above separation of the optical paths. In addition to these two effects, it is also possible to provide a function for correcting the inclination of the deflecting reflecting face in the deflecting means. Further, it is possible to effectively reduce the curve of a scanning line caused by an error in arrangement of an optical element.

Further objects and advantages of the present invention will be apparent from the following description of the preferred embodiments of the present invention as illustrated in the accompanying drawings.

BRIEF DESCRIPTION OF THE DRAWINGS

FIGS. 2a, 2b and 2c are diagrams for explaining effects of correction of the curve of a scanning line in a concrete example of each of the first and second structures of the present invention;

FIGS. 3a, 3b and 3c are diagrams for explaining effects of correction of the curve of a scanning line in another concrete example of each of the first and second structures of the present invention;

FIGS. 10a and 10b are diagrams respectively showing field curvature and scanning characteristics with respect to Concrete example 8;

FIGS. 11a and 11b are diagrams respectively showing field curvature and scanning characteristics with respect to Concrete example 9;

FIGS. 12a and 12b are diagrams respectively showing field curvature and scanning characteristics with respect to Concrete example 10;

FIGS. 13a and 13b are diagrams respectively showing field curvature and scanning characteristics with respect to Concrete example 11;

FIGS. 16a and 16b are diagrams respectively showing field curvature and scanning characteristics with respect to Concrete example 14;

FIGS. 17a and 17b are diagrams respectively showing field curvature and scanning characteristics with respect to Concrete example 15;

FIGS. 22a and 22b are diagrams respectively showing field curvature and scanning characteristics with respect to Concrete example 20;

FIGS. 23a and 23b are diagrams respectively showing field curvature and scanning characteristics with respect to Concrete example 21;

FIGS. 28a and 28b are diagrams respectively showing field curvature and scanning characteristics with respect to Concrete example 26;

FIGS. 29a and 29b are diagrams respectively showing field curvature and scanning characteristics with respect to concrete example 27;

FIGS. 30a and 30b are diagrams respectively showing field curvature and scanning characteristics with respect to Concrete example 28;

FIGS. 31a and 31b are diagrams respectively showing field curvature and scanning characteristics with respect to Concrete example 29;

FIGS. 32a and 32b are diagrams respectively showing field curvature and scanning characteristics with respect to Concrete example 30;

FIGS. 35a, 35b and 35c are diagrams for explaining effects of correction of the curve of a scanning line in a concrete example of the optical scanner having each of the sixteenth and seventeenth structures of the present invention;

FIGS. 36a and 36b are diagrams for explaining effects of correction of the curve of a scanning line in a concrete example of the optical scanner having the eighteenth structure of the present invention;

FIGS. 82a to 82c are diagrams respectively showing field curvature, scanning characteristics and the curve of a scanning line when the optical scanner in Concrete example 64 is used as designed;

FIG. 83a is a diagram showing the curve of a scanning line when there is an error in optical arrangement of the optical scanner in Concrete example 84;

FIG. 83b is a diagram showing a corrected curve of the scanning line shown in FIG. 83a;

FIGS. 84a to 84c are diagrams respectively showing field curvature, scanning characteristics and the curve of a scanning line when the optical scanner in Concrete example 65 is used as designed;

FIG. 85a is a diagram showing the curve of a scanning line when there is an error in optical arrangement of the optical scanner in Concrete example 65;

FIG. 85b is a diagram showing a corrected curve of the scanning line shown in FIG. 85a;

FIGS. 87a and 87b are diagrams respectively showing field curvature and scanning characteristics when the optical scanner in Concrete example 66 is used as designed;

FIG. 88a is a diagram showing the curve of a scanning line when there is an error in optical arrangement of the optical scanner in Concrete example 66;

Figures 90A, 90B:
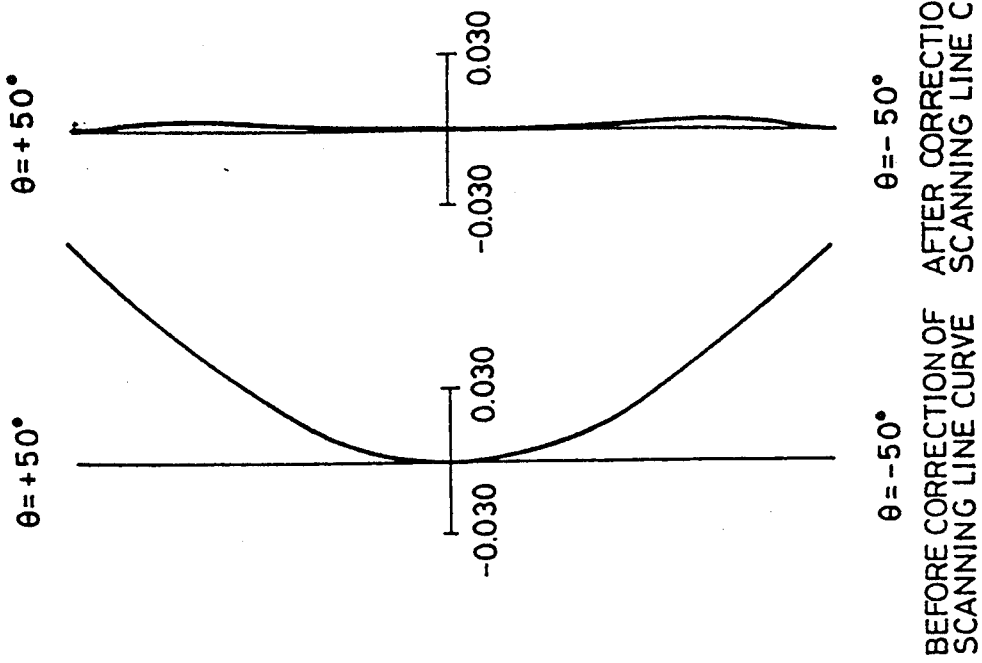
Figures 89A, 89B:
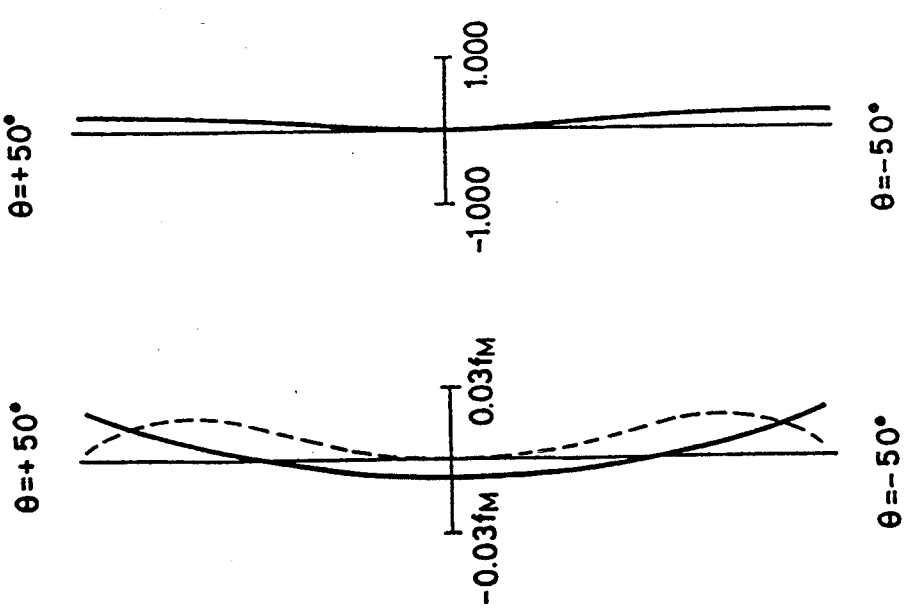
Figure 91:
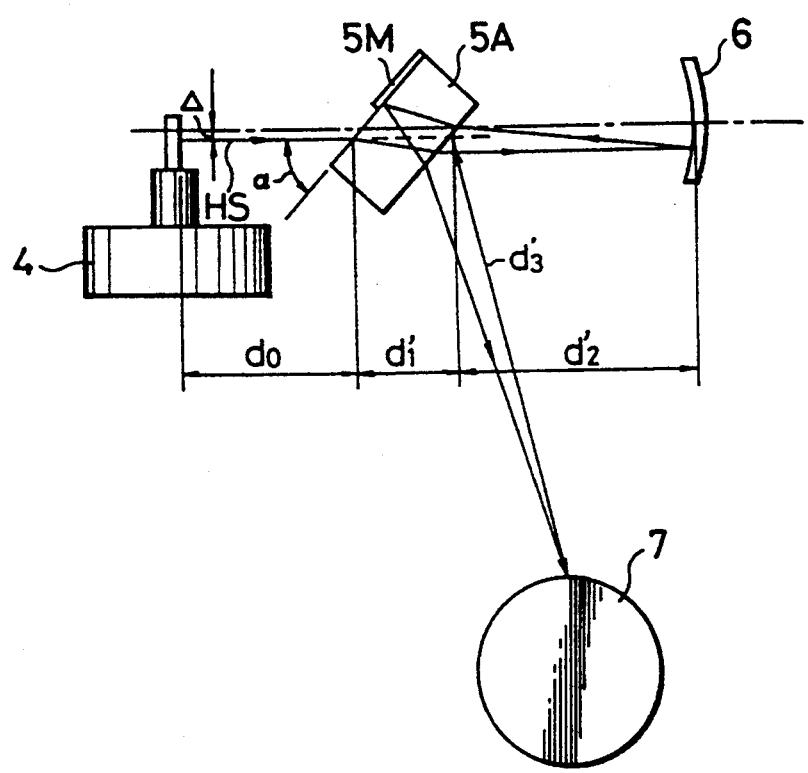
Figure 94:
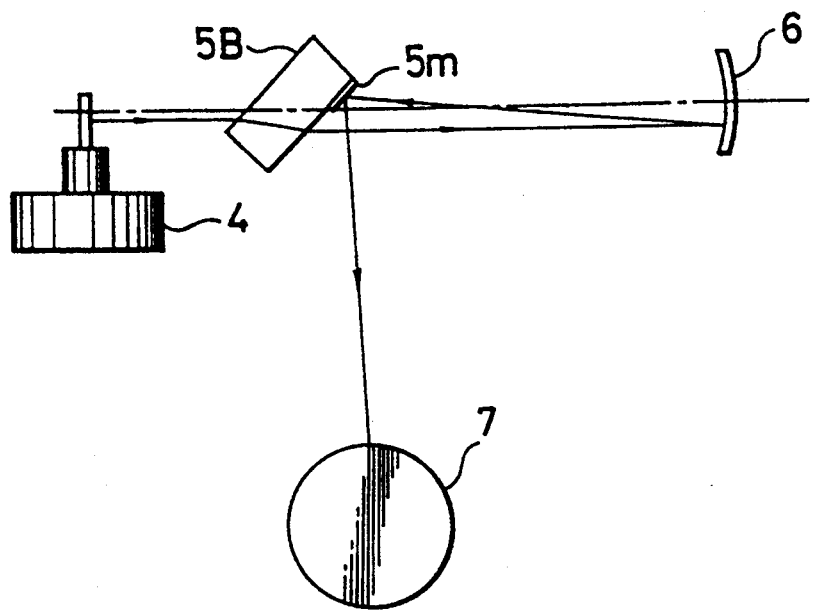
Figure 95:
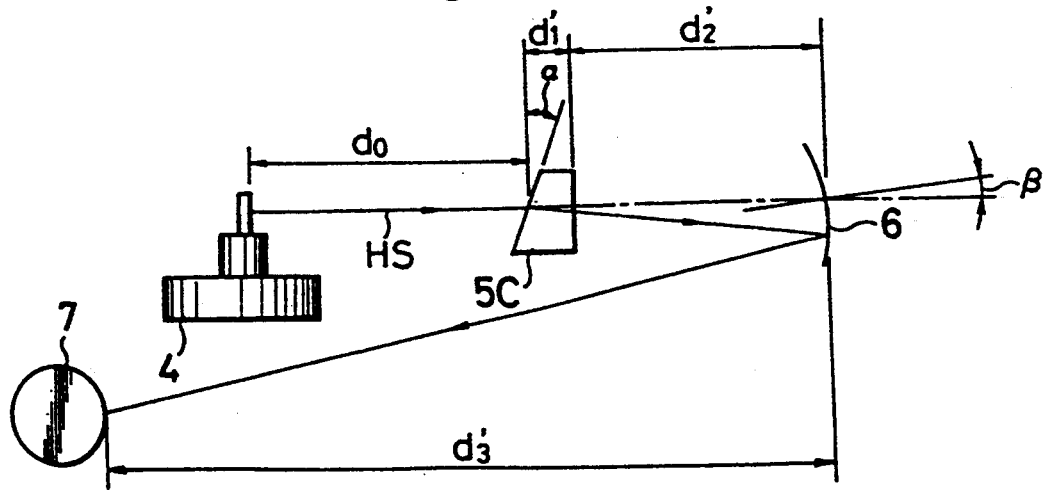
Figure 96:
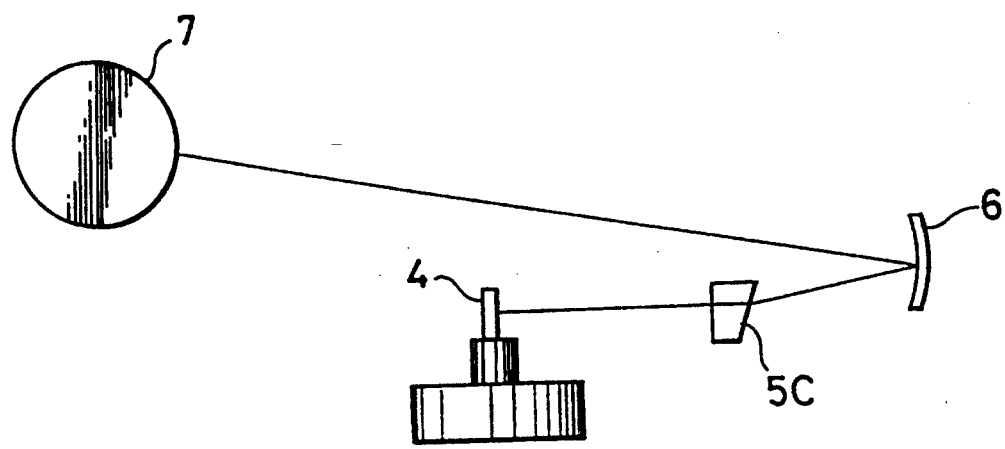
Figure 99:
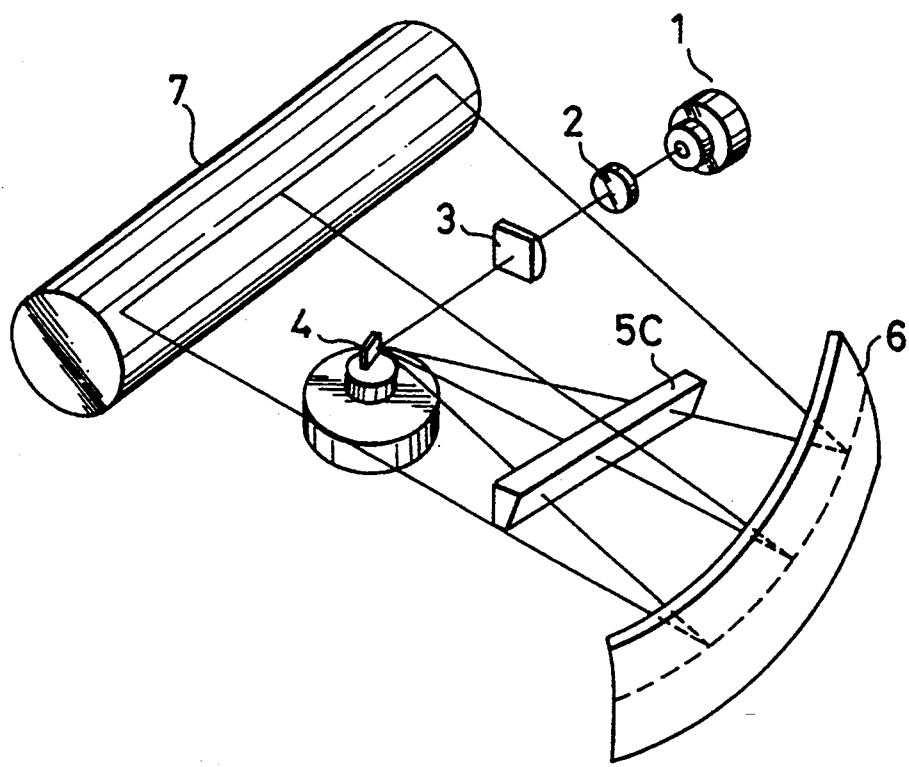
Figure 100:
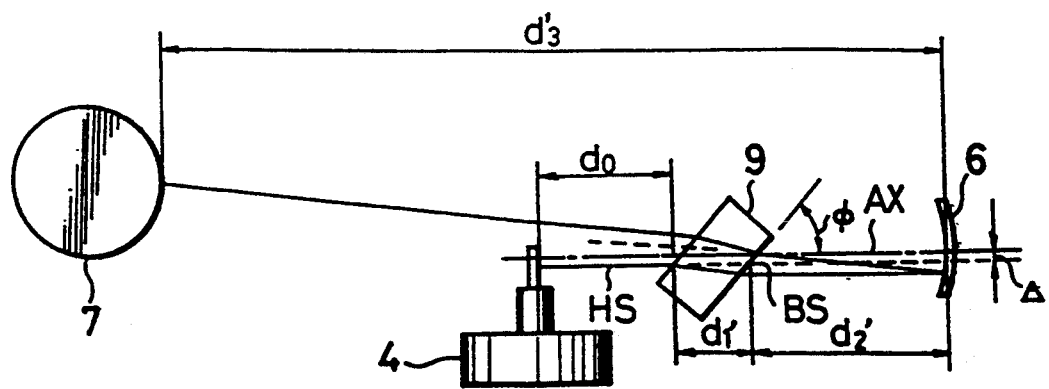
Figures 101A, 101B, 101C, 102A, 102B:
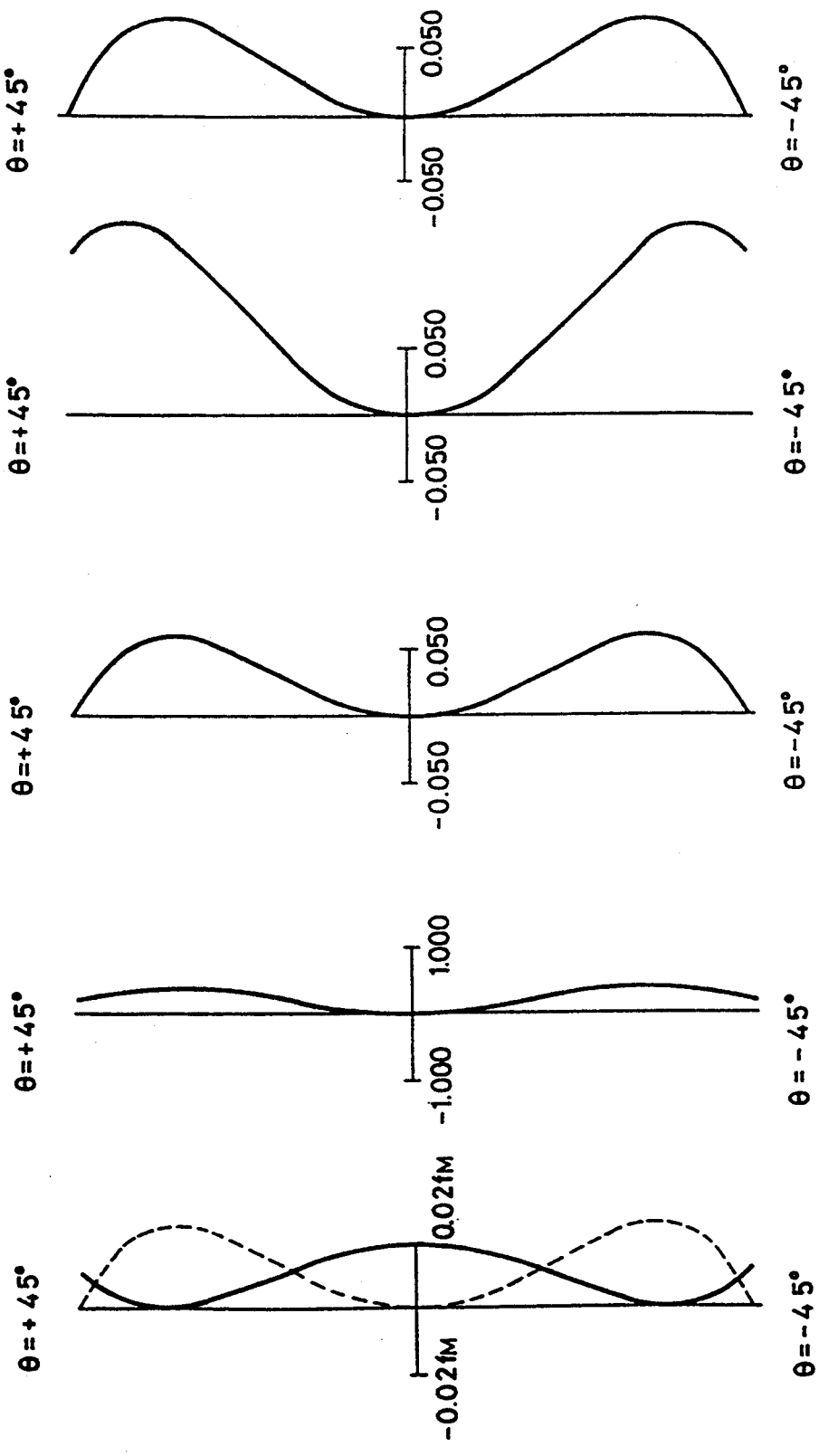
Figure 103:
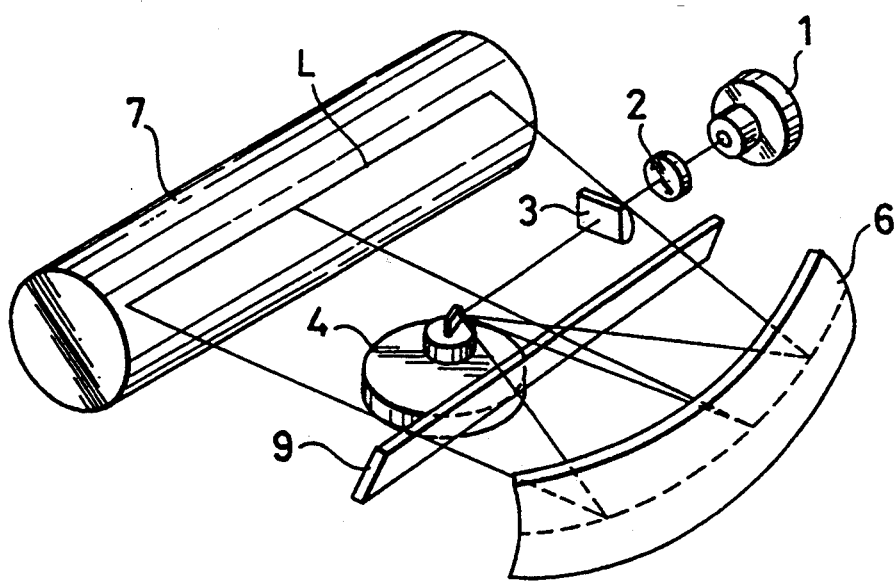

each of FIGS. 88b and 88c is a diagram showing a corrected curve of the scanning line shown in FIG. 88a;

FIGS. 89a and 89b are diagrams respectively showing field curvature and scanning characteristics when the optical scanner in Concrete example 67 is used as designed;

FIG. 90a is a diagram showing the curve of a scanning line when there is an error in optical arrangement of the optical scanner in Concrete example 67;

FIG. 90b is a diagram showing a corrected curve of the scanning line shown in FIG. 90a;

FIG. 91 is a view for explaining the optical arrangement of an optical scanner in Concrete example 68;

FIGS. 92a to 92c are diagrams respectively showing field curvature, scanning characteristics and the curve of a scanning line when the optical scanner in Concrete example 68 is used as designed;

FIG. 93a is a diagram showing the curve of a scanning line when there is an error in optical arrangement of the optical scanner in Concrete example 68;

FIG. 93b is a diagram showing a corrected curve of the scanning line shown in FIG. 93a;

FIG. 94 is a view showing a modified example of the optical scanner in Concrete example 68;

FIG. 95 is a view for explaining the optical arrangement of an optical scanner in Concrete example 69;

FIG. 96 is a view showing a modified example of the optical scanner in Concrete example 69;

FIGS. 97a to 97c are diagrams respectively showing field curvature, scanning characteristics and the curve of a scanning line when the optical scanner in Concrete example 69 is used as designed;

FIG. 98a is a diagram showing the curve of a scanning line when there is an error in optical arrangement of the optical scanner in Concrete example 69;

FIG. 98b is a diagram showing a corrected curve of the scanning line shown in FIG. 98a;

FIG. 99 is a view showing the entire optical arrangement of an optical scanner in Concrete example 69;

FIG. 100 is a view for explaining the optical arrangement of an optical scanner in Concrete example 70;

FIGS. 101a to 101c are diagrams respectively showing field curvature, scanning characteristics and the curve of a scanning line when the optical designed;

FIG. 102a is a diagram showing the curve of a scanning line when there is an error in optical arrangement of the optical scanner in Concrete example 70;

FIG. 102b is a diagram showing a corrected curve of the scanning line shown in FIG. 102a; and FIG. 103 is a view showing the entire optical arrangement of an optical scanner in Concrete example 70.

DESCRIPTION OF THE PREFERRED EMBODIMENTS

The preferred embodiments of an optical scanner in the present invention will next be described in detail with reference to the accompanying drawings.

In an optical scanner of the present invention, a light beam from a light source is deflected by a deflecting means having a deflecting reflecting face rotated at an equal speed and is incident to a reflective image-forming element. The light beam reflected on the reflective image-forming element is converged by an image-forming action of the reflective image-forming element as a light spot on a scanned face. The optical scanner substantially performs an optical scanning operation at an equal speed.

As mentioned above, the deflecting means deflects the light beam. Concretely, the deflecting means is constructed by a pyramidal mirror, a tenon type mirror, a rotary polygon mirror, etc.

In accordance with an optical scanner having a first structure of the present invention, deflecting means has a deflecting reflecting face rotated at an equal speed. A light beam from a light source is deflected on a plane by the deflecting means at an equal angular velocity and is incident to a reflective image-forming element through a half mirror inclined with respect to a beam deflecting face. The light beam reflected on the reflective image-forming element is reflected on the half mirror and is converged by an image-forming action of the reflective image-forming element as a light spot on a scanned face to perform an optical scanning operation. The reflective image-forming element has a function for substantially performing the optical scanning operation using the light spot at an equal speed. The reflective image-forming element is arranged such that the reflective image-forming element is shifted by a predetermined shifting amount in a direction perpendicular to the beam deflecting face to correct the curve of a scanning line on the scanned face.

As mentioned above, in the optical scanner of the present invention, the deflecting means for deflecting the light beam has the deflecting reflecting face rotated at an equal speed. The light beam from the light source is reflected on the deflecting reflecting face and is deflected by rotating the deflecting reflecting face. A beam deflecting face in the present invention is defined as follows.

Namely, the beam deflecting face is set to a plane passing an incident reference position and perpendicular to a rotational axis of the deflecting reflecting face. The incident reference position is set to an incident position of a principal ray of the light beam incident to the deflecting reflecting face in a state in which the height of an image of the light spot converged onto the scanned face is set to zero. The rotational axis of the deflecting reflecting face is an ideal rotational axis which is not considered with respect to axial vibration, etc.

The shifting amount of the reflective image-forming element is set to a distance from an intersecting point of an optical axis and a reflecting face of the reflective image-forming element to the beam deflecting face. This intersecting point is a central point of the reflective image-forming element.

In accordance with an optical scanner having a second structure of the present invention, deflecting means has a deflecting reflecting face rotated at an equal speed. A light beam from a light source is deflected on a plane by the deflecting means at an equal angular velocity and is incident to a reflective image-forming element through a half mirror inclined with respect to a beam deflecting face. The light beam reflected on the reflective image-forming element is reflected on the half mirror and is converged by an image-forming action of the reflective image-forming element as a light spot on a scanned face to perform an optical scanning operation. The reflective image-forming element has a function for substantially performing the optical scanning operation using the light spot at an equal speed. The reflective image-forming element is arranged such that an optical axis of the reflective image-forming element is inclined a predetermined tilt angle with respect to the beam deflecting face to correct the curve of a scanning line on the scanned face.

The tilt angle is set to an angle formed between the optical axis of the reflective image-forming element and the beam deflecting face as mentioned above.

In the optical scanner having each of the first and second structures, the half mirror may have a semi-transparent mirror face on one side thereof. Further, the semi-transparent mirror face may be supported by transparent plane parallel plates on both sides thereof.

In accordance with an optical scanner having a third structure of the present invention, deflecting means has a deflecting reflecting face rotated at an equal speed. A light beam from a light source is deflected on a plane by the deflecting means at an equal angular velocity and is incident to a reflective image-forming element through a half mirror inclined with respect to a beam deflecting face. The light beam reflected on the reflective image-forming element is reflected on the half mirror and is converged by an image-forming action of the reflective image-forming element as a light spot on a scanned face to perform an optical scanning operation. The reflective image-forming element has a function for substantially performing the optical scanning operation using the light spot at an equal speed. The half mirror has a semi-transparent mirror face on a side of the deflecting means.

In accordance with a fourth structure of the present invention, the reflective image-forming element in the third structure is arranged such that the reflective image-forming element is shifted by a predetermined shifting amount in a direction perpendicular to the beam deflecting face to correct the curve of a scanning line on the scanned face. In accordance with a fifth structure of the present invention, the reflective image-forming element in the third structure is arranged such that an optical axis of the reflective image-forming element is inclined a predetermined tilt angle with respect to the beam deflecting face to correct the curve of a scanning line on the scanned face.

In accordance with a sixth structure of the present invention, the reflective image-forming element in the second or fifth structure is arranged such that the optical axis of the reflective image-forming element is inclined the predetermined tilt angle with respect to the beam deflecting face, and the reflective image-forming element is shifted by a predetermined shifting amount in a direction perpendicular to the beam deflecting face to correct the curve of the scanning line on the scanned face. Namely, the curve of the scanning line can be corrected commonly by inclining the reflective image-forming element with respect to the beam deflecting face and shifting the reflective image-forming element from the beam deflecting face.

In accordance with a seventh structure of the present invention, the deflecting reflecting face of the deflecting means is parallel to a rotational axis thereof in each of the first to sixth structures of the present invention. The reflective image-forming element sets positions of the deflecting reflecting face of the deflecting means and the scanned face in a conjugate relation in geometrical optics in a cross scan-corresponding direction. The light beam from the light source is focused and formed as a linear image extending in a main scan-corresponding direction in the vicinity of the deflecting reflecting face in the cross scan-corresponding direction. The cross scan-corresponding direction is set to a direction corresponding and parallel to a cross scanning direction on a virtual optical path provided by linearly developing an optical path from the light source to the scanned face along an optical axis. The main scan-corresponding direction is set to a direction corresponding and parallel to a main scanning direction on the above virtual optical path.

In accordance With an optical scanner having an eighth structure of the present invention, deflecting means has a deflecting reflecting face rotated at an equal speed. A light beam from a light source is deflected on a plane by the deflecting means at an equal angular velocity and is reflected on an anamorphic reflective image-forming element. The reflected light beam is converged by an image-forming action of the reflective image-forming element as a light spot on a scanned face to perform an optical scanning operation. The reflective image-forming element has a function for substantially performing the optical scanning operation using the light spot at an equal speed. A transparent plane parallel plate is arranged between the deflecting means and the reflective image-forming element such that the plane parallel plate is inclined a finite inclination angle with respect to, a rotational axis of the deflecting means. The plane parallel plate separates an optical path from the deflecting means to the reflective image-forming element from an optical path from the reflective image-forming element to a scanned face. A material, a thickness and the inclination angle of the plane parallel plate are determined such that the curve of a scanning line is corrected. This inclination angle is an angle formed between faces of the plane parallel plate parallel to each other and a direction of the rotational axis of the deflecting means. Transparency of the plane parallel plate means that the plane parallel plate is transparent with respect to the light beam used for the optical scanning operation. Accordingly, no transparency of the plane parallel plate is required with respect to light in all wavelength regions.

In accordance with a ninth structure of the present invention, the deflected light beam incident to the reflective image-forming element and the light beam reflected on the reflective image-forming element are transmitted through the plane parallel plate in the eighth structure. In accordance with a tenth structure of the present invention, only the deflected light beam incident to the reflective image-forming element in the eighth structure is transmitted through the plane parallel plate with respect to the deflected light beam incident to the reflective image-forming element and the light beam reflected on the reflective image-forming element. In accordance with an eleventh structure of the present invention, the inclination angle of the plane parallel plate in each of the eighth to tenth structures is determined such that an incident angle of the deflected light beam incident to the plane parallel plate is set to approximately satisfy a Brewster angle.

In accordance with the above ninth structure of the present invention, both the deflected light beam and the reflected light beam are transmitted through the plane parallel plate. In this case, in accordance with a twelfth structure of the present invention, a reflecting film is formed in a face portion of the plane parallel plate on a side of the deflecting means in the ninth structure such that only the light beam reflected on the reflective image-forming element and transmitted through the plane parallel plate is selectively reflected on the reflecting film.

In accordance with the tenth structure of the present invention, the light beam reflected on the reflective image-forming element may be guided onto the scanned face as it is. In accordance with a thirteenth structure of the present invention, a reflecting film is formed in a face portion of the plane parallel plate on a side of the reflective image-forming element in the tenth structure such that only the light beam reflected on the reflective image-forming element is selectively reflected on the reflecting film.

In accordance with a fourteenth structure of the present invention, the deflecting reflecting face of the deflecting means is parallel to the rotational axis thereof in each of the eighth to thirteenth structures. The light beam from the light source is focused and formed as a linear image extending in a main scan-corresponding direction in the vicinity of the deflecting reflecting face. The reflective image-forming element approximately sets positions of the deflecting reflecting face and the scanned face in a conjugate relation in geometrical optics with respect to a cross scan-corresponding direction.

In accordance with an optical scanner having a fifteenth structure of the present invention, a light beam from a light source is deflected on a plane by deflecting means at an equal angular velocity and is reflected on a reflective image-forming element. The reflected light beam is converged by an image-forming action of the reflective image-forming element as a light spot on a scanned face to perform an optical scanning operation. The reflective image-forming element has a function for substantially performing the optical scanning operation using the light spot at an equal speed. An elongated prism has a wedge shape in cross section and is arranged in parallel with a main scan-corresponding direction between the deflecting means and the reflective image-forming element. The elongated prism separates an optical path from the deflecting means to the reflective image-forming element from an optical path from the reflective image-forming element to the scanned face.

In this case, in accordance with a sixteenth structure of the present invention, the reflective image-forming element is arranged such that the reflective image-forming element is shifted by a predetermined shifting amount in a direction perpendicular to a beam deflecting face to correct the curve of a scanning line. Otherwise, in accordance with a seventeenth structure of the present invention, the reflective image-forming element is arranged such that an optical axis of the reflective image-forming element is inclined a predetermined tilt angle with respect to a beam deflecting face to correct the curve of a scanning line on the scanned face. In accordance with an eighteenth structure of the present invention a reflecting face of the reflective image-forming element in the sixteenth structure is constructed by a coaxial spherical or aspherical surface.

In accordance with a nineteenth structure of the present invention, the deflecting means has a deflecting reflecting face parallel to a rotational axis thereof in each of the fifteenth to seventeenth structures. The reflective image-forming element is anamorphic and sets positions of the deflecting reflecting face of the deflecting means and the scanned face in a conjugate relation in geometrical optics in a cross scan-corresponding direction. The light beam from the light source is focused and formed as a linear image extending in the main scan-corresponding direction in the vicinity of the deflecting reflecting face.

In accordance with an optical scanner having a twentieth structure of the present invention, deflecting means has a deflecting reflecting face rotated at an equal speed. A light beam from a light source is deflected on a plane by the deflecting means as an equal angular velocity and is reflected on an anamorphic reflective image-forming element. The reflected light beam is converged by an image-forming action of the reflective image-forming element as a light spot on a scanned face to perform an optical scanning operation. The reflective image-forming element has a function for substantially performing the optical scanning operation using the light spot at an equal speed. A transparent plane parallel plate is arranged between the deflecting means and the reflective image-forming element such that the plane parallel plate is inclined a finite inclination angle With respect to a rotational axis of the deflecting means. The plane parallel plate separates an optical path from the deflecting means to the reflective image-forming element from an optical path from the reflective image-forming element to a scanned face. The reflective image-forming element is inclined a predetermined tilt angle with respect to a beam deflecting face. A material, a thickness and the inclination angle of the plane parallel plate and the tilt angle of the reflective image-forming element with respect to the beam deflecting face are determined such that the curve of a scanning line is corrected.

In accordance with a twenty-first structure of the present invention, the deflected light beam incident to the reflective image-forming element and the light beam reflected on the reflective image-forming element are transmitted through the plane parallel plate in the twentieth structure. In accordance with a twenty-second structure of the present invention, only the deflected light beam incident to the reflective image-forming element in the twentieth structure is transmitted through the plane parallel plate with respect to the deflected light beam incident to the reflective image-forming element and the light beam reflected on the reflective image-forming element. In accordance with a twenty-third structure of the present invention, the inclination angle of the plane parallel plate in each of the twentieth to twenty-second structures is determined such that an incident angle of the deflected light beam incident to the plane parallel plate is set to approximately satisfy a Brewster angle.

In the twenty-first structure, the light beam incident to the reflective image-forming element and the light beam reflected on the reflective image-forming element are transmitted through the plane parallel placate. In accordance with a twenty-fourth structure of the present invention, a reflecting film is formed in a face portion of the plane parallel plate on a side of the deflecting means in the twenty-first structure such that only the light beam reflected on the reflective image-forming element and transmitted through the plane parallel plate is selectively reflected on the reflecting film. In accordance with the twenty-second structure, the light beam reflected on the reflective image-forming element is guided onto the scanned face as it is. However, in accordance with a twenty-fifth structure of the present invention, a reflecting film is formed in a face portion of the plane parallel plate on a side of the reflective image-forming element in the twenty-second structure such that only the light beam reflected on the reflective image-forming element is selectively reflected on the reflecting film.

In accordance with a twenty-sixth structure of the present invention, the deflecting reflecting face of the deflecting means is parallel to the rotational axis thereof in each of the twentieth to twenty-fifth structures. The light beam from the light source is focused and formed as a linear image extending in a main scan-corresponding direction in the vicinity of the deflecting reflecting face. The reflective image-forming element approximately sets positions of the deflecting reflecting face and the scanned face in a conjugate relation in geometrical optics with respect to a cross scan-corresponding direction.

In the optical scanner having each of the first to twenty-sixth structures, the light beam is deflected by the deflecting means on a plane. Namely, a face scanned by a principal ray of the light beam ideally reflected by the deflecting means is a plane perpendicular to the rotational axis of the deflecting reflecting face. This face is in conformity with the beam deflecting face.

In accordance with an optical scanner having each of twenty-seventh to thirty-fifth structures of the present invention, a light beam from a light source is deflected by deflecting means having a deflecting reflecting face rotated at an equal speed and is reflected on an anamorphic reflective image-forming element. The reflected light beam is converged by an image-forming action of the reflective image-forming element as a light spot on a scanned face to perform an optical scanning operation. The reflective image-forming element has a function for substantially performing the optical scanning operation using the light spot at an equal speed.

In accordance with the twenty-seventh structure of the present invention, a transparent plane parallel plate is arranged between the deflecting means and the reflective image-forming element such that the plane parallel plate is inclined a finite inclination angle with respect to a rotational axis of the deflecting means. The light beam incident to the deflecting reflecting face of the deflecting means is set such that this light beam is slantingly incident to a beam deflecting face. The plane parallel plate separates an optical path from the deflecting means to the reflective image-forming element from an optical path from the reflective image-forming element to the scanned face. A material, a thickness and the inclination angle of the plane parallel plate and a shifting amount of the deflected light beam with respect to the reflective image-forming element are determined such that the curve of a scanning line is corrected.

An intersecting point of the reflecting face of the reflective image-forming element and an optical axis of the reflective image-forming element is located in a central portion of the reflective image-forming element. When the height of an image of the light spot on the scanned face is equal to zero, the light beam shifting amount is equal to a distance between this central portion and a position in which a principal ray of the deflected light beam is incident to the above reflecting face.

In accordance with the twenty-eighth structure of the present invention, a transparent plane parallel plate is arranged between the deflecting means and the reflective image-forming element such that the plane Parallel plate is inclined a finite inclination angle with respect to a rotational axis of the deflecting means. The light beam incident to the deflecting reflecting face of the deflecting means is set such that this light beam is slantingly incident to a beam deflecting face. The plane parallel plate separates an optical path from the deflecting means to the reflective image-forming element from an optical path from the reflective image-forming element to the scanned face. The reflective image-forming element is arranged such that an optical axis of the reflective image-forming element is inclined a predetermined tilt angle with respect to the beam deflecting face. A material, a thickness and the inclination angle of the plane parallel plate and the tilt angle of the reflective image-forming element are determined such that the curve of a scanning line is corrected.

In accordance with the twenty-ninth structure of the present invention, the reflective image-forming element in the twenty-seventh structure is arranged such that an optical axis of the reflective image-forming element is inclined a predetermined tilt angle with respect to the beam deflecting face. The material, the thickness and the inclination angle of the plane parallel plate, the light beam shifting amount and the tilt angle of the reflective image-forming element are determined such that the curve of the scanning line is corrected.

In accordance with the thirtieth structure of the present invention, the deflected light beam incident to the reflective image-forming element and the light beam reflected on the reflective image-forming element are transmitted through the plane parallel plate in each of the twenty-seventh to twenty-ninth structures. Otherwise, in accordance with the thirty-first structure of the present invention, only the deflected light beam incident to the reflective image-forming element is transmitted through the plane parallel plate with respect to the deflected light beam incident to the reflective image-forming element and the light beam reflected on the reflective image-forming element in accordance with the thirty-second structure of the present invention, the inclination angle of the plane parallel plate in each of the twenty-seventh to thirty-first structures is determined such that an incident angle of the deflected light beam incident to the plane parallel plate is set to approximately satisfy a Brewster angle.

In accordance with the thirty-third structure of the present invention a reflecting film is formed in a face portion of the plane parallel plate on a side of the deflecting means in the thirtieth structure such that only the light beam reflected on the reflective image-forming element and transmitted through the plane parallel plate is selectively reflected on the reflecting film. In accordance with the thirty-fourth structure of the present invention, a reflecting film is formed in a face portion of the plane parallel plate on a side of the reflective image-forming element in the thirtieth structure such that only the light beam reflected on the reflective image-forming element is selectively reflected on the reflecting film.

In accordance with the thirty-fifth structure of the present invention, the deflecting reflecting face of the deflecting means is parallel to the rotational axis thereof in each of the twenty-seventh to thirty-fourth structures. The light beam from the light source is focused and formed as a linear image extending in a main scan-corresponding direction in the vicinity of the deflecting reflecting face. The reflective image-forming element approximately sets positions of the deflecting reflecting face and the scanned face in a conjugate relation in geometrical optics with respect to a cross scan-corresponding direction.

In the twenty-seventh to thirty-fifth structures of the present invention, the light beam incident to the deflecting reflecting face of the deflecting means is slantingly incident to the beam deflecting face. Accordingly, at this time, a face scanned by a principal ray of the ideally deflected light beam is a curved surface similar to a conical face.

The reflective image-forming element is arranged such that the optical axis of the reflective image-forming element is in conformity with the beam deflecting face. The half mirror is arranged between the deflecting means and the reflective image-forming element such that the half mirror is inclined with respect to the beam deflecting face. In this case, the deflected light beam transmitted through the half mirror is shifted in a direction perpendicular to the beam deflecting face since the half mirror has a thickness. Therefore, an incident position of the deflected light beam incident to the reflective image-forming element is shifted from the optical axis so that the locus of a light spot is curved.

In the optical scanner having each of the first to seventh structures, as shown in each of concrete examples described later, the reflective image-forming element is shifted in a direction perpendicular to the beam deflecting face. Otherwise the optical axis of the reflective image-forming element is inclined with respect to the beam deflecting face. Further, the half mirror may be arranged such that the semi-transparent mirror face of the half mirror is located on a side of the deflecting means. Thus, it is possible to effectively correct the curve of a scanning line as the locus of the light spot.

In the optical scanner having each of the eighth to fourteenth structures, the plane parallel plate is arranged between the deflecting means and the reflective image-forming element. At least the light beam deflected by the deflecting means is transmitted through the plane parallel plate before the deflected light beam is incident to the reflective image-forming element As shown in each of embodiments described later, the curve of a scanning line can be effectively corrected by adjusting a material and a thickness of the plane parallel plate and an angle of inclination of the plane parallel plate with respect to the rotational axis of the deflecting means.

In the optical scanner having the fifteenth structure, the elongated prism is arranged between the deflecting means and the reflective image-forming element. A deflecting direction of the deflected light beam is inclined by refraction with respect to the beam deflecting face. Accordingly, an incident direction of the light beam incident to the reflective image-forming element and a reflecting direction of the light beam reflected on the reflective image-forming element are inclined with respect to the beam deflecting face. Accordingly, optical paths of these light beams can be preferably separated from each other. In the optical scanner having each of the sixteenth to nineteenth structures, as shown in each of concrete examples described later, the reflective image-forming element is shifted in a direction perpendicular to the beam deflecting face. Otherwise, the optical axis of the reflective image-forming element is inclined with respect to the beam deflecting face. Thus, it is possible to effectively correct the curve of a scanning line as the locus of a light spot.

In the optical scanner having each of the twentieth to twenty-sixth structures, the plane parallel plate is arranged between the deflecting means and the reflective image-forming element. At least the light beam deflected by the deflecting means is transmitted through the plane parallel plate before the deflected light beam is incident to the reflective image-forming element. Further, the reflective image-forming element is inclined with respect to the beam deflecting face. As shown in each of embodiments described later, the curve of a scanning line can be effectively corrected by adjusting a material and a thickness of the plane parallel plate, an inclination angle of the plane parallel plate with respect to the rotational axis of the deflecting means, and a tilt angle of the reflective image-forming element with respect to the beam deflecting face.

In the optical scanner having each of the twenty-seventh to thirty-fifth structures, the plane parallel plate is arranged between the deflecting means and the reflective image-forming element. At least the light beam deflected by the deflecting means is transmitted through the plane parallel plate before the deflected light beam is incident to the reflective image-forming element. Further, the light beam incident to the deflecting reflecting face is inclined with respect to the beam deflecting face.

The shifting amount of the deflected light beam with respect to the reflective image-forming element and/or the tilt angle of the reflective image-forming element is adjusted together with the material and the thickness of the plane parallel plate and the inclination angle of the plane parallel plate with respect to the rotational axis of the deflecting means. Thus, it is possible to effectively correct the curve of a scanning line.

Further, in the optical scanner having each of the seventh, fourteenth, nineteenth, twenty-sixth and thirty-fifth structures, the deflecting means has a deflecting reflecting face parallel to a rotational axis thereof. The light beam from the light source is focused and formed by using this deflecting means as a linear image extending in the main scan-corresponding direction in the vicinity of the deflecting reflecting face. Further, the reflective image-forming element sets positions of the scanned face and the deflecting reflecting face of the deflecting means in a conjugate relation in geometrical optics with respect to the cross scan-corresponding direction. Thus, it is possible to correct an inclination of the deflecting reflecting face. As can be seen from each of the concrete examples, shifting and tilting amounts of the reflective image-forming element are small. Accordingly, the position of the deflecting reflecting face of the deflecting means and the position of the scanned face can be set by the reflective image-forming element in the conjugate relation with respect to the cross scan-corresponding direction with high accuracy.

If the relation between the light source and the deflecting means is improved, the inclination of the deflecting reflecting face can be corrected even when the deflecting means is constructed by a pyramidal mirror, etc. and the deflecting reflecting face is inclined 45° with respect to the rotational axis.

An optical scanner in another embodiment of the present invention has a light source device, a linear image-forming optical system, an optical deflector, a light spot image-forming optical system and an adjusting mechanism.

The light source device emits a light beam for performing an optical scanning operation.

The light source device is constructed by a light source such as a semiconductor laser, a light emitting diode, etc. Otherwise, the light source device is constructed by this light source and a coupling lens.

The linear image-forming optical system focuses and forms the light beam from the light source device as a linear image extending in a main scan-corresponding direction. The linear image-forming optical system can be constructed by an optical system having positive refracting power only in a cross scan-corresponding direction. This optical system is composed of a cylindrical lens described later a cylindrical mirror etc The linear image-forming optical system can be constructed such that this optical system also has refracting power in the main scan-corresponding direction.

The main scan-corresponding direction is set to a direction parallel and corresponding to a main scanning direction on a virtual optical path obtained by linearly developing an optical path from the light source to a scanned face. The cross scan-corresponding direction is set to a direction parallel and corresponding to a cross scanning direction on this virtual optical path.

The optical deflector reflects the light beam from the linear image-forming optical system on a deflecting reflecting face and deflects the light beam at an equal angular velocity. This deflection of the sight beam at the equal angular velocity means that the deflected light beam is projected on a face perpendicular to a rotational axis of the deflecting reflecting face and this projected light beam is deflected at an equal angular velocity. In the following description, a deflecting scanning face is set to a virtual plane scanned by a principal ray of the light beam ideally deflected by the optical deflector.

The light spot image-forming optical system guides the deflected light beam onto the scanned face and converges the deflected light beam as a light spot on the scanned face. The light spot image-forming optical system is constructed by various kinds of optical elements arranged on an optical path from the optical deflector to the scanned face.

This light spot image-forming optical system includes an image-forming reflecting mirror. The image-forming reflecting mirror has a function for converging the deflected light beam onto the scanned face in at least the main scan-corresponding direction and performing the optical scanning operation at an equal speed.

The light spot image-forming optical system can include an elongated cylindrical lens and an elongated toroidal lens in addition to the image-forming reflecting mirror. Otherwise, the light spot image-forming optical system can further include an elongated concave mirror equivalent to the elongated cylindrical lens or the elongated toroidal lens. The elongated cylindrical lens, the elongated toroidal lens or the elongated concave mirror is arranged in the vicinity of the scanned face to correct field curvature in the cross scanning direction. Further, in accordance with necessity, the light spot image-forming optical system can include various kinds of optical elements for separating an optical path of the deflected light beam incident to the image-forming reflecting mirror from an optical path of the deflected light beam reflected on the image-forming reflecting mirror in accordance with forty-sixth and forty-eighth structures of the present invention, etc.

The adjusting mechanism is arranged to correct the curve of a scanning line.

In accordance with a thirty-sixth structure of the present invention, the adjusting mechanism adjusts rotation of the image-forming reflecting mirror around an axis parallel to the deflecting scanning face and perpendicular to an optical axis. In this rotational adjustment, an inclination angle of the image-forming reflecting mirror with respect to the deflecting scanning face is adjusted by rotating the image-forming reflecting mirror around the above axis in normal and reverse directions.

In a thirty-seventh structure of the present invention,, the adjusting mechanism adjusts movement of the image-forming reflecting mirror in a direction perpendicular to the deflecting scanning face.

In a thirty-eighth structure of the present invention, the adjusting mechanism adjusts rotation of the image-forming reflecting mirror around an axis parallel to the deflecting scanning face and perpendicular to the optical axis. The adjusting mechanism also adjusts movement of the image-forming reflecting mirror in a direction perpendicular to the deflecting scanning face.

In a thirty-ninth structure of the present invention, the image-forming reflecting mirror in the thirty-sixth, thirty-seventh or thirty-eighth structure has an aspherical reflecting mirror face. In a forty-fourth structure of the present invention, the light source in this case is suitably constructed by a semiconductor laser.

In a fortieth structure of the present invention, a position of the linear image-forming optical system is set to correct an inclination of the deflecting reflecting face of the optical deflector such that the linear image extending in the main scan-corresponding direction is formed in the vicinity of the deflecting reflecting face of the optical deflector. Further, the light spot image-forming optical system is constructed such that the light spot image-forming optical system approximately sets positions of the deflecting reflecting face and the scanned face in a conjugate relation in geometrical optics with respect to the cross scan-corresponding direction.

In a forty-first structure of the present invention, the light spot image-forming optical system has a reflecting mirror rotatable around an axis parallel to the main scan-corresponding direction.

When the reflecting face of the image-forming reflecting mirror is set to an aspherical surface, this reflecting face may be constructed by a coaxial aspherical surface in a forty-second structure of the present invention. In a forty-sixth structure of the present invention, the reflecting mirror having the aspherical surface is constructed by an anamorphic concave mirror having different image-forming functions in the main scan-corresponding direction and the cross scan-corresponding direction. This anamorphic concave mirror is used as an aspherical surface.

In a forty-third structure of the present invention, the light beam incident to the deflecting reflecting face of the optical deflector from the light source device in each of the thirty-sixth to thirty-eighth structures is set to a divergent light beam in the main scan-corresponding direction. In a forty-fifth structure of the present invention, this light beam is set to a convergent light beam. In a fifty-third structure of the present invention, this light beam is set to an approximately parallel light beam.

As mentioned above, the light spot image-forming optical system can include an optical element for separating optical paths from each other. This optical element is arranged between the optical deflector and the image-forming reflecting mirror to separate the light beam deflected by the optical deflector from the light beam reflected on the image-forming reflecting mirror.

In a forty-seventh structure of the present invention, the optical element for optical path separation in the forty-sixth structure is constructed by a half mirror or a glass plate partially having a mirror face formed by evaporation. In a forty-eighth structure of the present invention, this separating optical element is constructed by a prism. In a fifty-second structure of the present invention, the separating optical element is constructed by a transparent plane parallel plate slantingly arranged with respect to the defecting scanning face.

In a forty-ninth structure of the present invention, the optical scanner in the thirty-seventh structure further has an inclination correcting optical element for correcting the inclination of the deflecting reflecting face of the optical deflector. The adjusting mechanism can adjust movement of this inclination correcting optical element in the same direction as the image-forming reflecting mirror. In this case, in a fiftieth structure of the present invention, the adjusting mechanism can adjust the movement of the inclination correcting optical element independently of the image-forming reflecting mirror. In a fifty-first structure of the present invention, the optical deflector in the fortieth structure is suitably constructed by a rotary polygon mirror, a pyramidal mirror or a rotary unifacial mirror.

Figure 1A:
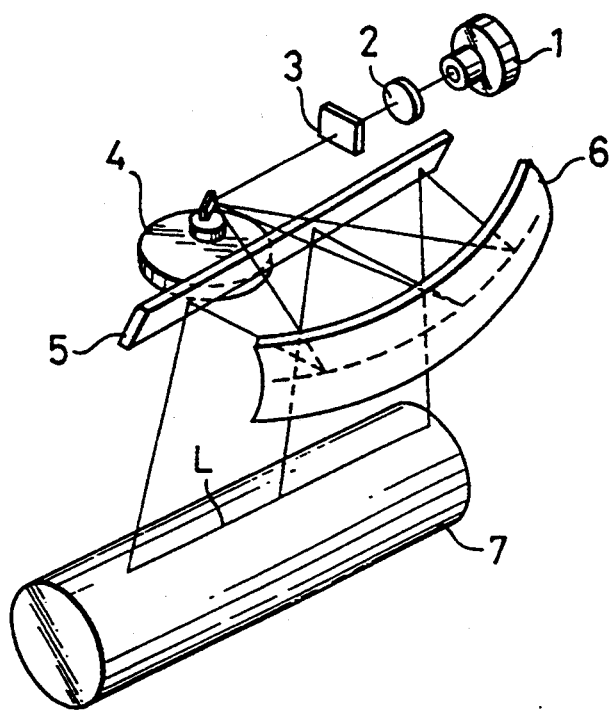
FIG. 1a, 1b, 1c and 1d are views for explaining first to seventh structures of an optical scanner in the present invention.

FIG. 1a schematically shows only a main portion of one example of an optical scanner to which each of first to seventh structures of the present invention can be applied. In FIG. 1a, a light source 1 is constructed by a laser diode (LD), an LED, etc. A light beam is emitted from the light source 1 and a lens 2 having positive refracting power restrains this light beam from being diverged. When the light beam is transmitted through this lens 2, the light beam is changed to one of a parallel light beam, a convergent light beam and a divergent light beam. The light beam is then converged by a cylindrical lens 3 only in a cross scan-corresponding direction. The light beam is focused and formed as a linear image extending in a main scan-corresponding direction in the vicinity of a deflecting reflecting face of a deflecting means The deflecting means 4 is constructed by a tenon type mirror in which a so-called tenon is formed in a top portion of a rotational shaft of this mirror. A face of the tenon parallel to a rotational axis of this mirror is set to a deflecting reflecting face. The rotational shaft of this mirror is rotated by a motor. The light beam from the light source 1 is set such that a principal ray of this light beam is incident to the deflecting reflecting face on a plane perpendicular to the rotational axis of the deflecting means 4. Accordingly, a face scanned by the principal ray of the light beam deflected by the deflecting means 4 at an equal angular velocity is in conformity with abeam deflecting face perpendicular to the above rotational axis.

The light beam deflected by the deflecting means 4 at the equal angular velocity is transmitted through a half mirror 5 and is then incident to a reflective image-forming element 6 as a concave mirror. When the deflected light beam is reflected on the reflective image-forming element 6, the deflected light beam is reflected on the half mirror 5 and is irradiated onto a surface of a recording medium 7. This irradiated light beam is converged by an image-forming action of the reflective image-forming element 6 as a light spot on a circumferential face of the recording medium 7. An optical scanning operation using the light spot is ideally performed on an optical scanning line L in accordance with deflection of the deflected light beam. Accordingly, a scanning line of the light spot is ideally in conformity with the optical scanning line L. However, in reality, the scanning line of the light spot is curved and shifted from the optical scanning line L. A scanned face in the present invention includes this optical scanning line L on a tangential plane on the circumferential face of the recording medium 7.

The reflective image-forming element 6 has a function for converging the deflected light beam onto the scanned face as a light spot. The reflective image-forming element 6 also has a function for substantially performing the optical scanning operation using the light spot at an equal speed. This function is fulfilled such that an error in the optical scanning operation shifted from the equal speed optical scanning operation using the light spot can be corrected by processing electric signals. As mentioned above, the light beam incident to the deflecting means 4 is formed as a linear image extending in the main scan-corresponding direction in the vicinity of the deflecting reflecting face. Accordingly, positions of the deflecting reflecting face and the scanned face are set by the reflective image-forming element 6 in a conjugate relation in geometrical optics in the cross scan-corresponding direction. Namely,i image-forming functions of the reflective image-forming element 6 in the main scan-corresponding direction and the cross scan-corresponding direction are different from each other so that the reflective image-forming element 6 is anamorphic.

The reflective image-forming element 6 has a mirror face shape formed as follows. Namely, the mirror face of the reflective image-forming element 6 has a shape represented by the following general formula on a face which is determined by an optical axis of the reflective image-forming element as a symmetrical axis of the mirror face and is also determined by a straight line perpendicular to this optical axis and parallel to the main scan-corresponding direction.

$$Y^2 = 2R_m X - (K+1)X^2$$

In this formula, X designates a coordinate in a direction of the optical axis and Y designates a coordinate in a direction perpendicular to the optical axis with a position on the optical axis as an origin. Further, $R_m$ designates a radius of curvature of the mirror face on the optical axis and K designates a conical constant. The above face determined by the optical axis of the reflective image-forming element and the straight line is called a main symmetrical face in the following description. A three-dimensional shape of the mirror face is formed as a concave barrel type face by rotating the shape represented by the above formula in a state in which an axis separated by a distance $R_S$ from the mirror face on the optical axis and perpendicular to the optical axis on the main symmetrical face is set to a rotational axis of the mirror face. Accordingly, the shape of the mirror face of the reflective image-forming element 6 is determined by three parameters of $R_m$, $R_S$ and K. The mirror face of the reflective image-forming element has a shape represented by the above general formula. Such contents mean that the shape of the mirror face is substantially represented by the above general formula.

Figure 1B:
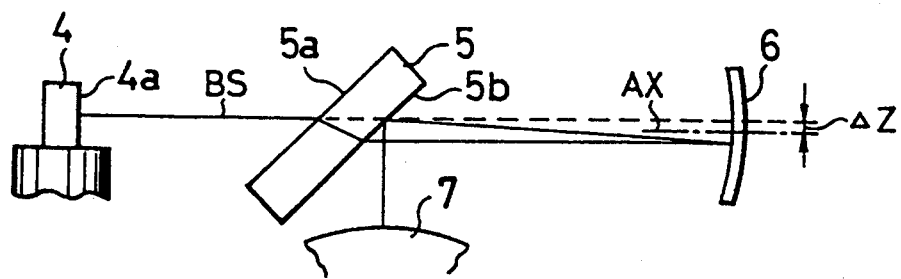

FIG. 1b schematically shows only a main portion of the optical scanner in an embodiment in which the first structure of the present invention is used in the optical scanner shown in FIG. 1a. A beam deflecting face BS is conformity with a virtual plane formed by performing the scanning operation using a principal ray of the light beam ideally deflected by the deflecting means 4.

The half mirror 5 is arranged between the deflecting means 4 and the reflective image-forming element 6. A face 5b of the half mirror 5 on a side of the reflective image-forming element 6 is constructed by a semi-transparent mirror face and is inclined with respect to the beam deflecting face BS. The deflected light beam is transmitted through the half mirror 5 and is reflected on the reflective image-forming element 6. The deflected light beam is then reflected on the semi-transparent mirror face formed as the face 5b of the half mirror 5 and is converged as a light spot on the recording medium 7.

In the embodiment shown in FIG. 1b, an optical axis AX of the reflective image-forming element 6 is parallel to the beam deflecting face BS. The entire reflective image-forming element 6 is shifted by a shifting amount $\Delta Z$ in a direction perpendicular to the beam deflecting face BS. Since the optical axis AX of the reflective image-forming element 6 is parallel to the beam deflecting face BS in this case, the shifting amount $\Delta Z$ is a shifting amount of the optical axis AX with respect to the beam deflecting face BS and is set to be positive (+) on an upper side of the beam deflecting face BS in FIG. 1b.

For example, the above three parameters determining the shape of the mirror face of the reflective image-forming element 6 are set to $R_m = -277$ mm, $R_S = -91$ mm and $K = -0.33$. Further, the half mirror 5 has a refractive index $n = 1.51118$ and a thickness $t = 7$ mm. The half mirror 5 is inclined an inclination angle $\alpha = 45$ degrees with respect to the beam deflecting face BS. This inclination angle $\alpha$ is equal to an angle formed between the normal line of a mirror face 5a parallel to the mirror face 5b and the beam deflecting face BS. A distance $L_0$ from the deflecting reflecting face 4a to the reflective image-forming element 6 is set to 87.42 mm and an optical scanning width S is set to 216 mm.

In this case, When the shifting amount $\Delta Z$ of the reflective image-forming element 6 is set to zero, the curve of a scanning line caused by the light spot is provided as shown in FIG. 2a. Namely, there is almost no problem about the curve of the scanning line in the vicinity of a central portion of an optical scanning region. However, the scanning line is greatly curved in both end portions of the optical scanning region so that this curve prevents a suitable optical scanning operation.

CONCRETE EXAMPLE 1

The half mirror and the reflective image-forming element mentioned above are used. As shown in FIG. 1b, the reflective image-forming element 6 is arranged in a state in which the reflective image-forming element 6 is shifted by the shifting amount $\Delta Z$ in a direction perpendicular to the beam deflecting face BS. When the shifting amount $\Delta Z$ is set to $-0.36$ mm, the curve of a scanning line is reduced and set to be relatively small in the entire optical scanning region as shown in FIG. 2b so that this curve of the scanning line is preferably corrected.

Figure 1C:
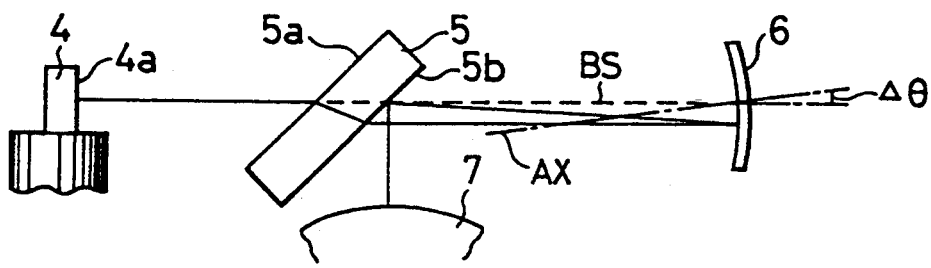

FIG. 1c schematically shows only a main portion of the optical scanner in an embodiment in which the second structure of the present invention is used in the optical scanner shown in FIG. 1a. An intersecting point of the mirror face and the optical axis AX of the reflective image-forming element 6 is located on the beam deflecting face BS. The optical axis AX of the reflective image-forming element 6 is inclined a tilt or inclination angle $\Delta\theta$ with respect to the beam deflecting face BS. This tilt angle $\Delta\theta$ is set to be positive (+) when the mirror face of the reflective image-forming element 6 is rotated in the clockwise direction.

CONCRETE EXAMPLE 2

The half mirror and the reflective image-forming element are equal to those in the Concrete example 1. In this Concrete example 2, the inclination angle $\alpha=45$ degrees, the distance $L_0=87.42$ mm and the optical scanning width $S=216$ mm are set. The tilt angle $\Delta\theta$ of the reflective image-forming element 6 is set to $-0.22$ degrees. In this case, the curve of a scanning line is provided as shown in FIG. 2c. Accordingly, similar to the Concrete example 1, the curve of the scanning line is preferably corrected.

The above the parameters determining the shape of the mirror face of the reflective image-forming element 6 are set to $R_m=-218.6$ mm, $R_S=-109.4$ mm and $K=-1.89$. Further, the half mirror 5 has a refractive index $n=1.51118$ and a thickness $t=8.4$ mm. The half mirror 5 is inclined an inclination angle $\alpha=56$ degrees with respect to the beam deflecting face BS. The distance $L_0$ from the deflecting reflecting face 4a to the reflective image-forming element 6 is set to 66.1 mm and the optical scanning width S is set to 216 mm.

In this case, When the shifting amount $\Delta Z$ of the reflective image-forming element 6 from the beam deflecting face BS is set to zero and the tilt angle $\Delta\theta$ is set to zero, a scanning line of the light spot is curved as shown in FIG. 3a. Namely, the scanning line is rapidly curved from a portion near a central portion of an optical scanning region toward both end portions of the optical scanning region so that this curve prevents a suitable optical scanning operation.

CONCRETE EXAMPLE 3

In the above condition, similar to the above Concrete example 1, the reflective image-forming element 6 is shifted by a shifting amount $\Delta Z=+0.33$ mm in a direction perpendicular to the beam deflecting face BS. At this time, as shown in FIG. 3b, the curve of a scanning line is reduced and set to be relatively small in the entire optical scanning region so that this curve of the scanning line is preferably corrected.

CONCRETE EXAMPLE 4

In the above condition described in the Concrete example 3, similar to the Concrete example 2, the optical axis of the reflective image-forming element 6 is inclined a tilt angle $\Delta\theta=+0.17$ degrees with respect to the beam deflecting face BS. The curve of a scanning line is provided as shown in FIG. 3c so that this curve of the scanning line is preferably corrected.

Figure 1D:
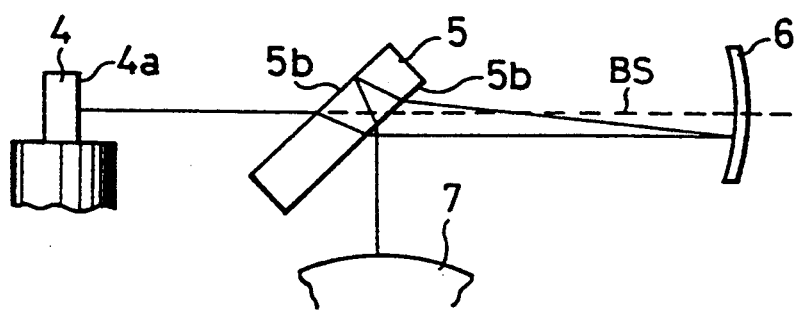

In the above Concrete examples, the face 5b of the half mirror 5 on a side of the reflective image-forming element 6 is set to a semi-transparent mirror face. FIG. 1d schematically shows only a main portion of the optical scanner in an embodiment in which the third structure of the present invention is used in the optical scanner shown in FIG. 1a. In FIG. 1d, a face 5a of the half mirror 5 on a side of the deflecting means 4 is constructed by a semi-transparent mirror face. An optical axis of the reflective image-forming element 6 is located on the beam deflecting face BS.

Similar to the Concrete examples 1 and 2 the above three parameters determining the shape of the mirror face of the reflective image-forming element 6 are set to $R_m=-277$ mm, $R_S=-91$ mm and $K=-0.33$. Further, the half mirror 5 has a refractive index $n=1.51118$ and a thickness $t=3.5$ mm. The half mirror 5 is inclined an inclination angle $\alpha=45$ degrees with respect to the beam deflecting face BS. The distance $L_0$ from the deflecting reflecting face 4a to the reflective image-forming element 6 is set to 87.42 mm and the optical Scanning width S is set to 216 mm.

Figure 4A:
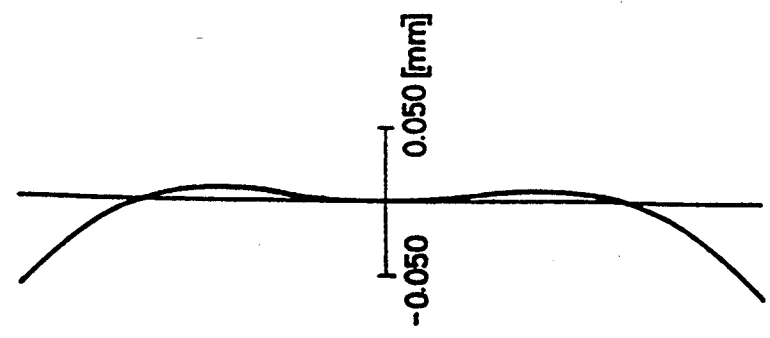
FIGS. 4a and 4b are diagrams for explaining effects of correction of the curve of a scanning line in a concrete example of the third structure of the present invention.

In this condition, the semi-transparent mirror face of the half mirror 5 is located on a side of the reflective image-forming element 6 and the shifting amount $\Delta Z$ and the tilt angle $\Delta\theta$ are set to zero. In this case, the curve of a scanning line is provided as shown in FIG. 4a.

CONCRETE EXAMPLE 5

Figure 4B:
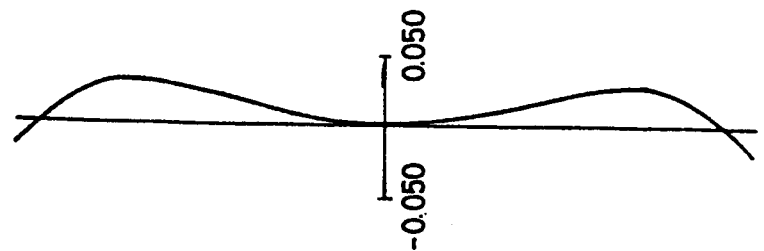

In the above condition, the semi-transparent mirror face of the half mirror 5 is arranged on a side of the deflecting means 4 as shown in FIG. 1d. The curve of a scanning line is improved as shown in FIG. 4b. When the semi-transparent mirror face of the half mirror 5 is arranged on a side of the deflecting means 4, a deflected light beam is transmitted through the semi-transparent mirror face and is then transmitted three times through the half mirror. Accordingly, it is possible to increase an optical path of the light beam within the half mirror 5 so that the length of an entire optical path of the light beam is increased. Simultaneously, as shown in FIG. 4b, the curve of a scanning line is effectively corrected.

In this case, as shown in the Concrete example 5, the curve of the scanning line is improved even when no reflective image-forming element 6 is shifted and inclined. The curve of the scanning line can be commonly corrected by directing the semi-transparent mirror face of the half mirror on the side of the deflecting means and shifting or inclining the reflective image-forming element 6.

For example, the above three parameters determining the shape of the mirror face of the reflective image-forming element 6 are set to $R_m=-252$ mm, $R_S=-96$ mm and $K=-1.0$. Further, the half mirror 5 has a refractive index $n=1.51118$ and a thickness $t=3.2$ mm. The half mirror 5 having the semi-transparent mirror face is inclined an inclination angle $\alpha=45$ degrees with respect to the beam deflecting face BS. The distance $L_0$ from the deflecting reflecting face 4a to the reflective image-forming element 6 is set to 76.5 mm and the Optical scanning width S is set to 216 mm.

Figure 5A:
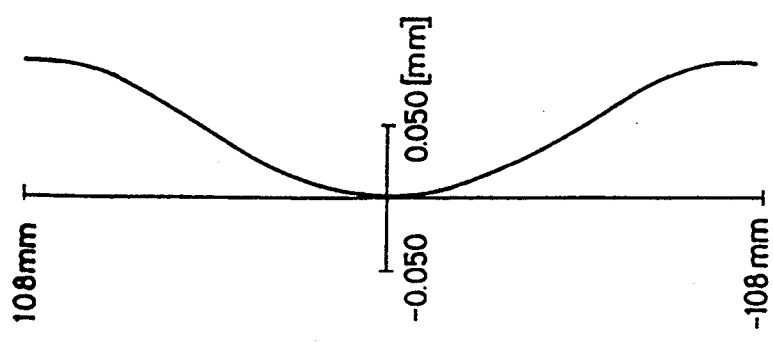
FIGS. 5a, 5b and 5c are diagrams for explaining effects of correction of the curve of a scanning line in a concrete example of each of the fourth and fifth structures of the present invention.

In such a condition, the shifting amount $\Delta Z$ and the tilt angle $\Delta \theta$ of the reflective image-forming element 6 are set to zero. Further, the semi-transparent mirror face of the half mirror 5 is located on a side of the reflective image-forming element 6. In this case, the curve of a scanning line is provided as shown in FIG. 5a.

CONCRETE EXAMPLE 6

Figure 5B:
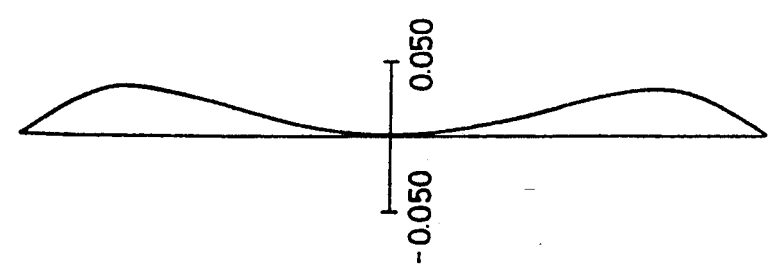

At this time, When the semi-transparent mirror face of the half mirror 5 is located on a side of the deflecting means and the reflective image-forming element 6 is shifted by a shifting amount $\Delta Z = +0.25$ mm from the beam deflecting face, the curve of s scanning line is provided as shown in FIG. 5b so that this curve is preferably improved.

CONCRETE EXAMPLE 7

Figure 5C:
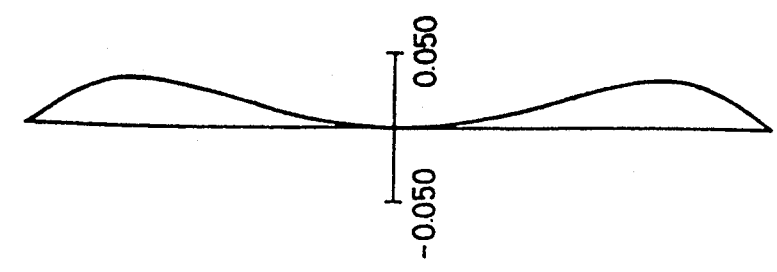

In the above condition described in the Concrete example 6, the curve of a scanning line is also preferably improved as shown in FIG. 5c when the reflective image-forming element is inclined a tilt angle $\Delta \theta = +0.15$ degrees instead of the shift in position of the reflective image-forming element.

To correct the curve of the scanning line, it is possible to incline the reflective image-forming element 6 with respect to the beam deflecting face BS and shift the reflective image-forming element 6 in a direction perpendicular to the beam deflecting face BS.

Figure 6A:
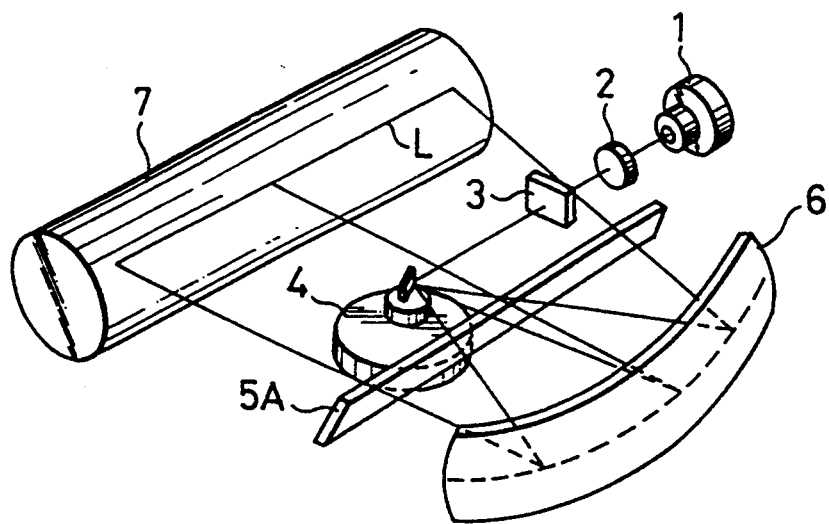
FIGS. 6a and 6b are views for explaining an embodiment of an optical scanner having each of eighth to fourteenth structures of the present invention.

FIG. 6a schematically shows only a main portion of an optical scanner having each of eighth to fourteenth structures in accordance with one embodiment of the present invention. For brevity, constructional portions similar to those in FIG. 1a are designated by the same reference numerals.

A light beam is emitted from a light source 1 and a lens 2 having positive refracting power restrains the light beam from being diverged. The light beam is transmitted through the lens 2 and is changed to one of parallel, convergent and divergent light beams in accordance with the refracting power and an arrangement of the lens 2. In this embodiment, the light beam transmitted through the lens 2 is set to the divergent light beam. The divergent light beam transmitted through the lens 2 is converged by a cylindrical lens 3 only in a cross scan-corresponding direction. The divergent light beam is then focused and formed As a linear image extending in a main scan-corresponding direction in the vicinity of a deflecting reflecting face of a deflecting means 4.

The light beam deflected by the deflecting means 4 is then incident to a reflective image-forming element 6 through a plane parallel plate 5A. When the deflected light beam is reflected on the reflective image-forming element 6, the light beam is changed to a reflected light beam. The reflected light beam is irradiated onto a surface of a recording medium 7 and is converged as a light spot on a circumferential face of the recording medium 7 by an image-forming action of the reflective image-forming element 6. An optical scanning operation using the light spot is ideally performed on an optical scanning line L in accordance with deflection of the deflected light beam. Accordingly, a scanning line of the light spot is ideally in conformity with the optical scanning line L. However, in reality, the scanning line of the light spot is generally curved and shifted from the optical scanning line L.

Similar to the above reflective image-forming element 6 explained with reference to FIG. 1a, the reflective image-forming element 6 is constructed by an anamorphic concave mirror 6 having a concave barrel type face The shape of a mirror face of the reflective image-forming element 6 is determined by the above-mentioned three parameters of $R_m$, $R_S$ and K.

As mentioned above, the light beam incident to the deflecting means 4 is formed as a linear image extending in the main scan-corresponding direction in the vicinity of the deflecting reflecting face. The reflective image-forming element 6 sets positions of the deflecting reflecting face and a scanned face in a conjugate relation in geometrical optics in the cross scan-corresponding direction. Accordingly, this embodiment is also an embodiment of an optical scanner having a fourteenth structure.

Figure 6B:
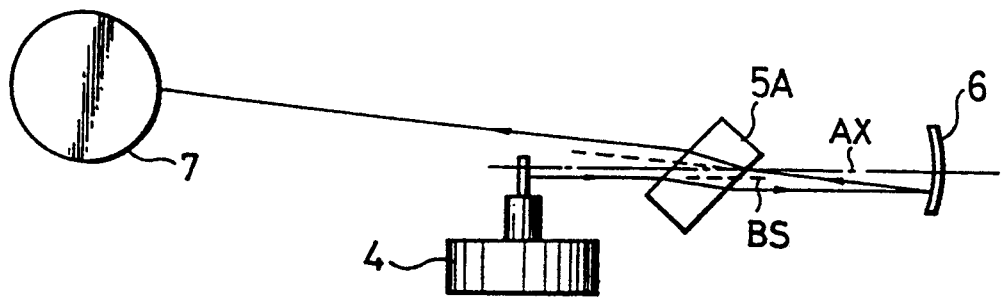

FIG. 6b shows an optical path of the light beam from the deflecting means 4 to the recording medium 7 in the optical scanner shown in FIG. 6a seen from the main scan-corresponding direction. The shape of a mirror face of the reflective image-forming element 6 shown in FIG. 6b is formed by an arc having a radius $R_S$. Reference numeral BS designates a beam deflecting face. Reference numeral AX designates an optical axis of the reflective image-forming element 6. This optical axis AX is parallel to the beam deflecting face BS. Accordingly, a tilt or inclination angle $\Delta \theta$ is equal to zero.

The light beam deflected by the deflecting means 4 is transmitted through a plane parallel plate 5A and is incident to the reflective image-forming element 6. When the light beam is reflected on the reflective image-forming element 6, the light beam is transmitted through the plane parallel plate 5A and a recording medium 7 is optically scanned by this light beam. Accordingly, this embodiment is also an embodiment of an optical scanner having a ninth structure.

Figure 7:
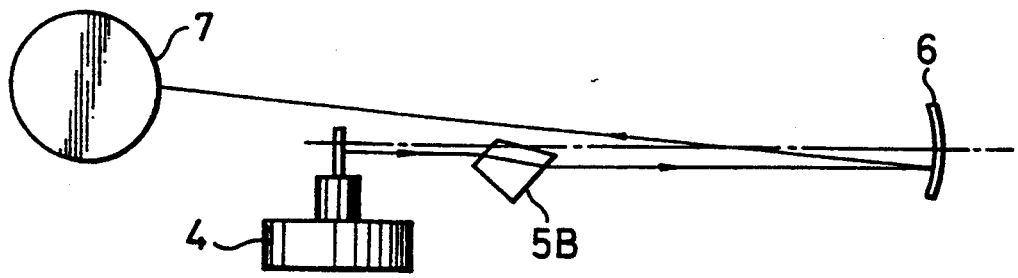
FIG. 7 is a view for explaining a modified embodiment of the optical scanner having each of the eighth to fourteenth structures of the present invention.
Figure 8:
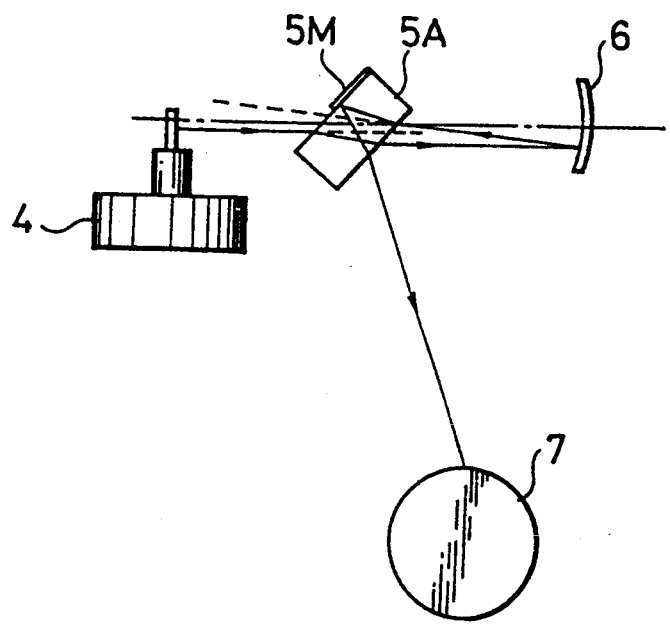
FIG. 8 is a view for explaining another modified embodiment of the optical scanner having each of the eighth to fourteenth structures of the present invention.
Figure 9:
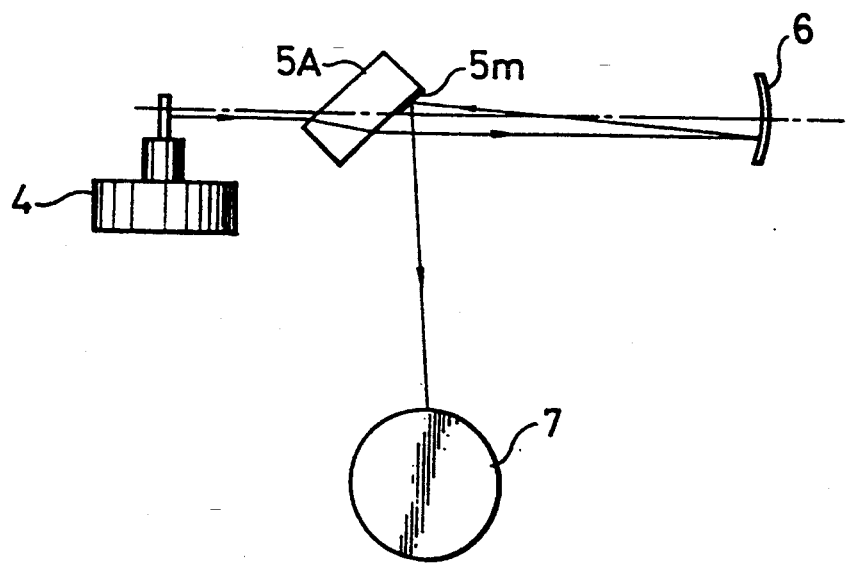
FIG. 9 is a view for explaining another modified embodiment of the optical scanner having each of the eighth to fourteenth structures of the present invention.
Figures 14A, 14B, 15A, 15B:
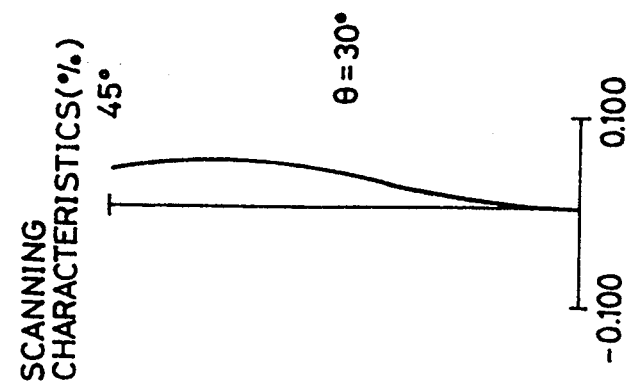
FIGS. 14a and 14b are diagrams respectively showing field curvature and scanning characteristics with respect to Concrete example 12.
FIGS. 15a and 15b are diagrams respectively showing field curvature and scanning characteristics with respect to Concrete example 13.
Figures 18A, 18B:
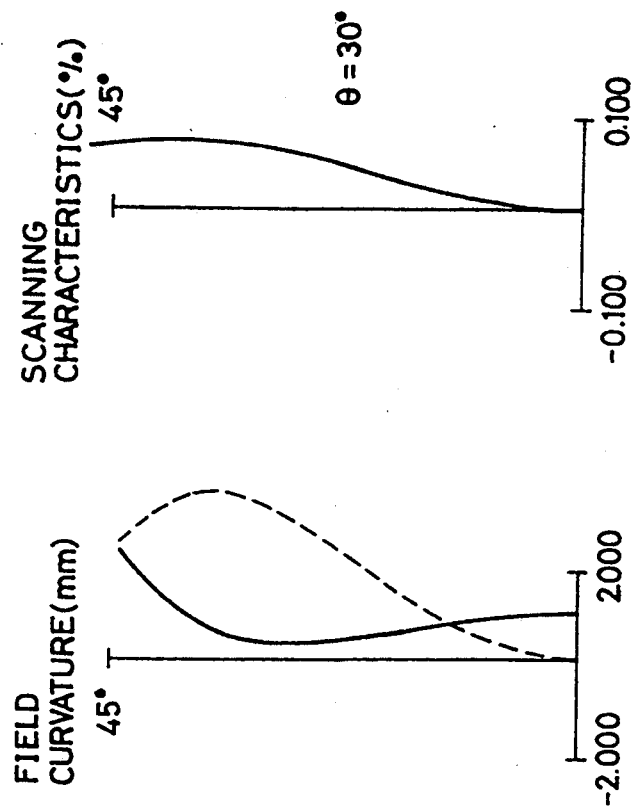
FIGS. 18a and 18b are diagrams respectively showing field curvature and scanning characteristics with respect to Concrete example 16.
Figures 19A, 19B:
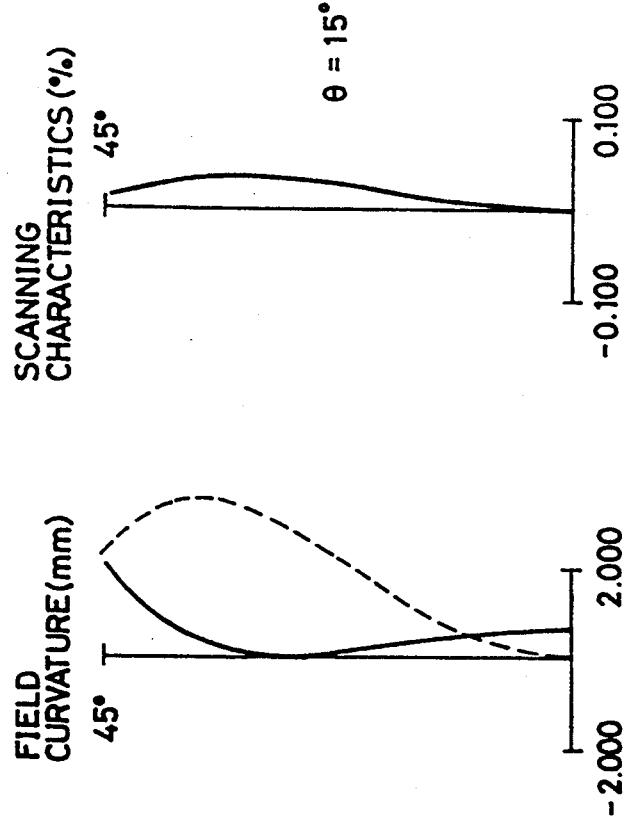
FIGS. 19a and 19b are diagrams respectively showing field curvature and scanning characteristics with respect to Concrete example 17.
Figures 20A, 20B, 21A, 21B:
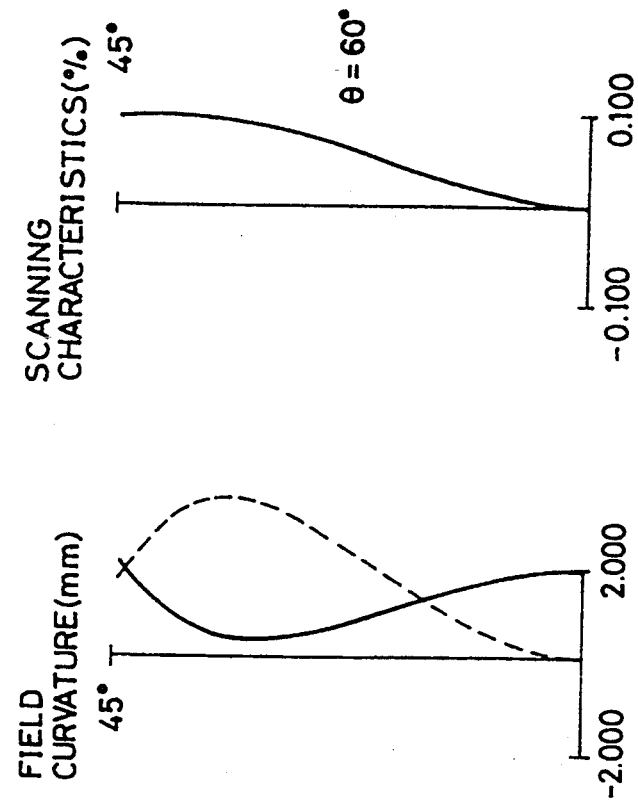
FIGS. 20a and 20b are diagrams respectively showing field curvature and scanning characteristics with respect to Concrete example 17.
FIGS. 21a and 21b are diagrams respectively showing field curvature and scanning characteristics with respect to Concrete example 19.
Figures 24A, 24B, 25A, 25B:
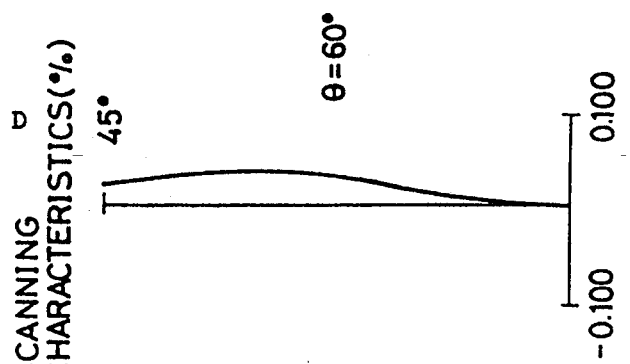
FIGS. 24a and 24b are diagrams respectively showing field curvature and scanning characteristics with respect to Concrete example 22.
FIGS. 25a and 25b are diagrams respectively showing field curvature and scanning characteristics with respect to Concrete example 23.
Figures 26A, 26B, 27A, 27B:
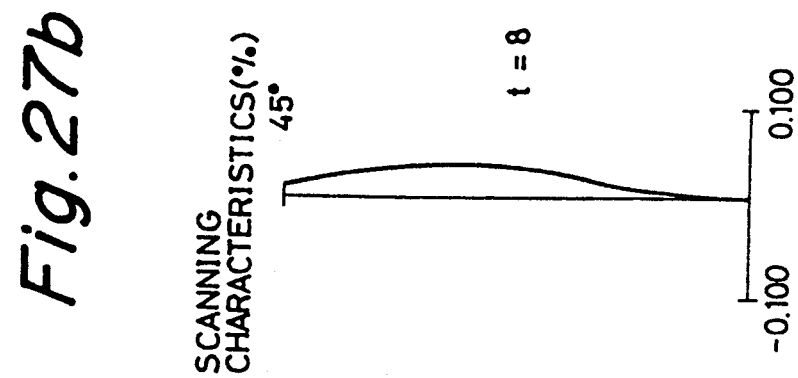
FIGS. 26a and 26b are diagrams respectively showing field curvature and scanning characteristics with respect to Concrete example 24.
FIGS. 27a and 27b are diagrams respectively showing field curvature and scanning characteristics with respect to Concrete example 25.

FIGS. 7 to 9 show modified embodiments of the optical scanner. For brevity, constructional portions similar to those in FIGS. 6a and 6b are designated by the same reference numerals. In each of these modified embodiments, an optical arrangement of the optical path of a light beam from a light source to a deflecting means is similar to that shown in FIGS. 6a and 6b. Further, similar to the embodiment shown in FIGS. 6a and 6b, the positions of a deflecting reflecting face and a scanned face are approximately set by a reflective image-forming element 6 in a conjugate relation in geometrical optics with respect to a cross-scan corresponding direction.

The modified embodiment shown in FIG. 7 is an embodiment of an optical scanner having a tenth structure. A plane parallel plate 5B is arranged such that only a deflected light beam toward the reflective image-forming element 6 is transmitted through the plane parallel plate 5B.

The modified embodiment shown in FIG. 8 is an embodiment of an optical scanner having a twelfth structure. In FIG. 8, a reflecting film 5M is formed in a face portion of a plane parallel plate 5A on the side of a deflecting means 4. A light beam reflected on a reflective image-forming element 6 is transmitted through the plane parallel plate 5A and is then reflected on the reflecting film 5M. The reflected light beam is again transmitted through the plane parallel plate 5A toward a recording medium 7.

The modified embodiment shown in FIG. 9 is an embodiment of an optical scanner having a thirteenth structure. In FIG. 9 a reflecting film 5m is formed in a face portion of a plane parallel plate 5A on the side of a reflective image-forming element 6. A light beam reflected on the reflective image-forming element 6 is reflected on the reflecting film 5m and is transmitted toward a recording medium 7.

A concrete example of an optical scanning operation will next be described in the optical scanner in each of the embodiments shown in FIGS. 6 to 9. In each of these concrete examples, a shape of the reflective image-forming element 6 is specified by providing the above three parameters $R_m$, $R_S$ and K. A material of the plane parallel plate is specified by a refractive index n and a shape of the plane parallel plate is specified by a thickness t. An arranging form of the plane parallel plate is specified by providing an inclination angle $\alpha$ from a direction parallel to a rotational axis of the deflecting means. In all the concrete examples the refractive index n of the plane parallel plate is set to 1.51118. In this case, a beam deflecting face is set to a plane.

A light beam from a light source is changed to a divergent light beam by a lens 2. A distance $S_0$ between a starting point of divergence of this divergent light beam and a mirror face of the reflective image-forming element 6 is provided. The starting point of divergence of the divergent light beam is located in a position in geometrical optics in which it is considered that the divergent light beam begins to be diverged. When the distance $S_O$ is set, a position of the light source in a main scan-corresponding direction is determined with respect to a deflected light beam incident to the reflective image-forming element 6. The above starting point of divergence of the divergent light beam is located in a position before the mirror face of the reflective image-forming element 6. Accordingly, this distance $S_0$ is shown by a negative distance.

In the following Concrete examples 8 to 30, an optical axis of the reflective image-forming element 6 is parallel to a beam deflecting face. A distance between the above optical axis of the reflective image-forming element 6 and the beam deflecting face is provided as a "shifting amount" of the reflective image-forming element. A distance $L_0$ from the above starting point of deflection to the reflective image-forming element is set to 66.1079 mm in the Concrete examples 8 to 30. An arranging form of the reflective image-forming element is determined by the above shifting amount and the distance $L_0$. A "separating amount" shows a distance between the beam deflecting face and a reflected light beam in the position of a deflecting reflecting face or on any one of faces of the plane parallel plate. A "curve of scanning line" shows a maximum value of a shift between the actual scanning line and the above-mentioned optical scanning line L.

First Concrete examples 8 to 19 are concrete examples in the embodiment shown in FIGS. 6a and 6b. The separating amount shows a distance between the beam deflecting face in the position of the deflecting reflecting face and the reflected light beam.

CONCRETE EXAMPLE 8 t=4 mm, $\alpha$=15°, $S_0$=−314.089, K=−1.87, $R_m$=−223.0, $R_s$=−110.5, shifting amount: 0.41 mm, separating amount=0.91 mm, curve of scanning line=4 μm

CONCRETE EXAMPLE 9 t=4 mm, $\alpha$=30°, $S_0$=−314.089, K=−1.87, $R_m$=−223.0, $R_s$=−110.5, shifting amount: 0.71 mm, separating amount=1.75 mm, curve of scanning line=11 μm

CONCRETE EXAMPLE 10 t=4 mm, $\alpha$=45°, $S_0$=−314.089, K=−1.87, $R_m$=−223.0, $R_s$=−110.5, shifting amount: 0.70 mm, separating amount=2.36 mm, curve of scanning line=21 μm

CONCRETE EXAMPLE 11 t=4 mm, $\alpha$=60°, $S_0$=−314.089, K=−1.89, $R_m$=−223.0, $R_s$=−110.63, shifting amount: 0.00 mm, separating amount=2.35 mm curve of scanning line=31 μm

CONCRETE EXAMPLE 12 t=8 mm, $\alpha$=15°, $S_0$=−292.339, K=−1.85, $R_m$=−218.7, $R_s$=−108.8, shifting amount: 0.86 mm, separating amount=1.84 mm, curve of scanning line=7 μm

CONCRETE EXAMPLE 13 t=8 mm, $\alpha$=30°, $S_0$=−292.339, K=−1.85, $R_m$=−218.6, $R_s$=−108.0, shifting amount: 1.50 mm, separating amount=3.50 mm, curve of scanning line=19 μm

CONCRETE EXAMPLE 14 t=8 mm, $\alpha$=45°, $S_0$=−292.339, K=−1.88, $R_m$=−218.6, $R_s$=−108.2, shifting amount: 1.48 mm, separating amount=4.72 mm, curve of scanning line=40 μm

CONCRETE EXAMPLE 15 t=8 mm, $\alpha$=60°, $S_0$=−292.339, K=−1.81, $R_m$=−218.8, $R_s$=−108.7, shifting amount: 0.11 mm, separating amount=4.69 mm, curve of scanning line=62 μm

CONCRETE EXAMPLE 16 t=12 mm, $\alpha$=15°, $S_0$=−249.97, K=−1.81, $R_m$=−210.0, $R_s$=−105.5, shifting amount: 1.42 mm, separating amount=2.94 mm, curve of scanning line=6 μm

CONCRETE EXAMPLE 17 t=12 mm, $\alpha$=30°, $S_0$=−259.68, K=−1.83, $R_m$=−211.6, $R_s$=−104.2, shifting amount: 2.50 mm, separating amount=5.70 mm, curve of scanning line=24 μm

CONCRETE EXAMPLE 18 t=12 mm, $\alpha$=45°, $S_0$=−286.93, K=−1.86, $R_m$=−216.5, $R_s$=−104.2, shifting amount: 2.47 mm, separating amount=7.41 mm, curve of scanning line=60 μm

CONCRETE EXAMPLE 19 t=12 mm, $\alpha$=60°, $S_0$=−292.339, K=−1.89, $R_m$=−217.2, $R_s$=−105.1, shifting amount: 0.38 mm, separating amount=7.20 mm, curve of scanning line=93 μm The following Concrete examples 20 to 23 are concrete examples in the embodiment shown in FIG. 8. The separating amount shows a distance between a beam deflecting face of the plane parallel plate on a side of the deflecting means and a reflected light beam.

CONCRETE EXAMPLE 20

$t=8$ mm, $\alpha=15°$, $S_0=-292.339$, $K=-1.85$, $R_m=-218.7$, $R_s=-108.7$, shifting amount: 0.95 mm, separating amount=1.32 mm, curve of scanning line=8 μm

CONCRETE EXAMPLE 21

$t=8$ mm, $\alpha=30°$, $S_0=-292.339$, $K=-1.86$, $R_m=-218.6$, $R_s=-107.9$, shifting amount: 1.67 mm, separating amount=2.47 mm, curve of scanning line=23 μm

CONCRETE EXAMPLE 22

$t=8$ mm, $\alpha=45°$, $S_0=-292.339$, $K=-1.89$, $R_m=-218.6$, $R_s=-107.9$, shifting amount: 1.72 mm, separating amount=3.12 mm, curve of scanning line=45 μm

CONCRETE EXAMPLE 23

$t=8$ mm, $\alpha=60°$, $S_0=-292.339$, $K=-1.91$, $R_m=-218.8$, $R_s=-108.0$, shifting amount: 0.40 mm, separating amount=2.93 mm, curve of scanning line=66 μm The following Concrete examples 24 to 26 are concrete examples of an optical scanner having an eleventh structure in the embodiment shown in FIGS. 6a and 6b in which the incident angle of a deflected light beam incident to the plane parallel plate is set to satisfy a Brewster angle. The separating amount shows a distance between a beam deflecting face in the position of a starting point of deflection and a reflected light beam.

CONCRETE EXAMPLE 24

$t=4$ mm, $\alpha=506°$, $S_0=-314.089$, $K=-1.89$, $R_m=-223.0$, $R_s=-110.65$, shifting amount: 0.24 mm, separating amount=2.42 mm, curve of scanning line=29 μm

CONCRETE EXAMPLE 25

$t=8$ mm, $\alpha=56.506°$, $S_0=-292.339$, $K=-1.89$, $R_m=-218.6$, $R_s=-109.0$, shifting amount: 0.58 mm, separating amount=4.81 mm, curve of scanning line=58 μm

CONCRETE EXAMPLE 26

$t=12$ mm, $\alpha=56.506°$, $S_0=-292.339$, $K=-1.88$, $R_m=-217.2$, $R_s=-105.6$, shifting amount: 1.05 mm, separating amount=7.55 mm, curve of scanning line=86 μm The following Concrete example 27 is a concrete example of an optical scanner having an eleventh structure in the embodiment shown in FIG. 8 in which the incident angle of a deflected light beam incident to the plane parallel plate is set to satisfy a Brewster angle. The separating amount shows a distance between a beam deflecting face of the plane parallel plate on a side of the deflecting means and a reflected light beam.

CONCRETE EXAMPLE 27

$t=8$ mm, $\alpha=56.506°$, $S_0=-292.339$, $K=-1.9$, $R_m=-218.6$, $R_s=-108.0$, shifting amount: 0.86 mm, separating amount=3.05 mm, curve of scanning line=62 μm The following Concrete examples 28 to 30 are concrete examples of the optical scanner in each of the embodiments shown in FIGS. 7 and 9. The separating amount shows a distance between a deflected light beam of the plane parallel plate on a side of the reflective image-forming element and a reflected light beam in the direction of a rotational axis of the deflecting means.

CONCRETE EXAMPLE 28

$t=12$ mm, $\alpha=30°$, $S_0=-292.339$, $K=-1.71$, $R_m=-218.8$, $R_s=-113.3$, shifting amount: 1.8 mm, separating amount=2.28 mm, curve of scanning line=37 μm

CONCRETE EXAMPLE 29

$t=12$ mm, $\alpha=45°$, $S_0=-292.339$, $K=-1.74$, $R_m=-218.8$, $R_s=-112.0$, shifting amount: 1.8 mm, separating amount=3.28 mm, curve of scanning line=83 μm

CONCRETE EXAMPLE 30

$t=12$ mm, $\alpha=60°$, $S_0=-292.339$, $K=-1.85$, $R_m=-219.5$, $R_s=-108.45$, shifting amount: 0.1 mm, separating amount=3.93 mm, curve of scanning line=83 μm Each of FIGS. 10a to 32a shows field curvature with respect to the above Concrete examples 8 to 30. Each of FIGS. 10b to 32b shows scanning characteristics with respect to the above Concrete examples 8 to 30. In each of the diagrams of field curvature shown in FIGS. 10a to 32a, a solid line shows a sagittal ray and a broken line shows a meridional ray. When the height of an ideal image is set to H(θ) at an angle θ of deflection of the deflected light beam and the real image height is set to H'(θ), the scanning characteristics are defined by the following formula.

$$[\{H'(\theta)-H(\theta)\}/H(\theta)]\times 100\%$$

The scanning Characteristics correspond to fθ characteristics of an fθ lens. In each of these Concrete examples, the field curvature and the scanning characteristics are preferable and the curve of a scanning line is equal to or smaller than 0.1 mm at its maximum as mentioned above so that the field curvature, the scanning characteristics and the curve of the scanning line are preferably corrected.

In each of the above Concrete examples, the shape of a mirror face of the reflective image-forming element is specified by three parameters $R_m$, $R_S$ and K. However, the present invention can be also applied to a case in which a reflective image-forming element having another shape of the mirror face is used.

Figure 33A:
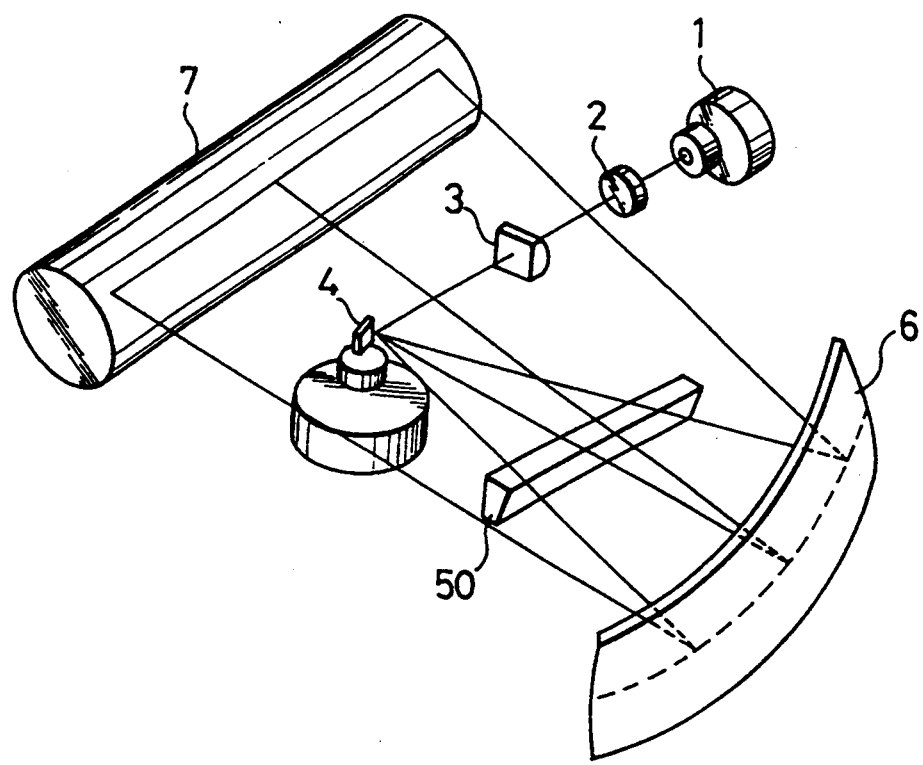
FIGS. 33a and 33b are views for explaining an optical scanner having each of fifteenth to nineteenth structures of the present invention.

FIG. 33a schematically shows only a main portion of one embodiment of an optical scanner having each of fifteenth to nineteenth structures of the present invention. For brevity, constructional portions similar to those in FIG. 1a are designated by the same reference numerals.

A light beam is emitted from a light source 1 and a lens 2 having positive refracting power restrains the light beam from being diverged. The light beam is transmitted through the lens 2 and is changed to one of parallel, convergent and divergent light beams in accordance with the refracting power and an arrangement of the lens 2. In this embodiment, the light beam transmitted through the lens 2 is set to the divergent light beam. The divergent light beam transmitted through the lens 2 is converged by a cylindrical lens 3 only in a cross scan-corresponding direction. The divergent light beam is then focused and formed as a linear image extending in a main scan-corresponding direction in the vicinity of a deflecting reflecting face of a deflecting means 4.

The light beam deflected by the deflecting means 4 is then incident to a reflective image-forming element 6 through an elongated prism 50. When the deflected light beam is reflected on the reflective image-forming element 6, the light beam is changed to a reflected light beam. The reflected light beam is irradiated onto a surface of a recording medium 7 and is converged as a light spot on a circumferential face of the recording medium 7 by an image-forming action of the reflective image-forming element 6. An optical scanning operation using the light spot is ideally performed on an optical scanning line L in accordance with deflection of the deflected light beam. Accordingly, a scanning line of the light spot is ideally in conformity with the optical scanning line L. However, in reality, the scanning line of the light spot is generally curved and shifted from the optical scanning line L.

Similar to the reflective image-forming element 6 explained with reference to FIG. 1a, the reflective image-forming element 6 is constructed by an anamorphic concave mirror 6 having a concave barrel type face. The shape of a mirror face of the reflective image-forming element 6 is determined by the above-mentioned three parameters of $R_m$, $R_S$ and K.

As mentioned above, the light beam incident to the deflecting means 4 is formed as a linear image extending in the main scan-corresponding direction in the vicinity of the deflecting reflecting face. The reflective image-forming element 6 sets positions of the deflecting reflecting face and a scanned face in a conjugate relation in geometrical optics in the cross scan-corresponding direction. Accordingly, this embodiment is also an embodiment of an optical scanner having a nineteenth structure.

Figure 33B:
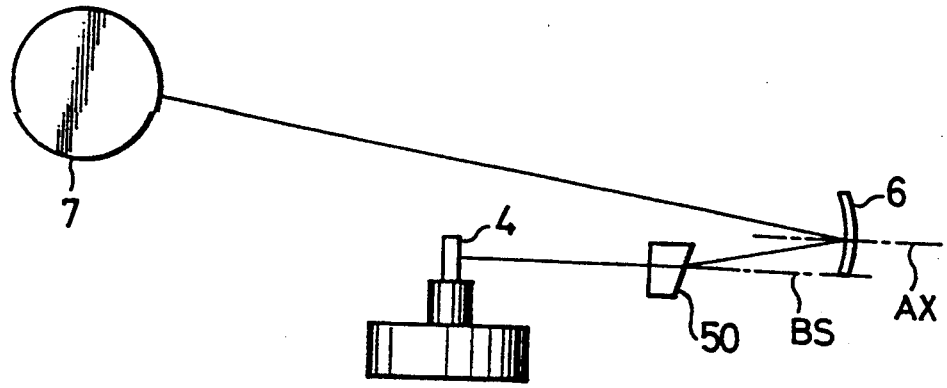

FIG. 33b shows an optical path of the light beam from the deflecting means 4 to the recording medium 7 in the optical scanner shown in FIG. 33a seen from the main scan-corresponding direction. The shape of a mirror face of the reflective image-forming element 6 shown in FIG. 33b is formed by an arc having a radius $R_S$. Reference numeral BS designates a beam deflecting face. Reference numeral AX designates an optical axis of the reflective image-forming element 6. This optical axis AX is parallel to the beam deflecting face BS. The light beam deflected by the deflecting means 4 is transmitted through the elongated prism 50 and is incident to the reflective image-forming element 6. When the light beam is reflected on the reflective image-forming element 6, a recording medium 7 is optically scanned by this light beam. The elongated prism 50 is arranged such that a longitudinal direction of this prism is parallel to the main scan-corresponding direction. A cross-sectional shape of the elongated prism 50 is set to a wedge shape. A face of the elongated prism 50 on a side of the deflecting means 4 is perpendicular to the beam deflecting face BS. Accordingly, a light emitting face of the elongated prism 50 is inclined with respect to the beam deflecting face BS.

Therefore, an emitting direction of the deflected light beam emitted from the elongated prism 50 is inclined by refraction on the light emitting face thereof with respect to the beam deflecting face BS. Accordingly, the light beam is incident to the reflective image-forming element 6 in a state in which this light beam is inclined with respect to the optical axis AX of the reflective image-forming element 6. Thus, optical paths of the incident light beam and a light beam reflected on the reflective image-forming element are separated from each other by forming an angle between the incident and reflected light beams in a direction perpendicular to the beam deflecting face. This direction is set to a vertical direction in FIG. 33b.

Figure 34A:
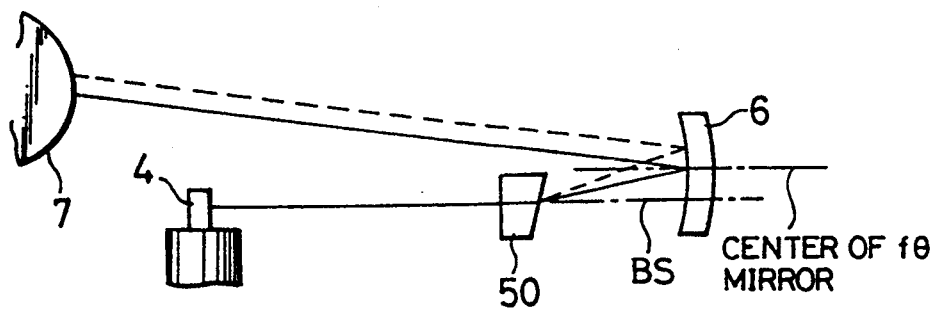
FIGS. 34a, 34b and 34c are diagrams for explaining effects of correction of the curve of a scanning line in an embodiment of the optical scanner having each of the sixteenth to nineteenth structures of the present invention.

FIG. 34a shows an incident position of the deflected light beam incident to the reflective image-forming element B in the optical arrangement of FIG. 33b when an angle of deflection of the deflected light beam is set to zero and a large angle. When the angle of deflection of the deflected light beam is set to zero, a direction of the deflected light beam transmitted from the deflecting means 4 toward the elongated prism 50 is parallel to the optical axis of the reflective image-forming element B and is shown by a solid line. When the angle of deflection of the deflected light beam is set to a large angle, the direction of the deflected light beam is shown by a broken line.

When the angle of deflection of the deflected light beam is set to zero, the deflected light beam refracted by the elongated prism 50 is incident to the reflective image-forming element 6 in a position of the optical axis thereof. An incident angle of the deflected light beam incident to the light emitting face of the elongated prism 50 is changed as the angle of deflection of the deflected light beam is increased. Accordingly, an angle of refraction of the light beam is also gradually changed on the light emitting face of the elongated prism 50. When the angle of deflection of the light beam is increased, the position of a light spot on a scanned face is shifted in the cross scan-corresponding direction as shown by a broken line in FIG. 34a so that the curve of a scanning line is increased.

Figure 34B:
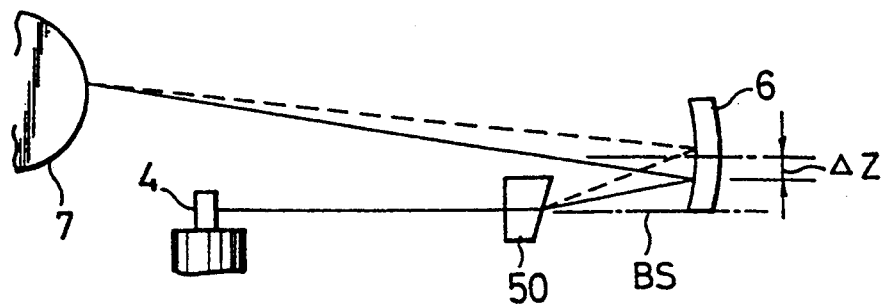

FIG. 34b shows one embodiment of an optical scanner having a sixteenth structure of the present invention. In this embodiment, the reflective image-forming element 6 is shifted from an arranging state thereof shown in FIG. 34a in a direction perpendicular to the beam deflecting face BS. An optical axis AX of the reflective image-forming element 6 parallel to the beam deflecting face BS is located between an incident position of the deflected light beam incident to the reflective image-forming element 6 at a zero angle of deflection and shown by a solid line, and an incident position of the deflected light beam incident to the reflective image-forming element 6 at a maximum angle of deflection and shown by a broken line in an effective optical scanning region. In accordance with such an arrangement, the curve of a scanning line is corrected.

Figure 34C:
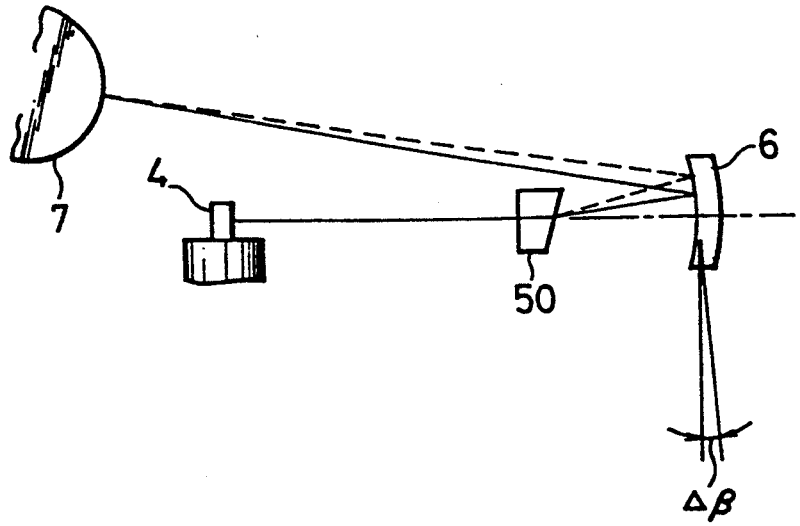

FIG. 34c shows one embodiment of an optical scanner having a seventeenth structure of the present invention. In this embodiment, the reflective image-forming element 6 is inclined from the arranging state thereof shown in FIG. 34a by an angle $\Delta\beta$ around a straight line which is parallel to a main scan-corresponding direction and passes through an intersecting point of a mirror face and an optical axis of the reflective image-forming element 6. This main scan-corresponding direction is set to a direction perpendicular to a paper face of FIG. 34c. In accordance with such an arrangement, the curve of a scanning line is corrected.

The following Concrete example 31 is a concrete example of the optical scanner having the sixteenth structure shown in FIG. 34b. A shape of the reflective image-forming element 6 is specified by the above-mentioned three parameters $R_m$, $R_S$ and K. The elongated prism 50 has a refractive index n, a thickness t and a vertical angle δ in an incident position of the deflected light beam incident to the reflective image-forming element. As mentioned above, reference numeral $L_0$ designates a distance from a starting point of deflection of the light beam deflected by the deflecting means to the reflective image-forming element 6. A writing width of the light beam in an optical scanning operation is set to 216 mm. In this embodiment, a shifting amount of the reflective image-forming element 6 is set to zero in the arranging state thereof in FIG. 34a. In FIG. 34a, a displacing amount of the reflective image-forming element 6 is set to be positive (+) when the reflective image-forming element 6 is displaced on an upper side.

CONCRETE EXAMPLE 31 t=4 mm, δ=10°, n=1.51118, $L_0$=6.6.11, K=−1.72, $R_m$=−222.0, $R_s$=−108.3, shifting amount: 6.45 mm The following Concrete example 32 is a concrete example of the optical scanner having the seventeenth structure shown in FIG. 34c. $R_m$, $R_S$, K, n, t and $L_0$ are similar to those in the Concrete example 30 with respect to meaning. The writing width of a light beam in an optical scanning operation is set to 216 mm. In this embodiment, a tilt or inclination angle of the reflective image-forming element is set to zero in the arranging state thereof in FIG. 34a and is set to be negative (−) then the reflective image-forming element 6 is inclined in the counterclockwise direction as shown in FIG. 34c.

CONCRETE EXAMPLE 32 t=4 mm, δ=10°, n=1.51118, $L_0$=66.11, K=−1.72, $R_m$=−222.0, $R_3$=−108.3, tilt angle: −3.4 degrees FIG. 35a shows the curve of a scanning line when a shifting amount and a tilt angle of the reflective image-forming element are set to be zero in each of the Concrete examples 31 and 32. FIGS. 35b and 35c show situations of the scanning line after the curve of the scanning line is corrected in each off the Concrete examples 31 and 32. It should be understood that the curve of the scanning line is effectively Corrected in each of the Concrete examples 31 and 32.

In the embodiment explained with reference to FIGS. 33a and 33b, the reflective image-forming element 6 is set to be anamorphic and sets positions of the deflecting reflecting face of the deflecting means ad the scanned face in a conjugate relation with respect to the cross scan-corresponding direction. Thus, an inclination of the deflecting reflecting face of the deflecting means is corrected.

Different from a rotary polygon mirror, the inclination of a reflecting face of the tenon type mirror explained as the deflecting means is relatively small. Accordingly, it is not necessary to really correct the inclination of the reflecting face in many cases. In such cases, it is not necessary to construct the reflective image-forming element as an anamorphic element. In accordance with an eighteenth structure of the present invention, a mirror face of the reflective image-forming element may be formed by a coaxial spherical or aspherical surface with symmetry of rotation around an optical axis of the reflective image-forming element.

The following Concrete example 33 is a concrete example of an optical scanner having the eighteenth structure of the present invention. The reflective image-forming element has a coaxial aspherical surface. A shape of the reflective image-forming element is specified by a radius R of curvature on the optical axis thereof and a conical constant K. Reference numerals n, t, 6 and $L_0$ are similar to those in the Concrete example 31 with respect to meaning. The writing width of a light beam in an optical scanning operation is set to 216 mm.

CONCRETE EXAMPLE 33 t=4 mm, δ=10°, n=1.51118, $L_0$=137.76, K=2.14, R=−387.0, shifting amount=29.62 mm In this Concrete example 33, when the shifting amount of the reflective image-forming element is set to zero, the reflective image-forming element having a coaxial aspherical surface is arranged as shown in FIG. 34a. In this case, the curve of a scanning line is large as shown in FIG. 36a. However, the curve of the scanning line can by effectively corrected and reduced as shown in FIG. 36b by setting the shifting amount of the reflective image-forming element to 29.62 mm as in the Concrete example 33 and arranging the reflective image-forming element as shown in FIG. 34b.

Figure 37A:
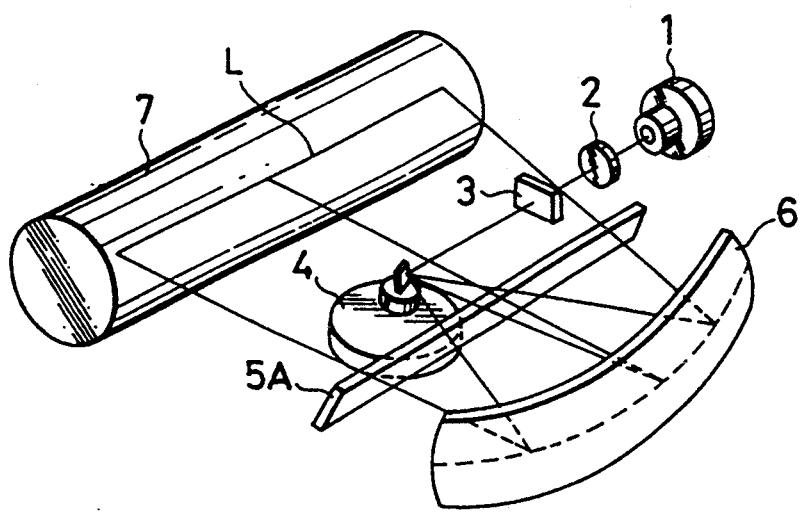
FIGS. 37a and 37b are views for explaining an embodiment of an optical scanner having each of twentieth to twenty-sixth structures of the present invention.

FIG. 37a schematically shows only a main portion of an optical scanner having each of twentieth to twenty-sixth structures in accordance with another embodiment of the present invention. For brevity, constructional portions similar to those in FIG. 6a are designated by the same reference numerals.

A light beam is emitted from a light source 1 and a lens 2 having positive refracting power restrains the light beam from being diverged. The light beam is transmitted through the lens 2 and is changed to one of parallel, convergent and divergent light beams in accordance with the refracting power and an arrangement of the lens 2. In this embodiment, the light beam transmitted through the lens 2 is set to the divergent light beam. The divergent light beam transmitted through the lens 2 is converged by a cylindrical lens 3 only in a cross scan-corresponding direction. The divergent light beam is then focused and formed as a linear image extending in a main scan-corresponding direction in the vicinity of a deflecting reflecting face of a deflecting means 4.

The light beam deflected by the deflecting means 4 is then incident to a reflective image-forming element 6 through a plane parallel plate 5A. When the deflected light beam is reflected on the reflective image-forming element 6, the light beam is changed to a reflected light beam. The reflected light beam is irradiated onto a surface of a recording medium 7 and is converged as a light spot on a circumferential face of the recording medium 7 by an image-forming action of the reflective image-forming element 6. A scanning line is generally curved and shifted from an optical scanning line L.

Similar to the above reflective image-forming element 6 explained with reference to FIG. 1a, the reflective image-forming element 6 is constructed by an anamorphic con, cave mirror 6 having a concave barrel type face. The shape of a mirror face of the reflective image-forming element 6 is determined by the above-mentioned three parameters of $R_m$, $R_S$ and K.

Similar to the embodiment shown in FIG. 6a, the light beam incident to the deflecting means 4 is formed as a linear image extending in the main scan-corresponding direction in the vicinity of the deflecting reflecting face. The reflective image-forming element 6 sets positions of the deflecting reflecting face and a scanned face in a conjugate relation in geometrical optics in the cross scan-corresponding direction. Accordingly, this embodiment is also an embodiment of an optical scanner having a twenty-sixth structure.

Figure 37B:
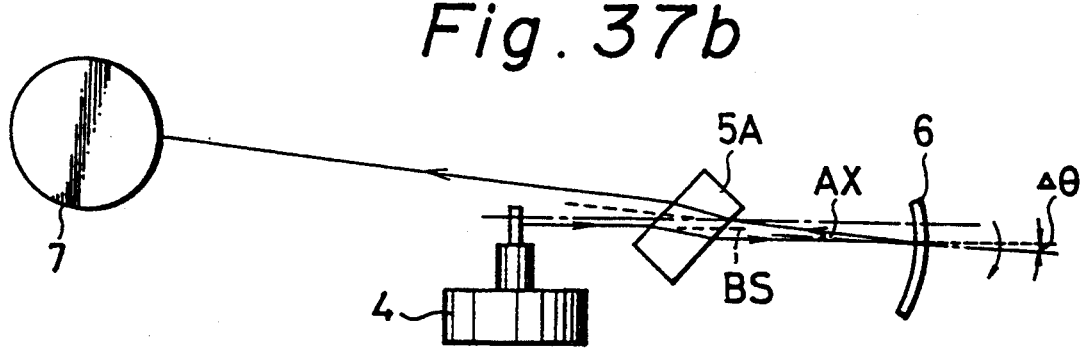

FIG. 37b shows an optical path of the light beam from the deflecting means 4 to the recording medium 7 in the optical scanner shown in FIG. 37a seen from the main scan-corresponding direction. The shape of a mirror face of the reflective image-forming element 6 shown in FIG. 37b is formed by an arc having a radius $R_S$. Reference numeral BS designates a beam deflecting face. Reference numeral AX designates an optical axis of the reflective image-forming element 6.

Different from the embodiment shown in FIGS. 6a and 6b, the optical axis AX in this embodiment is inclined a predetermined angle $\Delta\theta$ with respect to the beam deflecting face BS. The light beam deflected by the deflecting means 4 is transmitted through a plane parallel plate 5A and is incident to the reflective image-forming element 6. When the light beam is reflected on the reflective image-forming element 6, the light beam is transmitted through the plane parallel plate 5A and a recording medium 7 is optically scanned by this light beam. Accordingly, this embodiment is also an embodiment of an optical scanner having a twenty-first structure.

Figure 38:
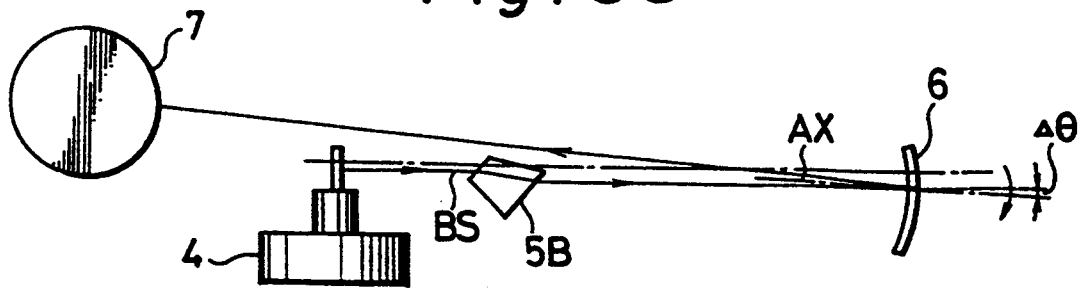
FIG. 38 is a view for explaining a modified embodiment of the optical scanner having each of the twentieth to twenty-sixth structures of the present invention.
Figure 39:
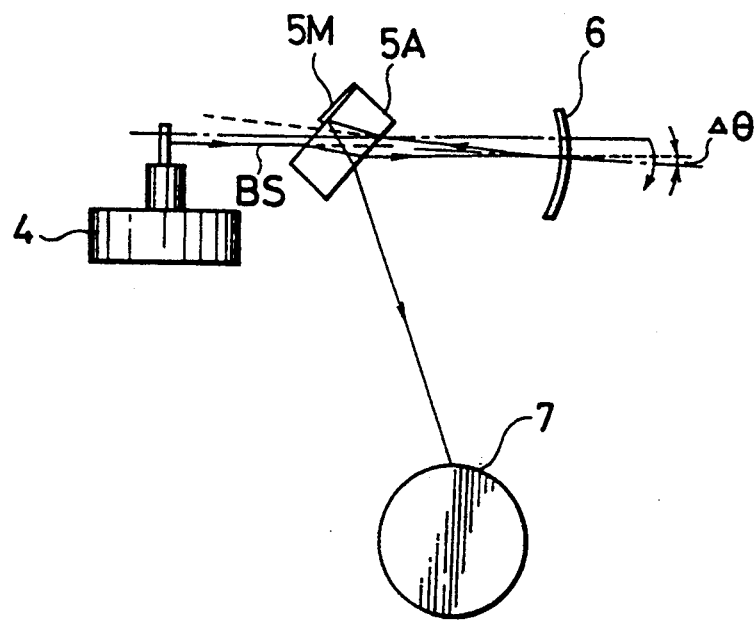
FIG. 39 is a view for explaining another modified embodiment of the optical scanner having each of the twentieth to twenty-sixth structures of the present invention.
Figure 40:
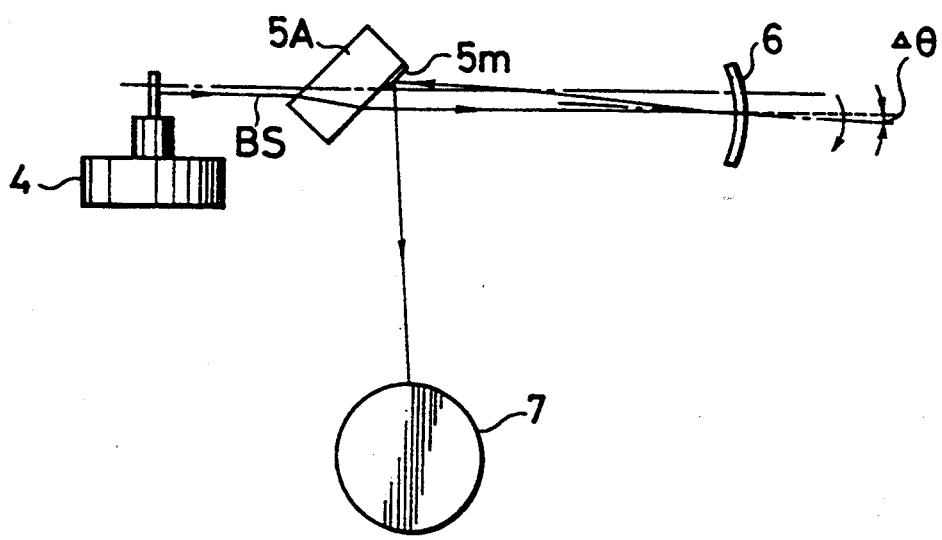
FIG. 40 is a view for explaining another modified embodiment of the optical scanner having each of the twentieth to twenty-sixth structures of the present invention.
Figure 41A:
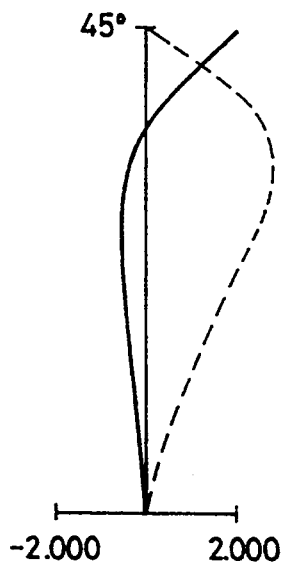
FIGS. 41a and 41b are diagrams respectively showing field curvature and, scanning characteristics with respect to Concrete example 34 and a broken line shows field curvature in a main scanning direction and a solid line shows field curvature in a cross scanning direction.
Figure 41B:
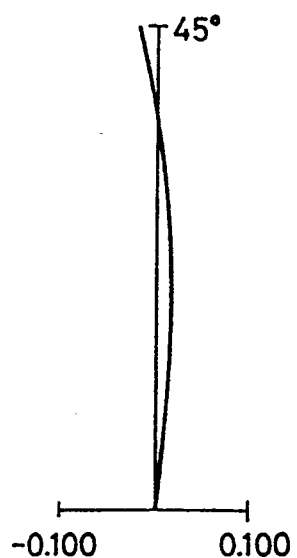
Figure 42A:
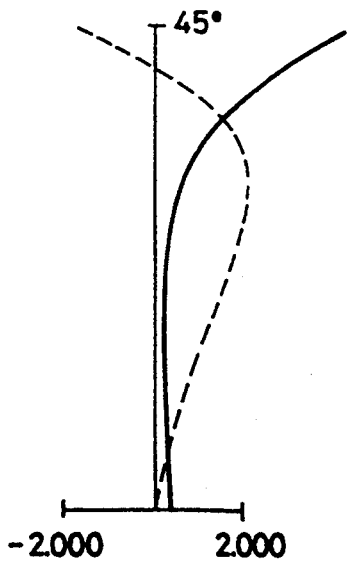
FIGS. 42a and 42b are diagrams respectively showing field curvature and scanning characteristics with respect to Concrete example 35.
Figure 42B:
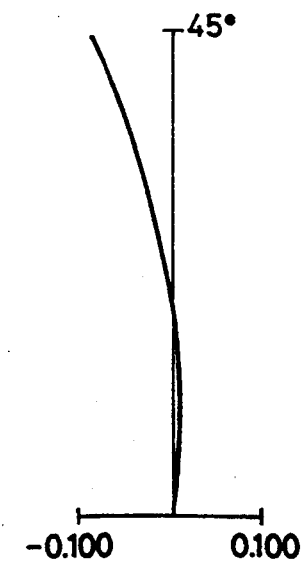
Figure 43A:
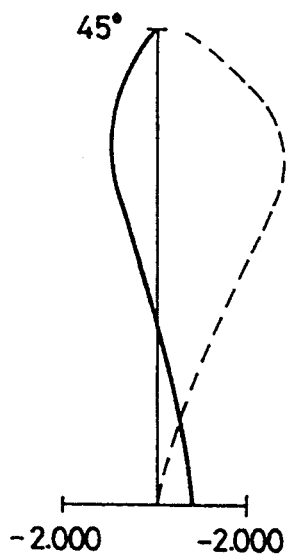
FIGS. 43a and 43b are diagrams respectively showing field curvature and scanning characteristics with respect to Concrete example 36.
Figure 43B:
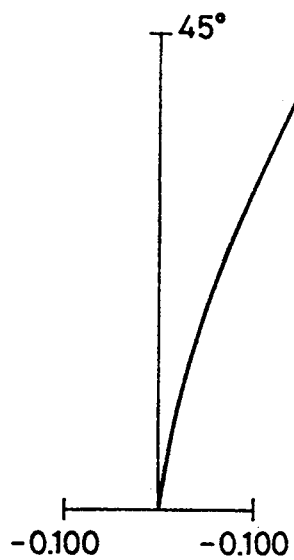
Figure 44A:
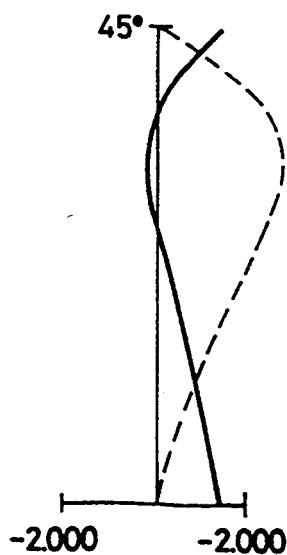
FIGS. 44a and 44b are diagrams respectively showing field curvature and scanning characteristics with respect to Concrete example 37.
Figure 44B:
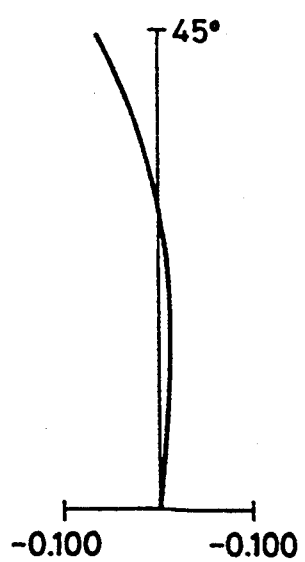
Figure 45A:
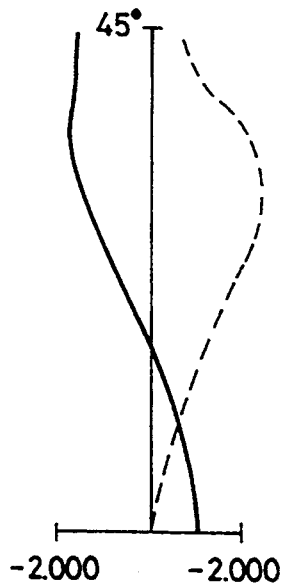
FIGS. 45a and 45b are diagrams respectively showing field curvature and scanning characteristics with respect to Concrete example 38.
Figure 45B:
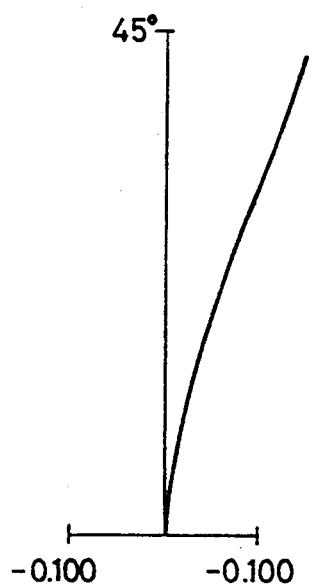
Figure 46A:
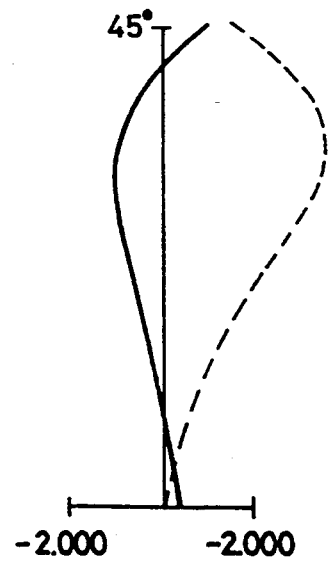
FIGS. 46a and 46b are diagrams respectively showing field curvature and scanning characteristics with respect to Concrete example 39.
Figure 46B:
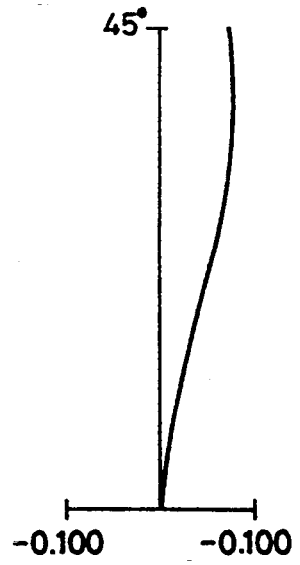
Figure 47A:
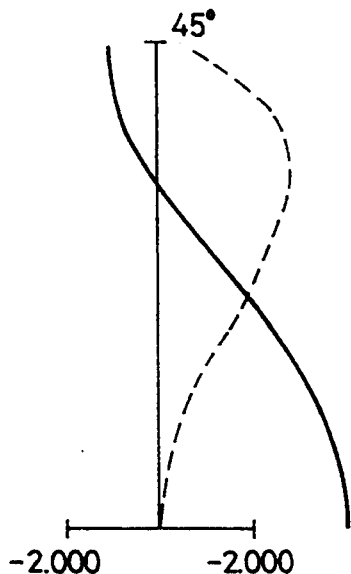
FIGS. 47a and 47b are diagrams respectively showing field curvature and scanning characteristics with respect to Concrete example 40.
Figure 47B:
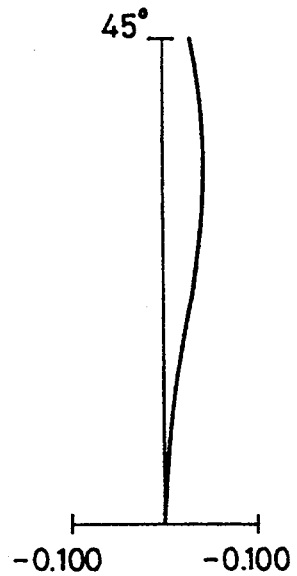
Figure 48A:
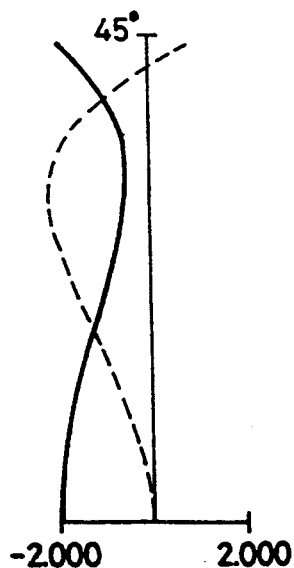
FIGS. 48a and 48b are diagrams respectively showing field curvature and scanning characteristics with respect to Concrete example 41.
Figure 48B:
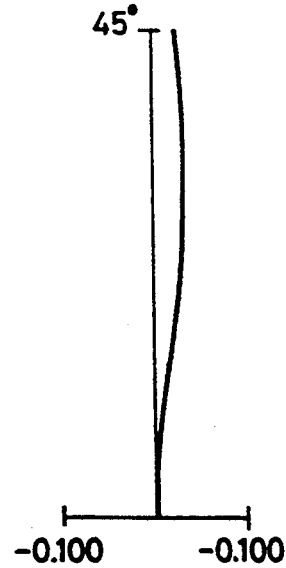
Figure 49A:
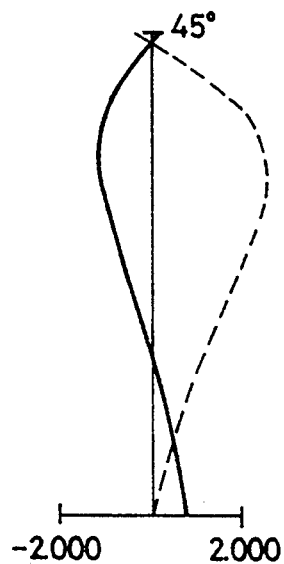
FIGS. 49a and 49b are diagrams respectively showing field curvature and scanning characteristics witch respect to Concrete example 42.
Figure 49B:
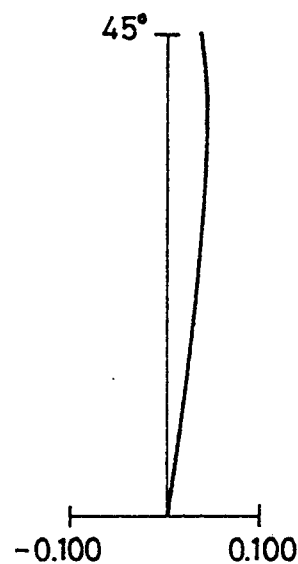
Figure 50A:
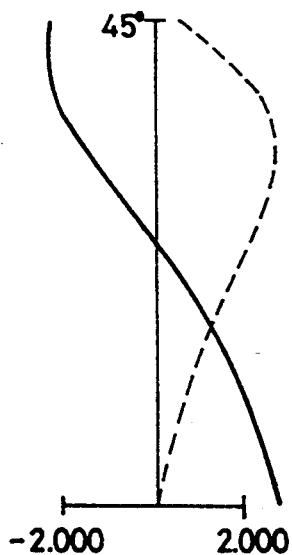
FIGS. 50a and 50b are diagrams respectively showing field curvature and scanning characteristics with respect to Concrete example 43.
Figure 50B:
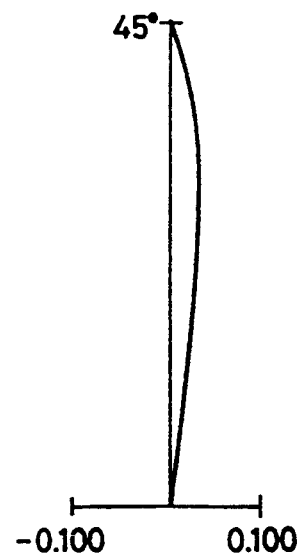

FIGS. 38 to 40 show modified embodiments of the optical scanner. For brevity, constructional portions similar to those in FIGS. 37a and 37b are designated by the same reference numerals. In each of these modified embodiments, an optical arrangement of the optical path of a light beam from a light source to a deflecting means is similar to that shown in FIGS. 37a and 37b. Further, similar to the embodiment shown in FIGS. 37a and 37b, the positions of a deflecting reflecting face and a scanned face are approximately set by a reflective image-forming element 6 in a conjugate relation in geometrical optics with respect to a cross-scan corresponding direction.

The modified embodiment shown in FIG. 38 is an embodiment of an optical scanner having a twenty-second structure. A plane parallel plate 5B is arranged such that only a deflected light beam toward the reflective image-forming element 6 is transmitted through the plane parallel plate 5B.

The modified embodiment shown in FIG. 39 is an embodiment of an optical scanner having a twenty-fourth structure. In FIG. 39, a reflecting film 5M is formed in a face portion of a plane parallel plate 5A on the side of a deflecting means 4. A light beam reflected on a reflective image-forming element 6 is transmitted through the plane parallel plate 5A and is then reflected on the reflecting film 5M. The reflected light beam is again transmitted through the plane parallel plate 5A toward a recording medium 7.

The modified embodiment shown in FIG. 40 is an embodiment of an optical scanner having a twenty-fifth structure. In FIG. 40, a reflecting film 5m is formed in a face portion of a plane parallel plate 5A on the side of a reflective image-forming element 6. A light beam reflected on the reflective image-forming element 6 is reflected on the reflecting film 5m and is transmitted toward a recording medium 7.

A concrete example of an optical scanning operation will next be described in the optical scanner in each of the embodiments shown in FIGS. 37 to 40. In each or these concrete examples, a shape of the reflective image-forming element 6 is specified by providing the above three parameters $R_m$, $R_S$ and K. A material of the plane parallel plate is specified by a refractive index n and a shape of the plane parallel plate is specified by a thickness t. An arranging form of the plane parallel plate is specified by providing an inclination angle $\alpha$ from a direction parallel to a rotational axis of the deflecting means. In all the concrete examples, the refractive index n of the plane parallel plate is set to 1.51118.

A light beam from a light source is changed to a divergent light beam by a lens 2. A distance $S_0$ between a starting point of divergence of this divergent light beam and a mirror face of the reflective image-forming element 6 is provided. The starting point of divergence of the divergent light beam is located in a position in geometrical optics in which it is considered that the divergent light beam begins to be diverged. When the distance $S_0$ is set, a position of the light source in a main scan-corresponding direction is determined with respect to a deflected light beam incident to the reflective image-forming element 6. The above starting point of divergence of the divergent light beam is located in a position before the mirror face of the reflective image-forming element 6. Accordingly, this distance $S_0$ is shown by a negative distance.

In the following Concrete examples 34 to 43, an optical axis of the reflective image-forming element 6 is inclined a tilt or inclination angle $\Delta\theta$ ( unit: degree ) with respect to a beam deflecting face. A distance from the above starting point of deflection to the reflective image-forming element is set to $L_0$. An arranging form of the reflective image-forming element is determined by the tilt angle $\Delta\theta$ and the distance $L_0$.

A "separating amount" shows a distance between the beam deflecting face and a reflected light beam in the position of a deflecting reflecting face or 0n any one of faces of the plane parallel plate. A "curve of scanning line" shows a maximum value of a shift between the actual scanning line and the above-mentioned optical scanning line L.

First Concrete examples 34 to 39 are concrete examples in the embodiment shown in FIGS. 37a and 37b. In these concrete examples, the separating amount shows a distance between the beam deflecting face in the position of the deflecting reflecting face and the reflected light beam.

CONCRETE EXAMPLE 34 t=4 mm, $\alpha=15°$, $S_0=-306.11$, $L_0=66.11$, K=−1.87, $R_m=-223.0$, $R_s=-110.5$, $\Delta\theta=0.4$, separating amount=1.0 mm, curve of scanning line=7 μm

CONCRETE EXAMPLE 35 t=4 mm, $\alpha=60°$, $S_0=-296.11$, $L_0=66.11$, K=−1.89, $R_m=-221.2$, $R_s=-109.7$, $\Delta\theta=1.1$, separating amount=2.4 mm, curve of scanning line=27 m

CONCRETE EXAMPLE 36 t=8 mm, $\alpha=1.5°$, $S_0=-296.11$, $L_0=66.11$, K=−1.89, $R_m=-218.7$, $R_s=-108.8$, $\Delta\theta=0.8$, separating amount=1.8 mm, curve of scanning line=22 μm

CONCRETE EXAMPLE 37 t=8 mm, $\alpha=60°$, $S_0=-296.11$, $L_0=66.11$, K=−1.86, $R_m=-218.8$, $R_s=-108.7$, $\Delta\theta=2.20$, separating amount=4.6 mm, curve of scanning line=54 μm

CONCRETE EXAMPLE 38 t=12 mm, $\alpha=15°$, $S_0=-296.61$, $L_0=68.61$, K=−1.77, $R_m=-218.0$, $R_s=-109.05$, $\Delta\theta=1.2$, separating amount=2.7 mm, curve of scanning line=6 μm

CONCRETE EXAMPLE 39

$t=12$ mm, $\alpha=60°$, $S_0 296.11$, $L_0=66.11$, $K=-1.87$, $R_m=-217.2$, $R_s=-105.1$, $\Delta\theta=3.6$, separating amount=7.3 mm, curve of scanning line=54 μm The following Concrete examples 40 and 41 are concrete examples in the embodiment shown in FIG. 39. In these concrete examples, the separating amount shows a distance between the beam deflecting face of the plane parallel plate 5A on a side of the deflecting means and the reflected light beam.

CONCRETE EXAMPLE 40

$t=8$ mm, $\alpha=30°$, $S_0=-292.339$, $L_0=66.11$, $K=-1.86$, $R_m=-218.6$, $R_s=-111.2$, $\Delta\theta=1.63$, separating amount=2 mm, curve of scanning line=23 μm

CONCRETE EXAMPLE 41

$t=8$ mm, $\alpha=60°$, $S_0 292.339$, $L_0=66.11$, $K=-1.91$, $R_m=-218.6$, $R_s=-108.0$, $\Delta\theta=2.4$, separating amount=3 mm, curve of scanning line=65 μm The following Concrete example 42 is a concrete example of an optical scanner having a twenty-third structure in the embodiment shown in FIGS. 37a and 37b in which the incident angle of a deflected light beam incident to the plane parallel plate is set to satisfy a Brewster angle. In this concrete example, the separating amount shows a distance between the beam deflecting face in the position of a starting point of deflection and the reflected light beam.

CONCRETE EXAMPLE 42

$t=8$ mm, $\alpha=56.506°$, $S_0=-296.11$, $L_0=66.11$, $K=-1.89$, $R_m=-218.6$, $R_s=-109.0$, $\Delta\theta=2.25$, separating amount=4.8 mm, curve of scanning line=44 μm The following Concrete example 43 is a concrete example of the optical scanner in the embodiment shown in FIG. 38. The separating amount shows a distance between the deflected light beam of the plane parallel plate on a side of the reflective image-forming element and the reflected light beam in a direction perpendicular to the beam deflecting face.

CONCRETE EXAMPLE 43

$t=12$ mm, $\alpha=45°$, $S_0=-299.11$, $L_0=66.11$, $K=-1.74$, $R_m=-218.8$, $R_s=-112.0$, $\Delta\theta 2.9$, separating amount=5.0 mm, curve of scanning line=54 μm Each of FIGS. 41a to 50a shows field curvature with respect to the above Concrete examples 34 to 43. Each of FIGS. 41b to 50b shows scanning characteristics with respect to the above Concrete examples 34 to 43. In each of these Concrete examples 34 to 43, the field curvature and the scanning characteristics are preferably corrected and the curve of a scanning line is equal to or smaller than 0.1 mm at its maximum so that the field curvature, the scanning characteristics and the curve of the scanning line are preferably corrected.

Figure 51A:
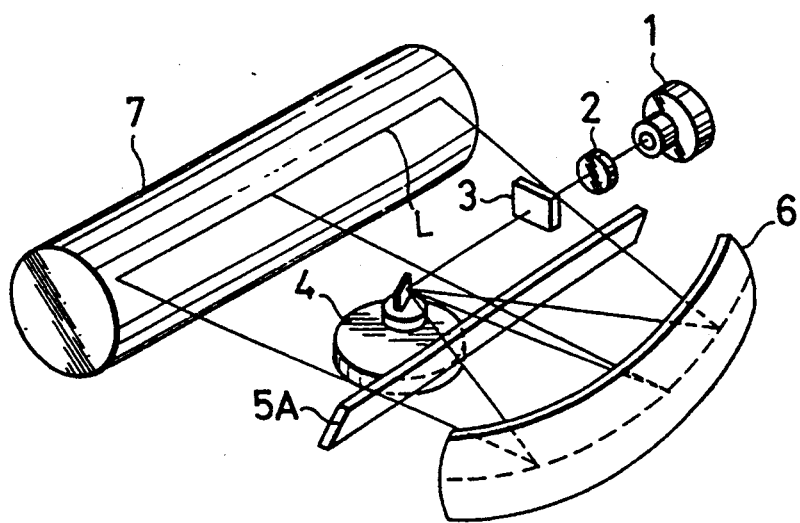
FIGS. 51a and 51b are views for explaining an embodiment of an optical scanner having a twenty-seventh structure of the present invention.

FIG. 51a schematically shows only a main portion of an optical scanner having a twenty-seventh structure in accordance with another embodiment of the present invention. For brevity, constructional portions similar to those in FIG. 37a are designated by the same reference numerals.

A light beam is emitted from a light source 1 and a lens 2 having positive refracting power restrains the light beam from being diverged. The light beam is transmitted through the lens 2 and is changed to one of parallel, convergent and divergent light beams in accordance with the refracting power and an arrangement of the lens 2. In this embodiment, the light beam transmitted through the lens 2 is set to the divergent light beam. The divergent light beam transmitted through the lens 2 is converged by a cylindrical lens 3 only in a cross scan-corresponding direction. The divergent light beam is then focused and formed as a linear image extending in a main scan-corresponding direction in the vicinity of a deflecting reflecting face of a deflecting means 4.

The light beam deflected by the deflecting means 4 is then incident to a reflective image-forming element 6 through a plane parallel plate 5A. When the deflected light beam is reflected on the reflective image-forming element 6, the light beam is changed to a reflected light beam. The reflected light beam is irradiated onto a surface of a recording medium 7 and is converged as a light spot on a circumferential face of the recording medium 7 by an image-forming action of the reflective image-forming element 6. A scanning line is generally curved and shifted from an optical scanning line L.

Similar to the above reflective image-forming element 6 explained with reference to FIG. 1a, the reflective image-forming element 6 is constructed by an anamorphic concave mirror 6 having a concave barrel type face. The shape of a mirror face of the reflective image-forming element 6 is determined by the above-mentioned three parameters of $R_m$, $R_S$ and K.

Similar to the embodiment shown in FIG. 37a, the light beam incident to the deflecting means 4 is formed as a linear image extending in the main scan-corresponding direction in the vicinity of the deflecting reflecting face. The reflective image-forming element 6 sets positions of the deflecting reflecting face and a scanned face in a conjugate relation in geometrical optics in the cross scan-corresponding direction. Accordingly, this embodiment is also an embodiment of an optical scanner having a thirty-fifth structure.

Figure 51B:
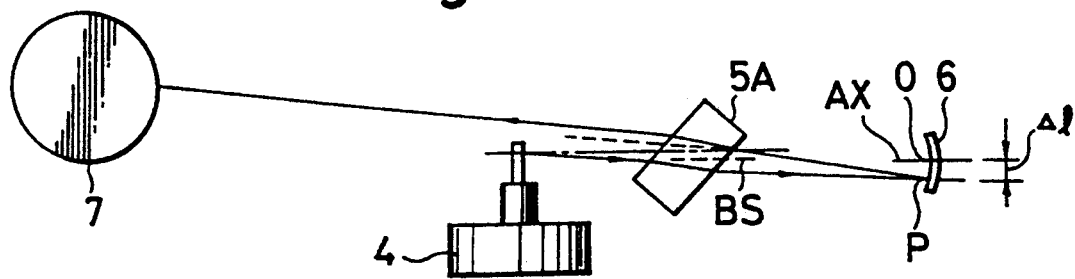

FIG. 51b shows an optical path of the light beam from the deflecting means 4 to the recording medium 7 in the optical scanner shown in FIG. 51a seen from the main scan-corresponding direction. The shape of a mirror face of the reflective image-forming element 6 shown in FIG. 51b is formed by an arc having a radius $R_S$. Reference numeral BS designates a beam deflecting face. Reference numeral AX designates an optical axis of the reflective image-forming element 6.

Different from the embodiment shown in FIGS. 37a and 37b, a light beam from a light source in this embodiment is slantingly incident to the beam deflecting face BS. As mentioned above, a shifting amount of the light beam is used as an index representing the relative relation between the reflective image-forming element and an inclination of the light beam incident to the deflecting reflecting face from the light source with respect to the beam deflecting face.

As shown in FIG. 51b, a deflected light beam is incident to a reflecting face of the reflective image-forming element 6 through a plane parallel plate 5A. The shifting amount of the light beam is shown by a unit of mm and is set to $\Delta 1$. This $\Delta 1$ is a distance between an incident position P of the light beam and a central portion O of the reflective image-forming element 6 when the height of an image of a light spot on a scanned face is set to zero. This central portion O is located at an intersecting point of the optical axis AX and the reflecting face of the reflective image-forming element. The shifting amount is set to be positive when the incident position P is located below the central portion O.

The light beam deflected by the deflecting means 4 is transmitted through the plane parallel plate 5A and is incident to the reflective image-forming element 6. When the light beam is reflected on the reflective image-forming element 6, the light beam is transmitted through the plane parallel plate 5A and the recording medium 7 is optically scanned by this light beam. Accordingly, this embodiment is also an embodiment of an optical scanner having a thirtieth structure.

Figure 52:
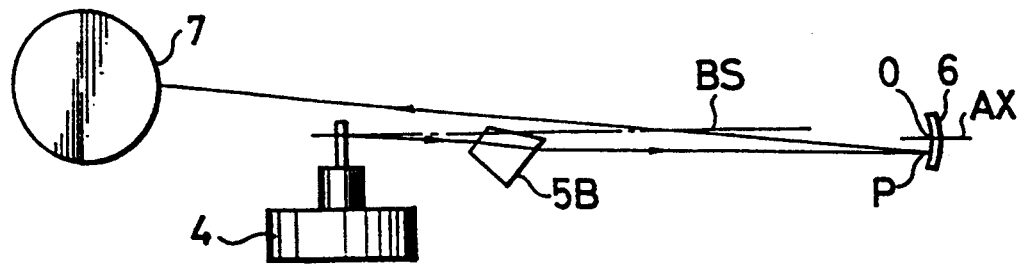
FIG. 52 is a view for explaining a modified embodiment of an optical scanner having a thirtieth structure of the present invention.
Figure 53:
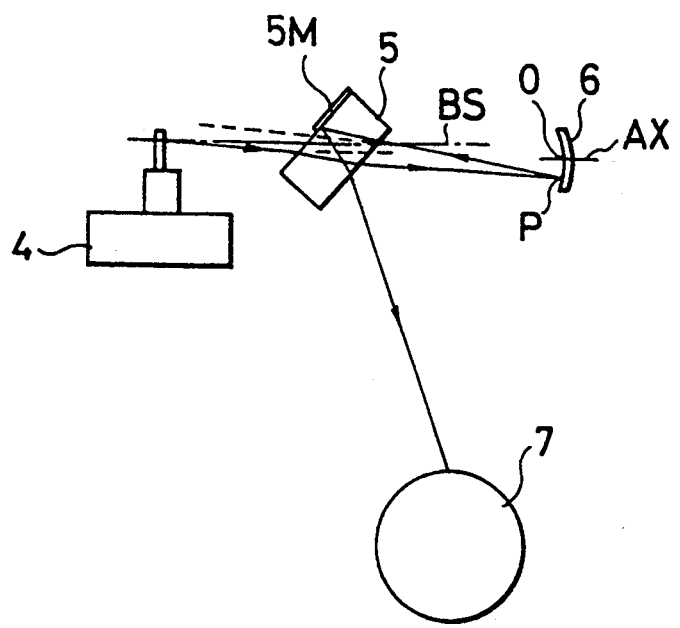
FIG. 53 is a view for explaining another modified embodiment of an optical scanner having a thirty-first structure of the present invention.
Figure 54:
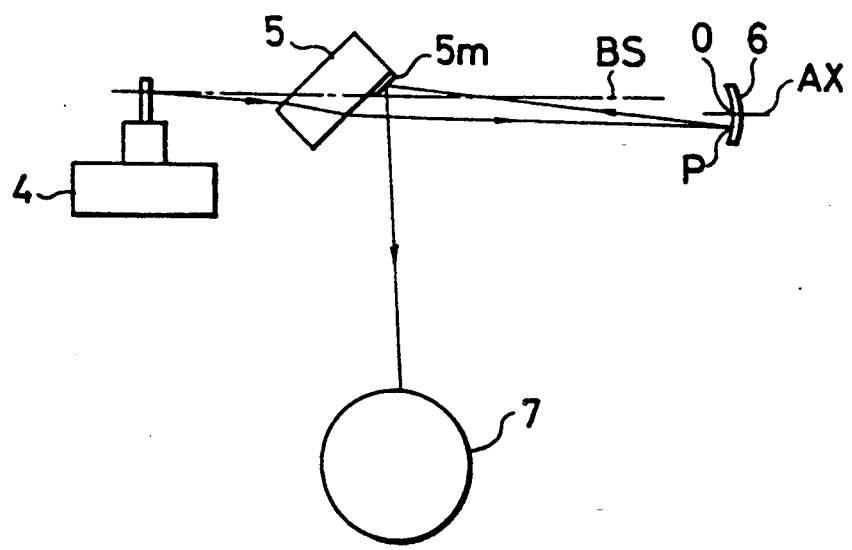
FIG. 54 is a view for explaining another modified embodiment of an optical scanner having a thirty-fourth structure of the present invention.
Figure 55A:
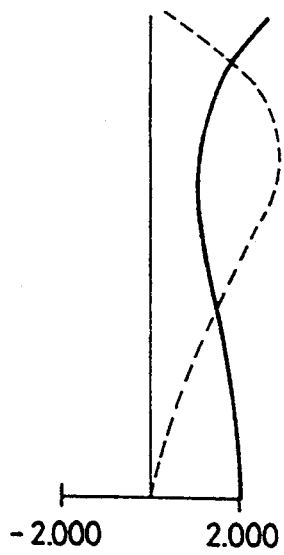
FIGS. 55a and 55b are diagrams respectively showing field curvature and scanning characteristics with respect to Concrete example 44.
Figure 55B:
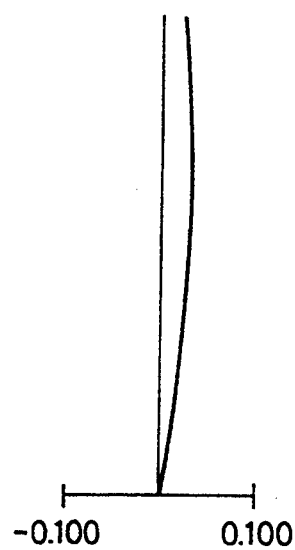
Figure 56A:
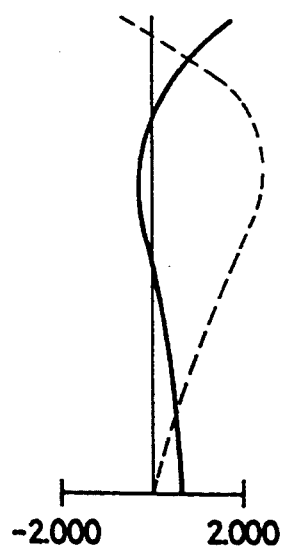
FIGS. 56a and 56b are diagrams respectively showing field curvature and scanning characteristics with respect to Concrete example 45.
Figure 56B:
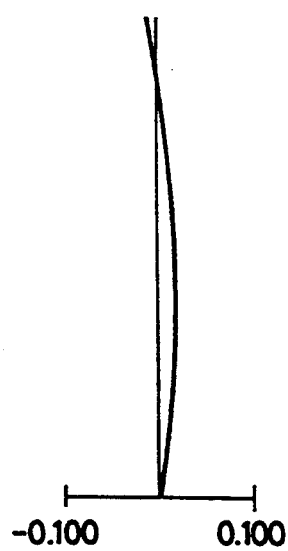
Figure 57A:
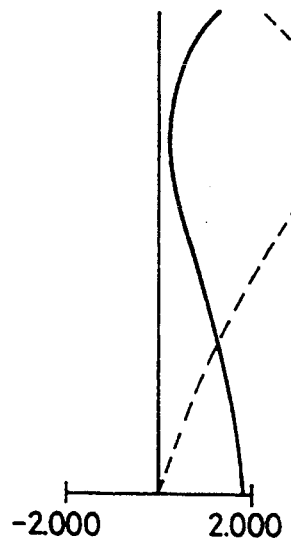
FIGS. 57a and 57b are diagrams respectively showing field curvature and scanning characteristics with respect to Concrete example 46.
Figure 57B:
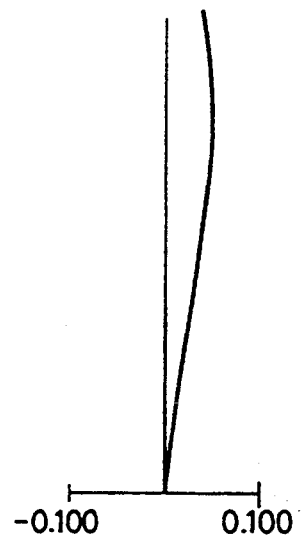
Figure 58A:
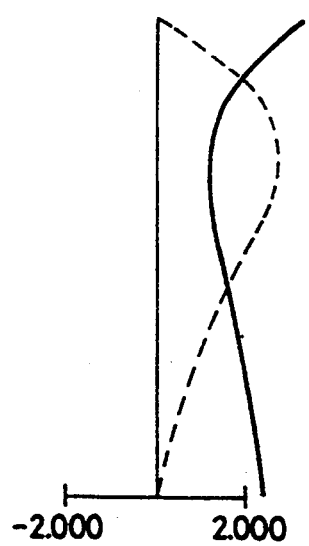
FIGS. 58a and 58b are diagrams respectively showing field curvature and scanning characteristics with respect to Concrete example 47.
Figure 58B:
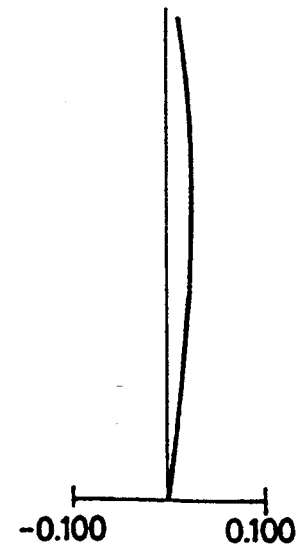
Figure 59A:
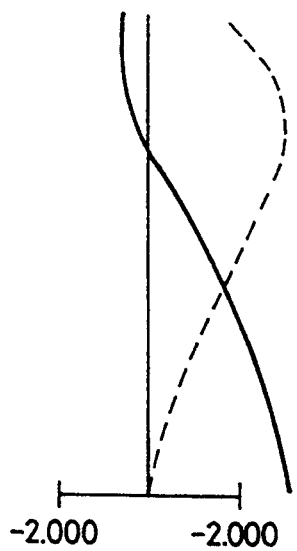
FIGS. 59a and 59b are diagrams respectively showing field curvature and scanning characteristics with respect to Concrete example 48.
Figure 59B:
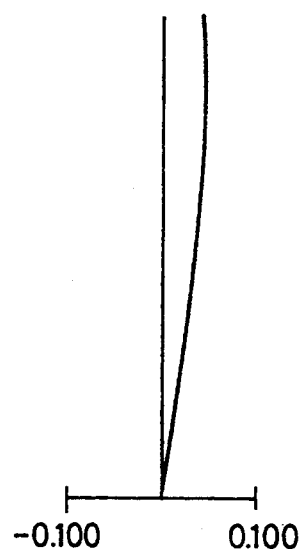
Figure 60A:
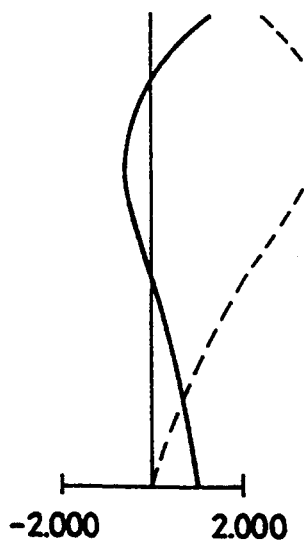
FIGS. 60a and 60b are diagrams respectively showing field curvature and scanning characteristics with respect to Concrete example 49.
Figure 60B:
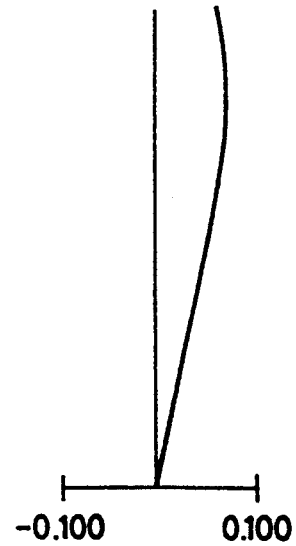
Figure 61A:
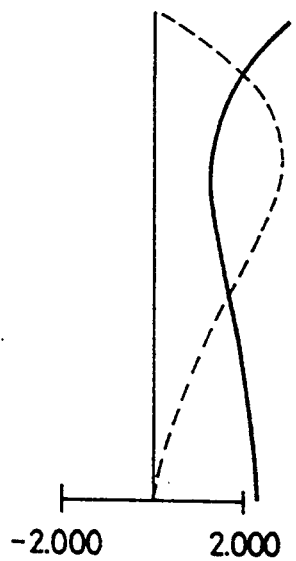
FIGS. 61a and 61b are diagrams respectively showing field curvature and scanning characteristics with respect to Concrete example 50.
Figure 61B:
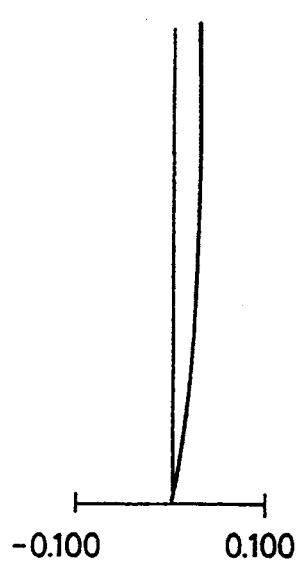
Figure 62A:
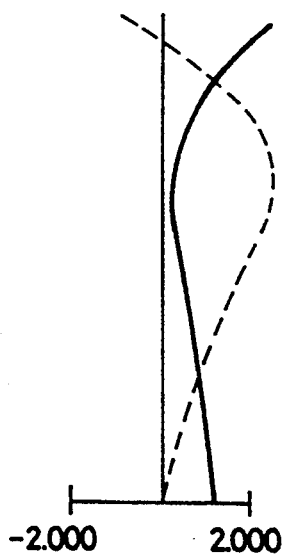
FIGS. 62a and 62b are diagrams respectively showing field curvature and scanning characteristics with respect to Concrete example 51.
Figure 62B:
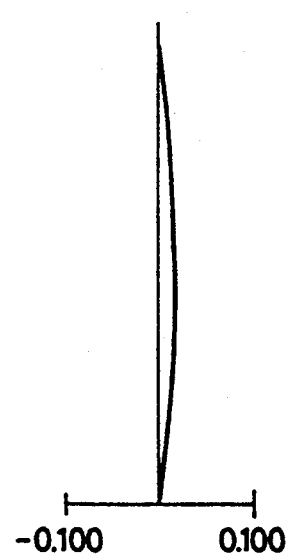
Figure 63A:
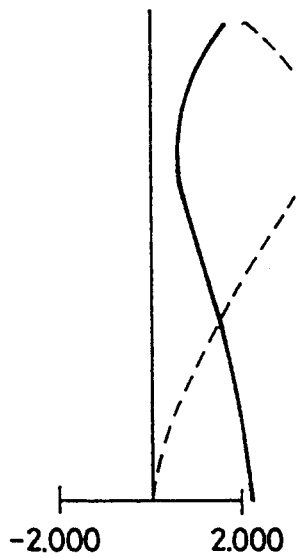
FIGS. 63a and 63b are diagrams respectively showing field curvature and scanning characteristics witch respect to Concrete example 52.
Figure 63B:
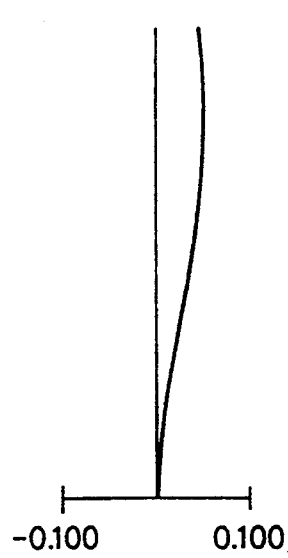
Figure 64A:
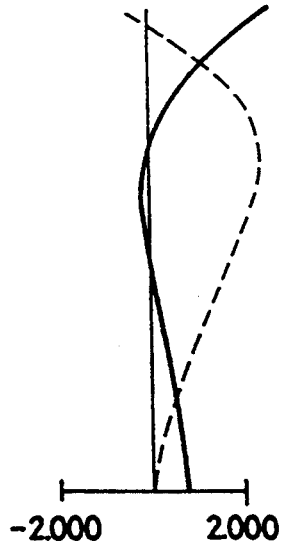
FIGS. 64a and 64b are diagrams respectively showing field curvature and scanning characteristics with respect to Concrete example 53.
Figure 64B:
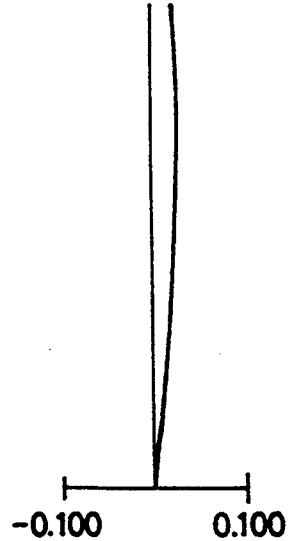
Figure 65A:
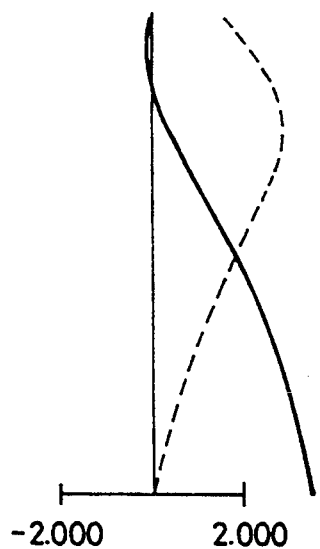
FIGS. 65a and 65b are diagrams respectively showing field curvature and scanning characteristics with respect to Concrete example 54.
Figure 65B:
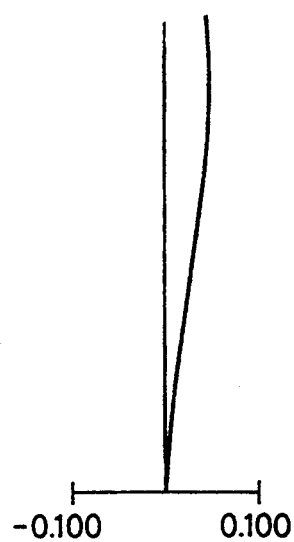
Figure 66A:
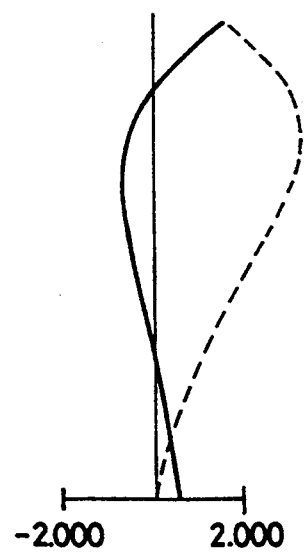
FIGS. 66a and 66b are diagrams respectively showing field curvature and scanning characteristics with respect to Concrete example 55.
Figure 66B:
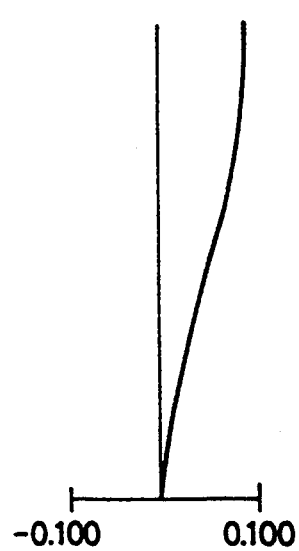
Figure 67A:
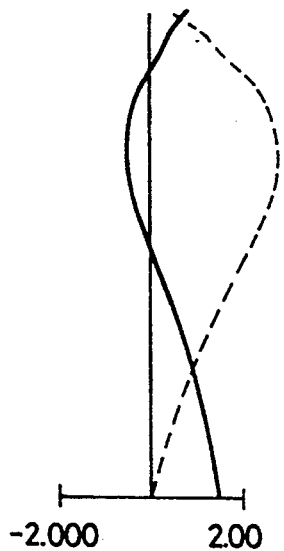
FIGS. 67a and 67b are diagrams respectively showing field curvature and scanning characteristics with respect to Concrete example 56.
Figure 67B:
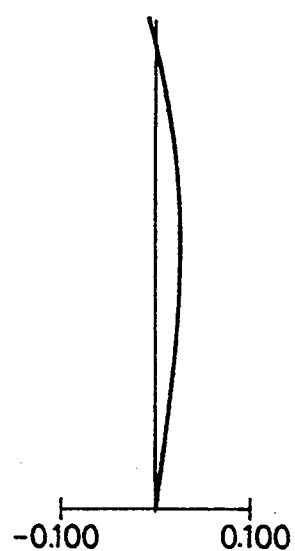
Figure 68A:
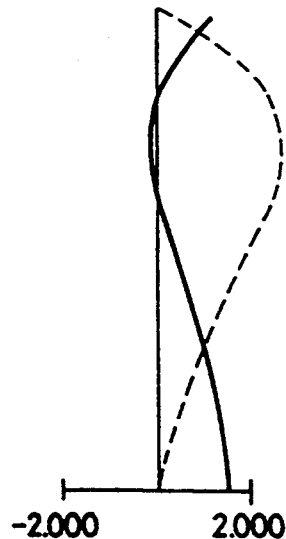
FIGS. 68a and 68b are diagrams respectively showing field curvature and scanning characteristics with respect to Concrete example 57.
Figure 68B:
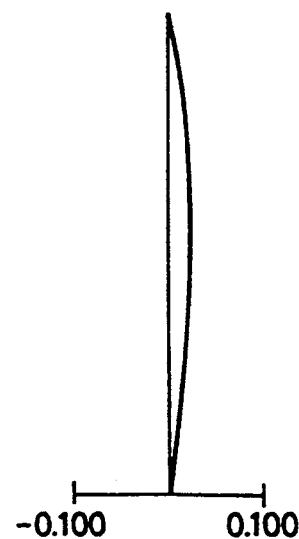
Figure 69A:
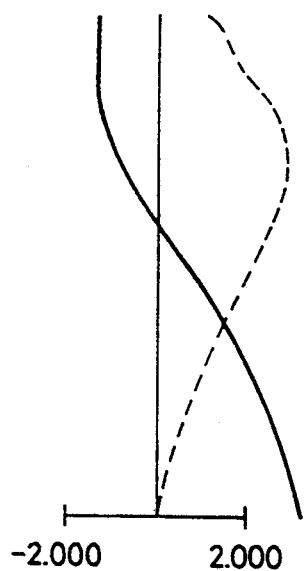
FIGS. 69a and 69b are diagrams respectively showing field curvature and scanning characteristics with respect to Concrete example 58.
Figure 69B:
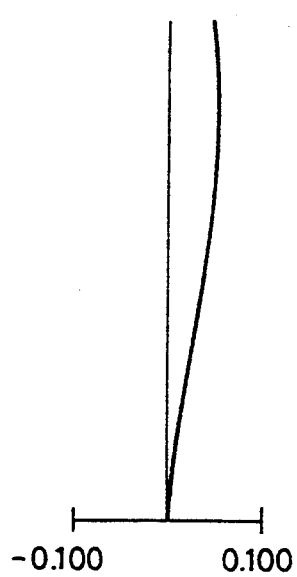
Figure 70A:
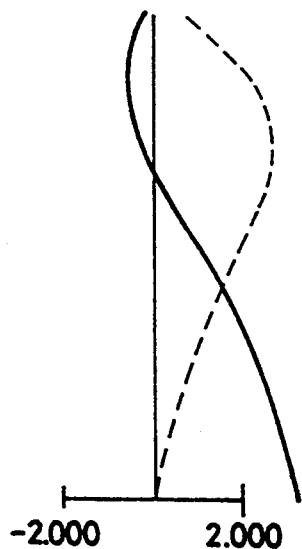
FIGS. 70a and 70b are diagrams respectively showing field curvature and scanning characteristics with respect to Concrete example 59.
Figure 70B:
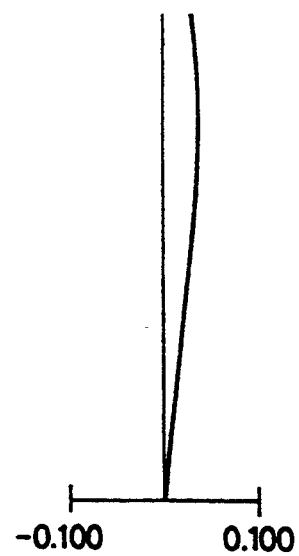
Figure 71A:
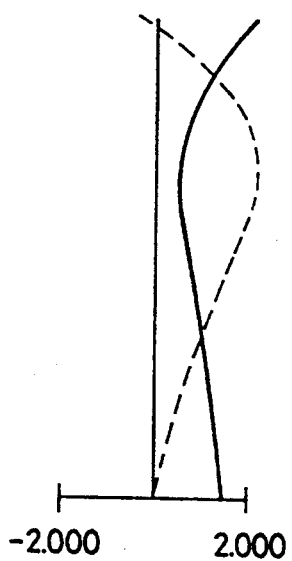
FIGS. 71a and 71b are diagrams respectively showing field curvature and scanning characteristics with respect to Concrete example 60.
Figure 71B:
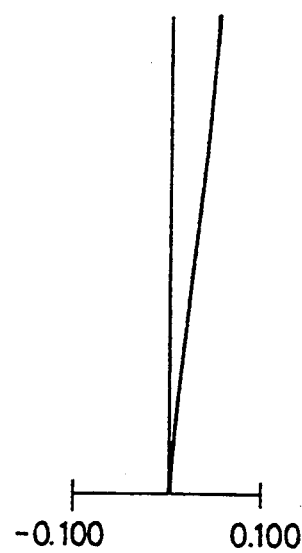
Figure 72A:
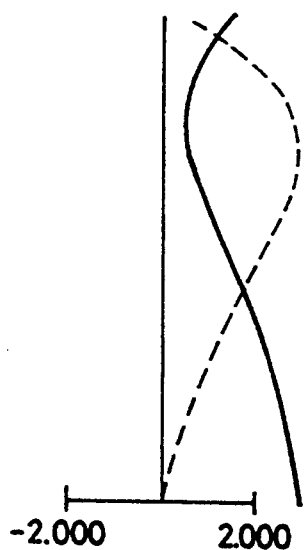
FIGS. 72a and 72b are diagrams respectively showing field curvature and scanning characteristics with respect to Concrete example 61.
Figure 72B:
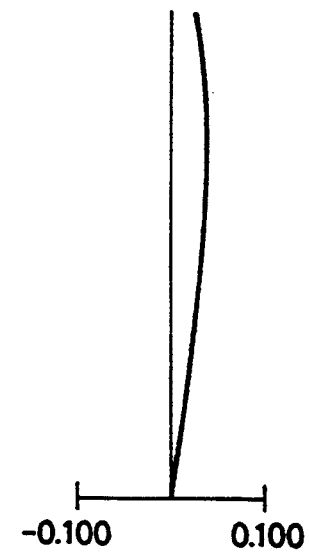
Figure 73A:
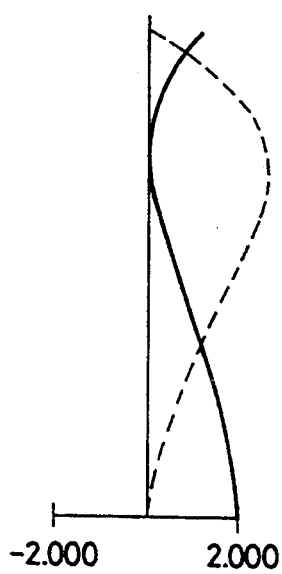
FIGS. 73a and 73b are diagrams respectively showing field curvature and scanning characteristics with respect to Concrete example 62.
Figure 73B:
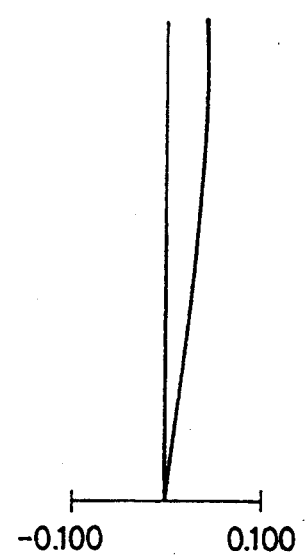
Figure 74A:
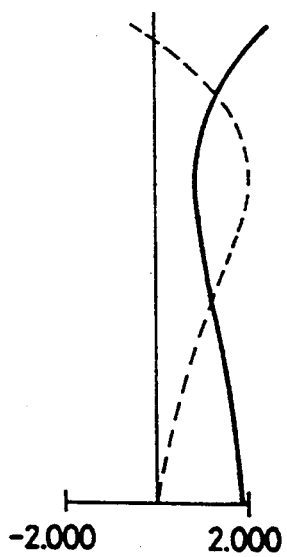
FIGS. 74a and 74b are diagrams respectively showing field curvature and scanning characteristics with respect to Concrete example 63.
Figure 74B:
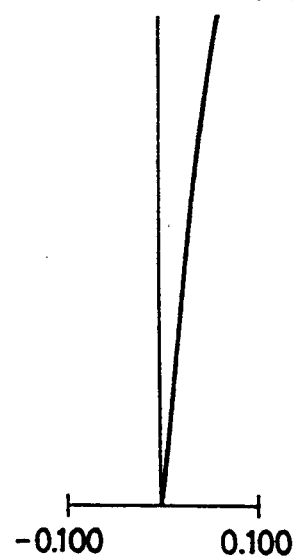

FIGS. 52 to 54 show modified embodiments of the optical scanner. For brevity, constructional portions similar to those in FIGS. 38 to 40 are designated by the same reference numerals. In each of these modified embodiments, an optical arrangement of the optical path of a light beam from a light source to a deflecting means is similar to that shown in FIGS. 51a and 51b. Further, similar to the embodiment shown in FIGS. 51a and 51b, the positions of a deflecting reflecting face and a scanned face are approximately set by a reflective image-forming element 6 in a conjugate relation in geometrical optics with respect to a cross-scan corresponding direction.

The modified embodiment shown in FIG. 52 is an embodiment of an optical scanner having a thirty-first structure. A plane parallel plate 5B is arranged such that only a deflected light beam toward the reflective image-forming element 6 is transmitted through the plane parallel plate 5B.

The modified embodiment shown in FIG. 53 is an embodiment of an optical scanner having a thirty-third structure. In FIG. 53, a reflecting film 5M is formed in a face portion of a plane parallel plate 5 on the side of a deflecting means 4. A light beam reflected on a reflective image-forming element 6 is transmitted through the plane parallel plate 5 and is then reflected on the reflecting film 5M. The reflected light beam is again transmitted through the plane parallel plate toward a recording medium 7.

The modified embodiment shown in FIG. 54 is an embodiment of an optical scanner having a thirty-fourth structure. In FIG. 54, a reflecting film 5m is formed in a face portion of a plane parallel plate 5 on the side of a reflective image-forming element 6. A light beam reflected on the reflective image-forming element 6 is reflected on the reflecting film 5m and is transmitted toward a recording medium 7.

In each of FIGS. 51 to 54, an optical axis AX of the reflective image-forming element 6 is parallel to a beam deflecting face BS so that a tilt or inclination angle of the reflective image-forming element is set to zero. However, in accordance with a twenty-eighth structure, the above light beam shifting amount can be set to zero and a finite tilt angle (except for zero) can be set. Further, in accordance with a twenty-ninth structure, each of the light beam shifting amount and the tilt angle can be set to be a finite value (except for zero).

A concrete example of an optical scanning operation will next be described in the optical scanner in each of the embodiments shown in FIGS. 51 to 54. In each of these concrete examples, a shape of the reflective image-forming element 6 is specified by providing the above three parameters $R_m$, $R_S$ and K. A material of the plane parallel plate is specified by a refractive index n and a shape of the plane parallel plate is specified by a thickness t. An arranging form of the plane parallel plate is specified by providing an inclination angle $\alpha$ from a direction parallel to a rotational axis of the deflecting means. This inclination angle $\alpha$ is an angle between a normal line of the plane parallel plate and a beam deflecting face. In all the following concrete examples, the refractive index n of the plane parallel plate is set to 1.51118.

A light beam from a light source is changed to a divergent light beam by a lens 2. A distance $S_0$ between a starting point of divergence of this divergent light beam and a mirror face of the reflective image-forming element 6 is provided. The starting point of divergence of the divergent light beam is located in a position in geometrical optics in which it is considered that the divergent light beam begins to be diverged. When the distance $S_0$ is set, a position of the light source in a main scan-corresponding direction is determined with respect to a deflected light beam incident to the reflective image-forming element 6. The above starting point of divergence of the divergent light beam is located in a position before the mirror face of the reflective image-forming element 6. Accordingly, this distance $S_0$ is shown by a negative distance. $L_0$ is set to a distance from a starting point of deflection of the light beam deflected by the deflecting means to the reflective image-forming element. An arranging form of the reflective image-forming element 6 is generally determined by a shifting amount $\Delta 1$ of the light beam, a tilt angle $\Delta \theta$ and the distance $L_0$.

In the following Concrete examples, a "separating amount" shows a distance between the beam deflecting face and a reflected light beam in the position of a deflecting reflecting face. A "curve of scanning line" shows a maximum value of a shift between the actual scanning line and the above-mentioned optical scanning line L.

First Concrete examples 44 to 49 are concrete examples in the embodiment shown in FIGS. 51a and 51b. Accordingly, the tilt angle $\Delta \theta$ is set to zero.

CONCRETE EXAMPLE 44 t=4 mm, $\alpha$=15°, $S_0$=−315.1, $L_0$=66.1, K=−1.87, $R_m$=−223.0, $R_s$=−110.5, $\Delta 1$=3.6, separating amount=0.3 mm, curve of scanning line=26 μm

CONCRETE EXAMPLE 45 t=4 mm $\alpha$=60°, $S_0$=−315.1, $L_0$=66.11, K=−1.89, $R_m$=−223.0, $R_s$=−110.5, $\Delta 1$=5.1, separating amount=1.4 mm, curve of scanning line=20 μm

CONCRETE EXAMPLE 46 t=8 mm, $\alpha$=15°, $S_0$=−293.3, $L_0$=66.1, K=−1.85, $R_m$=−218.7, $R_s$=−108.7, $\Delta 1$=4.2 separating amount=0.5 mm, curve of scanning line=36 μm

CONCRETE EXAMPLE 47 t=8 mm, $\alpha$=60°, $S_0$293.3, $L_0$=66.1, K=−1.91, $R_m$=−218.8, $R_s$=−112.0, $\Delta 1$=7.0, separating amount=3.6 mm, curve of scanning line=46 μm

CONCRETE EXAMPLE 48 t=1.2 mm $\alpha$=15°, $S_0$=−311.2, $L_0$=70.3, K=−1.73, $R_m$=−223.34, $R_s$=−112.0, $\Delta 1$=4.9, separating amount=1.2 mm, curve of scanning line=40 μm

CONCRETE EXAMPLE 49 t=12 mm, $\alpha$=60°, $S_0$=−293.3, $L_0$=66.1, K=−1.89, $R_m$=−217.2, $R_s$=−105.1, $\Delta 1$=9.3, separating amount=6.2 mm, curve of scanning line=46 μm The following Concrete examples 50 to 55 are concrete examples in the embodiment shown in FIGS. 51a and 51b. In these concrete examples, the light beam shifting amount $\Delta 1$ is set to zero and the tilt angle $\Delta\theta$ is set to be finite.

CONCRETE EXAMPLE 50

$t=4$ mm, $\alpha=15°$, $S_0=-315.1$, $L_0=66.1$, $K=-1.87$, $R_m=-223.0$, $R=-110.5$, $\Delta\theta=2$, separating amount$=0.0$ mm, curve of scanning line$=67$ $\mu$m

CONCRETE EXAMPLE 51

$t=4$ mm $\alpha=60°$, $S_0=-315.1$, $L_0=66.1$, $K=-1.89$, $R_m=-223.0$, $R_s=-110.63$, $\Delta\theta=2.6$, separating amount$=1.3$ mm, curve of scanning line$=9$ $\mu$m

CONCRETE EXAMPLE 52

$t=8$ mm $\alpha=15°$, $S_0=-293.3$, $L_0=66.1$, $K=-1.85$, $R_m=-218.7$, $R_s=-108.7$, $\Delta\theta=2.3$, separating amount$=0.7$ mm, curve of scanning line$=21$ $\mu$m

CONCRETE EXAMPLE 53

$t=8$ mm, $\alpha=60°$, $S_0=-293.3$, $L_0=66.1$, $K=-1.91$, $R_m=-218.8$, $R_s=-218.8$, $\Delta\theta=3.8$, separating amount$=3.8$ mm, curve of scanning line$=35$ $\mu$m

CONCRETE EXAMPLE 54

$t=12$ mm, $\alpha=15°$, $S_0=-311.2$, $L_0=70.3$, $K=-1.73$, $R_m=-223.34$, $R_s=-112.0$, $\Delta\theta=2.5$, separating amount$=1.2$ mm, curve of scanning line$=40$ $\mu$m

CONCRETE EXAMPLE 55

$t=12$ mm, $\alpha=60°$, $S_0=-293.3$, $L_0=66.1$, $K=-1.89$, $R_m=-217.2$, $R_s=-105.1$, $\Delta\theta=5.0$, separating amount$=6.1$ mm, curve of scanning line$=60$ $\mu$m The following Concrete examples 56 and 57 are concrete examples of the optical scanner in the embodiment shown in FIGS. 51a and 51b in which the incident angle of a light beam incident to the plane parallel plate is set to a Brewster angle. Accordingly, each of these Concrete examples 56 and 57 is an embodiment of an optical scanner having a thirty-third structure.

CONCRETE EXAMPLE 56

$t=8$ mm, $\alpha=56.506°$, $S_0=-293.3$, $L_0=66.1$, $K=-1.89$, $R_m=-218.6$, $R_s=-109.0$, $\Delta 1=7.1$, separating amount$=3.7$ mm, curve of scanning line$=36$ $\mu$m

CONCRETE EXAMPLE 57

$t=8$ mm, $\alpha=56.506°$, $S_0=-293.3$, $L_0=66.1$, $K=-1.89$, $R_m=-218.6$, $R_s=-109.0$, $\Delta\theta=3.7$, separating amount$=3.6$ mm, curve of scanning line$=32$ $\mu$m The following Concrete examples 58 and 59 are concrete examples of the optical scanner in the embodiment shown in FIG. 52. Accordingly, each of these Concrete examples 58 and 59 is an embodiment of an optical scanner having a thirty-first structure.

CONCRETE EXAMPLE 58

$t=12$ m, $\alpha=45°$, $S_0=-289.2$, $L_0=69.0$, $K=-1.8$, $R_m=-218.8$, $R_s=-112.0$, $\Delta 1=8.3$, separating amount$=1.7$ mm, curve of scanning line$=20$ $\mu$m

CONCRETE EXAMPLE 59

$t=1.2$ mm, $\alpha=45°$, $S_0=-284.2$, $L_0=69.0$, $K=-1.8$, $R_m=-218.8$, $R_s=-112.0$, $\Delta\theta=4.13$, separating amount$=1.8$ mm, curve of scanning line$=27$ $\mu$m These numeric values in the Concrete examples 58 and 59 can be used as numeric values in the embodiment shown in FIG. 54 as they are. In this case, the separating amount is equal to 1.8 mm.

The final Concrete examples 60 to 63 are concrete examples of the optical scanner in the embodiment shown in FIG. 53. In the Concrete examples 60 and 61, the tilt angle $\Delta\theta$ is set to zero. In the Concrete example 62, the light beam shifting amount $\Delta 1$ is set to zero. In the Concrete example 63 each of the light beam shifting amount $\Delta 1$ and the tilt angle $\Delta\theta$ is set to be finite.

CONCRETE EXAMPLE 60

$t=8$ mm, $\alpha=1.5°$, $S_0=-294.3$, $L_0=67.1$, $K=-1.85$, $R_m=-218.7$, $R_s=-108.7$, $\Delta 1=4.4$, separating amount$=0.2$ mm, curve of scanning line$=39$ $\mu$m

CONCRETE EXAMPLE 61

$t=8$ mm, $\alpha=56.506°$, $S_0=-293.3$, $L_0=66.1$, $K=-1.91$, $R_m=-218.8$, $R_s=-108.0$, $\Delta 1=7.7$, separating amount$=1.7$ mm, curve of scanning line$=56$ $\mu$m

CONCRETE EXAMPLE 62

$t=8$ mm, $\alpha=60°$, $S_0=-293.3$, $L_0=66.1$, $K=-1.91$, $R_m=-218.8$, $R_s=-218.8$, $\Delta\theta=4.1$, separating amount$=1.7$ mm, curve of scanning line$=51$ $\mu$m

CONCRETE EXAMPLE 63

$t=8$ mm, $\alpha=15°$, $S_0=-294.3$, $L_0=67.1$, $K=-1.85$, $R_m=-218.7$, $R_s=-108.7$, $\Delta 1=0.2$, $\Delta\theta=2.4$, separating amount$=0.2$ mm, curve of scanning line$=29$ $\mu$m Each of FIGS. 55a to 74a shows field curvature with respect to the above Concrete examples 44 to 63. Each of FIGS. 55b to 74b shows scanning characteristics with respect to the above Concrete examples 44 to 63. In each of these Concrete examples 44 to 63, the field curvature and the scanning characteristics are preferably corrected and the curve of a scanning line is equal to or smaller than 0.1 mm at its maximum so that the field curvature, the scanning characteristics and the curve of the scanning line are preferably corrected.

In the above Concrete examples 44 to 63, the inclination angle of a light beam incident to the deflecting reflecting face of the deflecting means with respect to the beam deflecting face is set to two degrees, but can be set to an angle except for two degrees.

As mentioned above, the above novel optical scanner having each of the first to sixth structures of the present invention is an optical scanner of a system for focusing and forming a light spot as an image by the reflective image-forming element having the shape of a concave reflecting face. In this optical scanner, it is possible to perform a preferable optical scanning operation by effectively reducing the curve of a scanning line caused by using a half mirror as an optical path separating means.

In the optical scanner having each of the eighth to thirteenth structures of the present invention, the optical path separating means is constructed by using a transparent plane parallel plate. Accordingly, light utilization efficiency is greatly improved in comparison with a case in which the half mirror is used as the optical path separating means. Further, the curve of a scanning line is extremely reduced so that the optical scanning operation is preferably performed at a high speed. In the optical scanner having the eleventh structure, the incident angle of a deflected light beam incident to the plane parallel plate is set to approximately satisfy a Brewster angle. Accordingly, the reflecting amount of a P-polarized light component is extremely reduced so that light utilization efficiency is improved without arranging any antireflection film on the plane parallel plate. In the optical scanner having each of the twelfth and thirteenth structures, a degree of freedom of the layout of an optical system is increased.

In the optical scanner having each of the fifteenth to eighteenth structures, a novel optical scanning operation can be performed by using an elongated prism as the optical path separating means. In the optical scanner having each of the sixteenth to eighteenth structures, the optical scanning operation can be preferably performed by effectively reducing the curve of a scanning line caused by using the elongated prism as the optical path separating means.

In the optical scanner having each of the twentieth to twenty-fifth structures, the curve of a scanning line can be preferably corrected by optical path separating effects using a plane parallel plate and inclining effects of a reflective image-forming element.

In the optical scanner having each of the twenty-seventh to thirty-fourth structures, the curve of a scanning line can be preferably corrected by optical path separating effects using a plane parallel plate and inclining effects of a light beam in which an incident direction of the light beam incident to a deflecting means is inclined with respect to a beam deflecting face. Otherwise, the curve of the scanning line can be preferably corrected by the optical path separating effects using the plane parallel plate, the above inclining effects of the light beam and inclining effects of a reflective image-forming element inclined with respect to the beam deflecting face.

In the optical scanner having each of the seventh, fourteenth, nineteenth, twenty-sixth and thirty-fifth structures, the inclination of a deflecting face can be corrected so that it is possible to use various kinds of deflecting means such as a rotary polygon mirror, etc.

Figure 75:
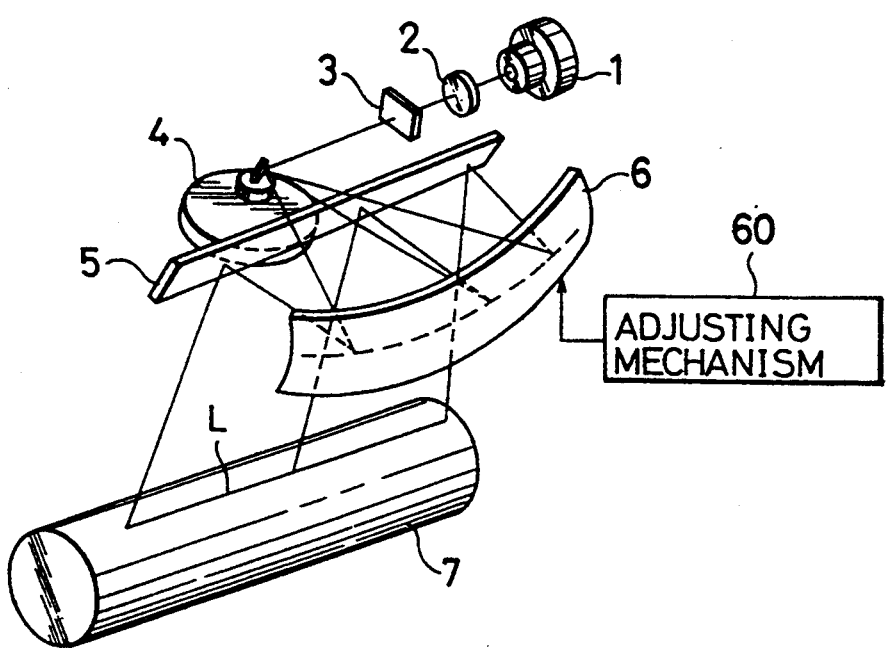
FIG. 75 is a view showing one example of the optical arrangement of an optical scanner in accordance with another embodiment of the present invention.

FIG. 75 shows the construction of an optical scanner in accordance with another embodiment of the present invention. In FIG. 75, a divergent light beam is emitted from a semiconductor laser as a light source 1 and is transmitted through a condenser lens 2. The condenser lens 2 changes the transmitted light beam to a convergent light beam, a divergent light beam or a substantially parallel light beam. In this embodiment, the light beam transmitted through the condenser lens 2 is concretely changed to a substantially parallel light beam. The light source 1 and the condenser lens 2 constitute a light source device.

The light beam emitted from the light source device is then transmitted through a cylindrical lens 3 as a linear image-forming optical system so that the light beam is converged only in a cross-scan corresponding direction. Thus, the light beam is focused and formed as a linear image extending in a main scan-corresponding direction in the vicinity of a deflecting reflecting face of an optical deflector 4 as a rotary unifacial mirror.

The light beam reflected on the deflecting reflecting face is then reflected on an image-forming reflecting mirror 6 and an elongated mirror 5. Thus, the light beam is converged as a light spot on a photoconductive photosensitive body 7 arranged such that a generating line of the photosensitive body 7 is in conformity with a main scanning line L on a scanned face. The photosensitive body, 7 is optically scanned by the light beam at an equal speed as the light beam is deflected by the optical deflector 4 at an equal angular velocity. The elongated mirror 5 is arranged to bend an optical path of the light beam and has no refracting power. The elongated mirror 5 and the image-forming reflecting mirror 6 constitute a light spot image-forming optical system.

An image-forming action of the image-forming reflecting mirror 6 is taken as follows in each of the main scan-corresponding direction and the cross scan-corresponding direction. In the main scan-corresponding direction, the parallel light beam transmitted through the condenser lens 2 is converged by the image-forming reflecting mirror 6 as a light spot on the photosensitive body 7. In the cross scan-corresponding direction, an image formed by the image-forming reflecting mirror 6 is set to a light spot on the photosensitive body 7 in a state in which the linear image extending in the main scan-corresponding direction and formed by the cylindrical lens 3 is set to an object point as mentioned above. In this embodiment, the linear image is formed in the vicinity of the deflecting reflecting face. Accordingly, in the cross scan-corresponding direction, the image-forming reflecting mirror 6 approximately sets positions of the deflecting reflecting face and the scanned face in a conjugate relation in geometrical optics. Namely, the image-forming reflecting mirror 6 is anamorphic.

Figure 76A:
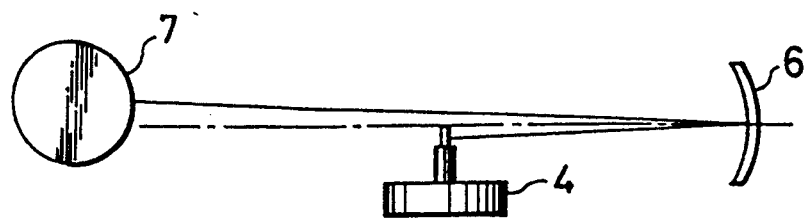
FIGS. 76a to 76c are views for explaining three systems for separating the optical path of a deflected light beam transmitted to an image-forming reflecting mirror from the optical path of a light beam reflected on the image-forming reflecting mirror.
Figure 76B:
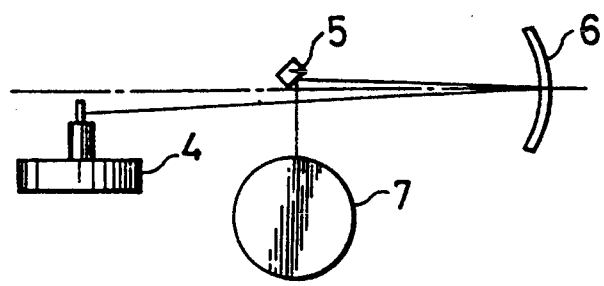
Figure 76C:
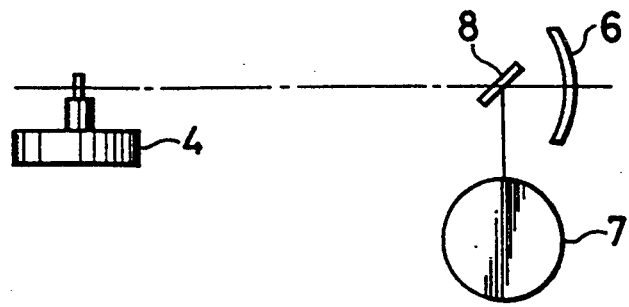

In the optical scanner using the image-forming reflecting mirror 6, the deflected light beam is reflected on an incident side on the image-forming reflecting mirror 6. Accordingly, it is necessary to separate an optical path of the reflected light beam from an optical path of the incident light beam. It is possible to use various kinds of methods for separating these optical paths from each other. FIGS. 76a to 76c show three typical separating methods of the optical paths.

Each of FIGS. 76a and 76b shows an optical path separating system in which a light beam incident to the image-forming reflecting mirror 6 is inclined with respect to the cross scan-corresponding direction set to a vertical direction. In FIG. 76a, the light beam reflected on the image-forming reflecting mirror 6 is directly incident to the photosensitive body 7. In FIG. 76b, an optical path of the reflected light beam is bent by an elongated mirror 5 and is guided to a photosensitive body 7. The optical path separating system shown in FIG. 78b is used in the optical scanner shown in FIG. 75. FIG. 76c shows an optical path separating system using an elongated half mirror 8.

The relation between each of the optical path separating systems shown in FIGS. 76a to 76c and the above-mentioned deflecting scanning face will next be described. A deflected light beam is ideally deflected in principle in the optical path separating system shown in FIG. 76c. No face scanned by a principal ray of the deflected light beam is planar in the optical path separating systems shown in FIGS. 76a and 76b. The deflecting scanning face is a plane defined in the optical path separating system shown in FIG. 78c. However, this definition is enlarged to the optical path separating systems shown in FIGS. 76a and 76b. Namely, when the deflected light beam is inclined with respect to a face perpendicular to a rotational axis of the deflecting reflecting face as shown in FIGS. 76a and 76b, the deflecting scanning face is set to a plane which passes an incident position of the light beam incident to the deflecting reflecting face and is perpendicular to the rotational axis of the deflecting reflecting face as an ideal rotational axis. This incident light beam corresponds to the deflected light beam providing a predetermined image height.

In the optical path separating systems shown in FIGS. 76a and 76b, the locus of an incident position of the deflected light beam incident to the image-forming reflecting mirror 6 is not parallel to the main scan-corresponding direction perpendicular to a paper face of FIGS. 76a and 76b, but is formed in the shape of a curve. Therefore, the curve of a scanning line is caused in principle in such optical path separating systems. However, such a curve can be reduced by the following reducing method to such an extent that no practical problems are caused. Namely, in this reducing method, an optical axis of the image-forming reflecting mirror 6 is inclined with respect to the deflecting scanning face, or a position of the image-forming reflecting mirror 6 is set by slightly moving the image-forming reflecting mirror 6 in parallel with a direction perpendicular to the deflecting scanning face. Otherwise, in the reducing method, the inclination and the parallel displacement of the image-forming reflecting mirror 6 are combined with each other.

A correction amount of the scanning line curve can be determined in a designing condition. However, the optical scanner must be optically arranged as designed so as to actually correct this curve as designed. If there is an error in optical arrangement, a scanning line curve unable to be really neglected is caused even when the scanning line curve can be corrected in design.

In this embodiment, the scanning line curve caused by the error in optical arrangement is corrected by swinging (or rotating) and moving adjustments of the image-forming reflecting mirror using an adjusting mechanism 60.

The shape of a reflecting face of the image-forming reflecting mirror can be set to a spherical surface which is coaxial and symmetrical. In the optical scanner having a thirty-ninth structure, this reflecting face of the image-forming reflecting mirror is set to an aspherical surface so that an optical scanning operation can be preferably performed at an equal speed.

In the optical scanner having a fortieth structure, a linear image formed by a linear image-forming optical system is-located in the vicinity of the deflecting reflecting face. Further, a light spot image-forming optical system approximately sets positions of the deflecting reflecting face and the scanned face in a conjugate relation in geometrical optics with respect to a cross scan-corresponding direction. Accordingly, no converging position of a light spot is displaced in a cross scanning direction irrespective of an inclination of the deflecting reflecting face.

An anamorphic image-forming reflecting mirror is used in the optical scanner having a forty-sixth structure. In this case, it is possible to correct field curvature in the cross scanning direction and the inclination of the deflecting reflecting face without using the above-mentioned elongated cylindrical lens, a toroidal lens, etc.

The shape of an aspherical surface will first be described before the explanation of concrete embodiments. This aspherical surface is not coaxial, but is used as a face of the image-forming reflecting mirror in some of the following concrete examples.

Figure 78:
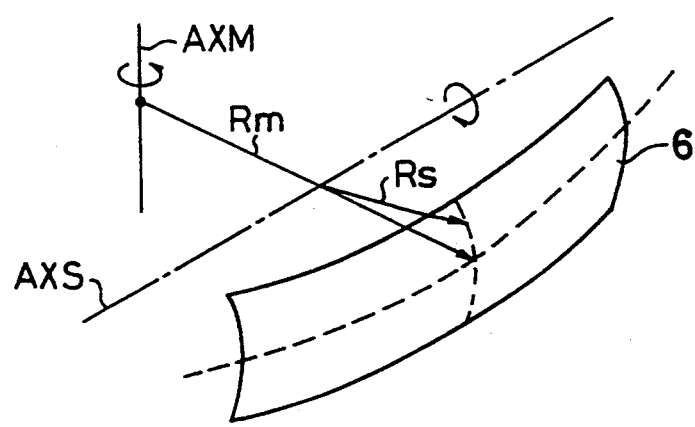
FIG. 78 is a view for explaining a barrel type toric face usable as a mirror face shape of the image-forming reflecting mirror.

As shown in FIG. 78, reference numeral Rs designates a maximum radius of curvature of a reflecting face of the image-forming reflecting mirror 6 at an intersecting point of an optical axis and the reflecting face. Reference numeral Rm designates a minimum radius of curvature of the reflecting face of the image-forming reflecting mirror 6 at this intersecting point. These maximum and minimum radii of curvature relate to two symmetrical faces of the reflecting face perpendicular to each other. Namely, these two symmetrical faces include the optical axis of the reflecting face and are perpendicular to each other. The maximum curvature radius Rs is a radius of curvature of an intersecting line between one symmetrical face and the reflecting face at the intersecting point of the optical axis and the reflecting face. This one symmetrical face is called a maximum curvature symmetrical face. The minimum curvature radius Rm is a radius of curvature of an intersecting line between the other symmetrical face and the reflecting face at the intersecting point of the optical axis and the reflecting face. The other symmetrical face is called a minimum curvature symmetrical face.

The intersecting line between the minimum curvature symmetrical face and the reflecting face is shown by a horizontal broken line in FIG. 78. In the following description, X designates a coordinate in a direction of the optical axis. Y designates a coordinate in a direction perpendicular to the optical axis on the minimum curvature symmetrical face with the above intersecting point as an origin. K designates a conical constant. In this case, the intersecting line between the minimum curvature symmetrical face and the reflecting face is provided by a curve represented by the following general formula (1).

$$X = Y^2/[Rm + \sqrt{\{Rm^2 - (1+K)Y^2\}}] \qquad (1)$$

In FIG. 78, an axis AXM is perpendicular to the minimum curvature symmetrical face in a position separated by the curvature radius Rm from the above intersecting point on the optical axis. An axis AXS is perpendicular to the optical axis on the minimum curvature symmetrical face in a position separated by the curvature radius Rs from the above intersecting point.

The reflecting face of the image-forming reflecting mirror 6; is an anamorphic aspherical surface as a barrel type toric face obtained by rotating the curve (shown by the horizontal broken line in FIG. 78) represented by the above formula (1) around the axis AXS. The image-forming reflecting mirror 6 is used such that a direction of the axis AXS is parallel to a main scan-corresponding direction. A curve obtained by adding correction terms of higher orders $AY^2 + BY^3 + \text{---}$ to the above formula (1) may be used in accordance with necessity.

Figure 79:
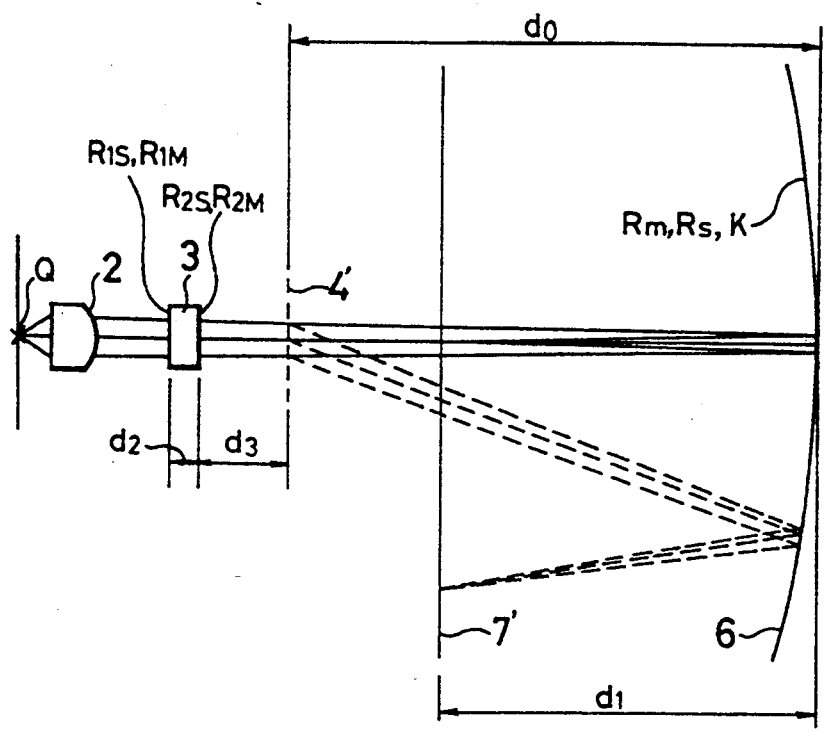
FIG. 79 is a view for explaining an optical arrangement of the optical scanner.
Figure 80:
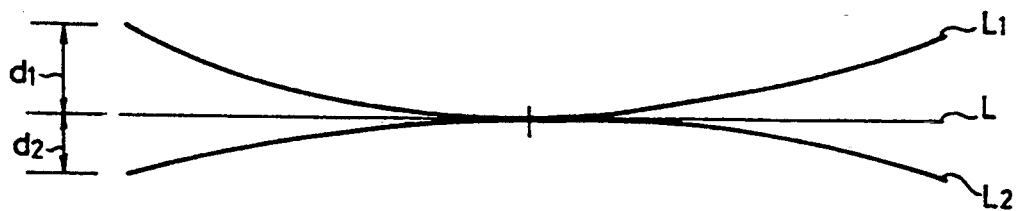
FIG. 80 is a view for explaining problems caused by the curve of a scanning line.

FIG. 79 typically shows an optical path from the light source to the scanned face in a state in which the main scan-corresponding direction is set to a vertical direction. The cylindrical lens is arranged as a linear image-forming optical system. $R_{1M}$ is set to a radius of curvature of a face of the cylindrical lens 3 on a side of the light source in the main scan-corresponding direction. $R_{2M}$ is set to a radius of curvature of a face of the cylindrical lens 3 on a side of the deflecting reflecting face in the main scan-corresponding direction. $R_{1S}$ is set to a radius of curvature of a face of the cylindrical lens 3 on the light source side in the cross scan-corresponding direction. $R_{2S}$ is set to a radius of curvature of a face of the cylindrical lens 3 on the deflecting reflecting face side in the cross scan-corresponding direction. Rm is set to a radius of curvature of the reflecting face of the image-forming reflecting mirror 6 on the optical axis in the main scan-corresponding direction. K is set to a conical constant. Rs is set to a radius of curvature of the reflecting face of the image-forming reflecting mirror 6 in the cross scan-corresponding direction. $d_0$ is set to a distance from the deflecting reflecting face 4' to the reflecting face of the image-forming reflecting mirror 6. $d_1$ is set to a distance from the above reflecting face to a scanned face 7'. $d_2$ is set to a thickness of the cylindrical lens 3. Reference numeral n designates a refractive index of the cylindrical lens 3. $d_3$ is set to a distance between the cylindrical lens 3 and the deflecting reflecting face 4'.

In the following concrete examples, $S_0$ designates the position of an object point provided when an image is formed by the image-forming reflecting mirror 6 in the main scan-corresponding direction. Namely, $S_0$ designates a distance from the reflecting face to the object point. $S_0$ is set to be negative when this object point is located before the reflecting face. Namely, $S_0$ is set to be negative when the object point is located on a side of the light source on the optical path. $\theta$ is set to an angle (unit: degree) of deflection of a light beam deflected by an optical deflector 4. $f_M$ is set to a focal length of the image-forming reflecting mirror 6 in the main scan-corresponding direction and is normalized to 100.

Figure 81A:
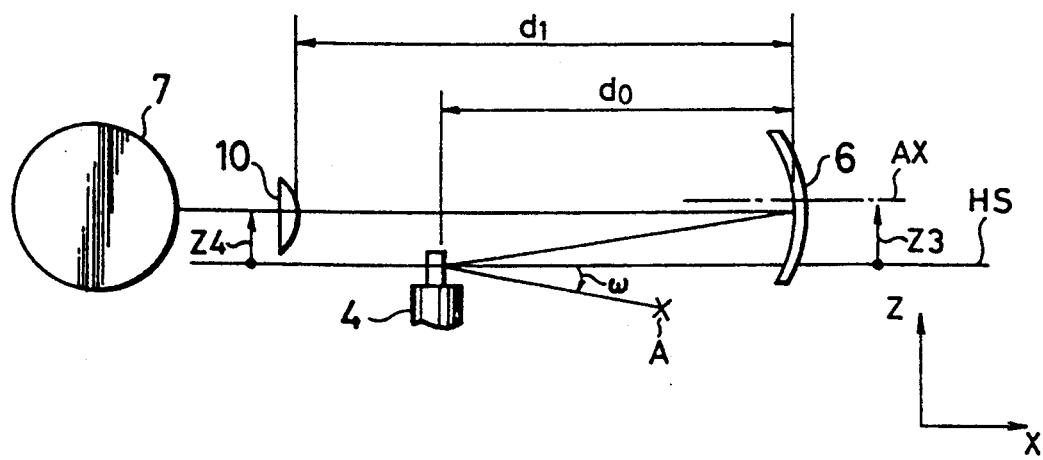
FIGS. 81a and 81b are views for explaining the optical arrangement of an optical scanner in Concrete example 64.
Figure 81B:
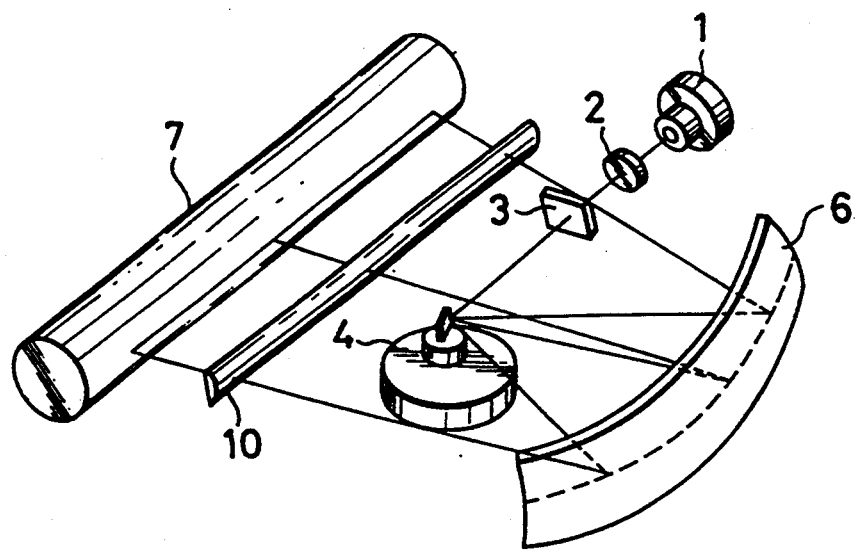

In a first embodiment, the optical scanner is constructed as shown in FIG. 81b. A deflected light beam reflected on the image-forming reflecting mirror 6 is converged as a light spot on the scanned face through an elongated cylindrical lens 10. The elongated cylindrical lens 10 is arranged in the vicinity of the scanned face in a state in Which a longitudinal direction of the cylindrical lens 10 is parallel to a main scanning direction. The elongated cylindrical lens 10 has a function for correcting an inclination of the deflecting reflecting face.

Similar to FIGS. 76a to 76c, FIG. 81a shows an optical path from the optical deflector 4 to the scanned face. in FIG. 81a, the optical path separating system shown in FIG. 76a is used. In this embodiment, the light beam emitted from a light source device is divergent. Further, the light beam incident to the deflecting reflecting face is divergent in the main scan-corresponding direction. In this embodiment, the image-forming reflecting mirror 6 has a coaxial aspherical surface as a mirror face. A shape of the mirror face is specified by the radius R (=Rs=Rm) of curvature of this mirror face on the optical axis and the conical con ant K. $R_{3m}$ is set to a radius of curvature of a face of the elongated cylindrical lens 10 on an incident side in the main scan-corresponding direction. The main scan-corresponding direction is set to a longitudinal direction of the cylindrical lens 10. $R_{3s}$ is set to a radius of curvature of a face of the elongated cylindrical lens 10 on the incident side in the cross scan-corresponding direction. R4m is set to a radius of curvature of a face of the elongated cylindrical lens 10 on a light emitting side in the main scan-corresponding direction. $R_{4s}$ is set to a radius of curvature of a face of the elongated cylindrical lens 10 on the light emitting side in the cross scan-corresponding direction, $d_2'$ is set to a thickness of the cylindrical lens 10. n' is set to a refractive index of a material of the cylindrical lens 10. $d_3'$ is set to a distance between the light emitting side face of the cylindrical lens 10 and the scanned face,

CONCRETE EXAMPLE 64

| | | | |
|---|---|---|---|
| $R_{1M} = \infty$ | $R_{1S} = 50.119$ | $d_2 = 9.351$ | $n = 1.51118$ |
| $R_{2M} = \infty$ | $R_{2S} = \infty$ | $d_3 = 123.894$ | |
| | | $d_0 = 54.981$ | |

-continued

| | | |
|---|---|---|
| $R = -200$ | | $d_1 = -354.010$ |
| $K = -3.0$ | | |
| $R_{3m} = \infty$ | $R_{3S} = -26.181$ | $d_2' = -5.610$ |
| $n' = 1.51118$ | | |
| $R_{4m} = \infty$ | $R_{4S} = \infty$ | $d_3' = -52.363$ |
| $S_0 = -135.476$ | $\theta = \pm 48.6$ | |

As shown in FIG. 81a, the light beam incident to the deflecting reflecting face of the optical deflector 4 is inclined an angle $\omega$ with respect to a deflecting scanning face HS. This angle $\omega$ is shown by a unit of degree and is set to be positive in the clockwise direction. The image-forming reflecting mirror 6 and the elongated cylindrical lens 10 are shifted to correct the curve of a scanning line caused by this inclination in principle. The image-forming reflecting mirror 6 is shifted in a direction perpendicular to the deflecting scanning face HS such that a distance from the deflecting scanning face HS to the image-forming reflecting mirror 6 is set to Z3. The elongated cylindrical lens 10 is shifted in a direction perpendicular to the deflecting scanning face HS such that a distance from the deflecting scanning face HS to the cylindrical lens 10 is set to Z4. In FIG. 81a, the distances Z3 and Z4 are set to be positive on an upper side from the deflecting scanning face HS.

Designed values of the angle $\omega$ and the distances Z3 and Z4 are provided as follows. $\omega = 4.0$ Z3 = −0.860 Z4 = 14.587

FIGS. 82a to 82c respectively show field curvature, scanning characteristics and the curve of a scanning line when this Concrete example 64 is ideally embodied. In FIG. 82a, a solid line shows the field curvature in a cross scanning direction and a broken line shows the field curvature in a main scanning direction. When the height of an ideal image at an angle $\theta$ of deflection is set to Hi($\theta$) and the real image height is set to Hr($\theta$), the scanning characteristics are defined by $[\{Hr(\theta)/Hi(\theta)\} - 1] \times 100$ (%) and correspond to $\theta$ characteristics defined with respect to an f$\theta$ lens. The curve of the scanning line is equal to about 44 $\mu$m. This curve value does not cause any practical problems.

When the above Concrete example 64 is embodied and a position of the cylindrical lens 3 is shifted by +1.1 mm in the cross scan-corresponding direction by an error in optical arrangement, the scanning line is greatly curved as shown in FIG. 83a so that a curving amount is equal to 128 $\mu$m at a maximum angle $\pm 48.6°$ of deflection.

At this time, a rotational angle of the image-forming reflecting mirror 6 is adjusted such that the image-forming reflecting mirror 6 is rotated 0.2 degrees in the counterclockwise direction in FIG. 81a around an axis which is perpendicular to a paper face of FIG. 81a and passes an intersecting point of the optical axis and a mirror face. The curve of the scanning line is preferably corrected by this adjustment as shown in FIG. 83b so that a maximum curving amount is equal to 69 $\mu$m.

Figure 77:
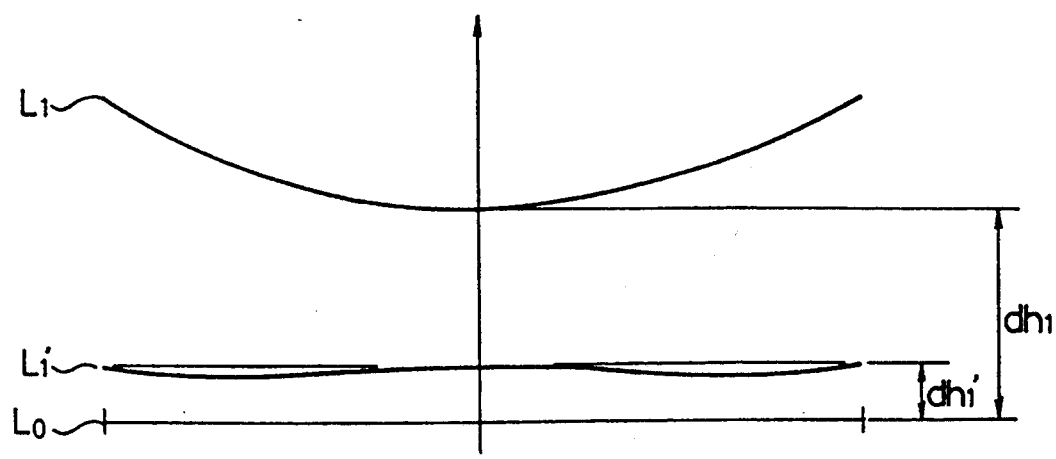
FIG. 77 is a view for explaining the curve of a scanning line caused by an error in optical arrangement and a shift in this scanning line from an ideal scanning line.

When there is an error in optical arrangement, the scanning line is curved as mentioned above and a position of the scanning line is shifted on the scanned face in the cross scanning direction. FIG. 77 typically shows this shifting state. In FIG. 77, reference numeral $L_0$ designates a designed scanning line. This designed scanning line is an ideal scanning line realized when each of optical elements is assembled with designed accuracy.

When there is an error in optical arrangement, the scanning line is curved as shown by reference numeral $L_1$ and is shifted by a distance $dh_1$ from a position of the ideal scanning line $L_0$ in the cross scanning direction.

At this time, a curving amount of the scanning line is reduced as shown by reference numeral $L_1'$ in FIG. 77 in accordance with a correcting method of the scanning line curve so that the scanning line approaches a straight line. Further, the position of the scanning line approaches the ideal scanning line $L_0$. Thus, the distance between these scanning lines is reduced to $dh_1'$.

In the above Concrete example 64, the shifting amount $dh_1$ equal to 0.38 mm as shown in FIG. 85a when there is an error in optical arrangement. After the rotational angle of the image-forming reflecting mirror 6 is adjusted, the shifting amount $dh_1'$, is equal to 0.38 mm as shown in FIG. 83b. Accordingly, no shifting amount is changed before and after this adjustment.

In Concrete example 65, an optical arrangement similar to that in Concrete example 64 is used. In this Concrete example 65, the light beam emitted from the light source device is set to a convergent light beam. Designed numeric values of the above-mentioned curvature radii, etc. are as follows. The meanings of characters $R_{1M}$, $R_{1S}$, etc. are Similar to those in the Concrete example 64

CONCRETE EXAMPLE 65

| | | | |
|---|---|---|---|
| $R_{1M} = \infty$ | $R_{1S} = 14.766$ | $d_2 = 2.755$ | $n = 1.51118$ |
| $R_{2M} = \infty$ | $R_{2S} = \infty$ | $d_3 = 21.477$ | |
| | | $d_0 = 57.776$ | |
| $R = -200$ | | $d_1 = -16.529$ | |
| $K = 4.0$ | | | |
| $R_{3m} = \infty$ | $R_{3S} = -6.667$ | $d_{2'} = -1.653$ | |
| $n' = 1.51118$ | | | |
| $R_{4m} = \infty$ | $R_{4S} = \infty$ | $d_{3'} = -10.705$ | |
| $S_0 = 38.517$ | $\theta = \pm 49.6$ | | |
| $\omega = -6.0$ | $Z_3 = -24.419$ | $Z_4 = -10.094$ | |

FIGS. 84a to 84c respectively show field curvature, scanning characteristics and the curve of a scanning line when this Concrete example 65 is ideally embodied. A curving amount of the scanning line is a Small value such as about 88 μm at its maximum to such an extent that no practical problems are caused.

When the Concrete example 65 is embodied and a position of the cylindrical lens 3 is shifted by −0.5 mm in the cross scan-corresponding direction by an error in optical arrangement, the scanning line is greatly curved as shown in FIG. 85a and a curving amount of the scanning line is equal to 122 μm at a maximum angle ±49.6° of deflection. A shifting amount $dh_1$ of this scanning line from the position of an ideal scanning line is equal to −0.058 mm.

When the image-forming reflecting mirror 6 is moved by +4.1 mm in a direction perpendicular to the deflecting scanning face, the curving amount of the scanning line is preferably corrected until 42 μm at its maximum as shown in FIG. 85b. At this time, the shifting amount $dh_1'$ is equal to +0.492 mm. This shifting amount is slightly large, but no problem is caused when an optical scanning operation is performed by a single optical scanner.

Figure 86:
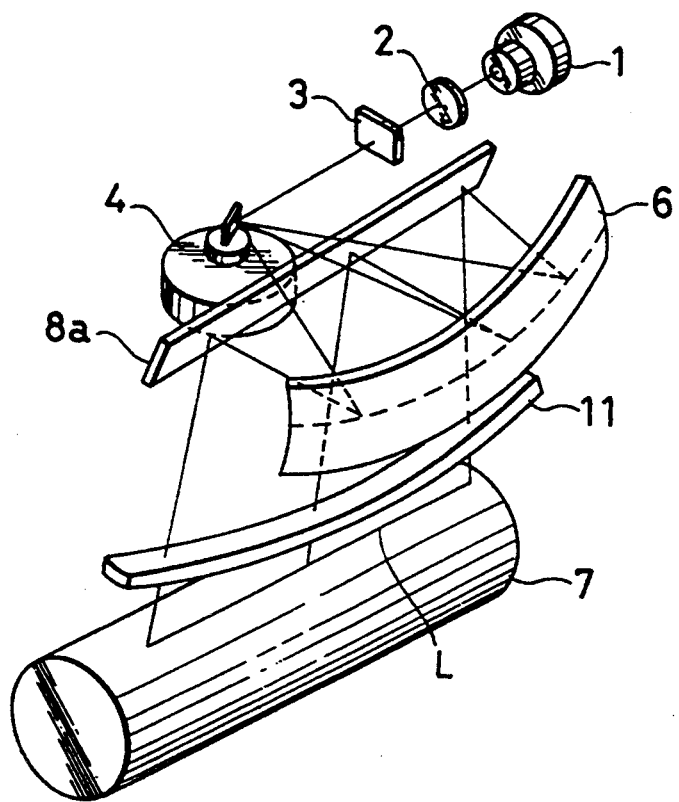
FIG. 86 is a view for explaining an optical scanner in Concrete example 66.

In Concrete example 66, similar to the above Concrete examples 64 and 65, a face of the image-forming reflecting mirror is constructed by a coaxial aspherical surface. An optical arrangement of the optical scanner in this Concrete example 66 is shown in FIG. 86. In the Concrete example 66 the optical path separating system shown in FIG. 78c is used. In FIG. 86, reference numeral 8a designates a beam splitter. In this optical path separating system, no scanning line is curved in principle.

In this Concrete example 66, the light beam emitted from the light source device is substantially a parallel light beam. A deflected light beam reflected on the image-forming reflecting mirror 6 is converged on the scanned face through an elongated toric lens 11 for correcting the inclination of a light reflecting face. The cylindrical lens 3 converges the light beam from the light source device only in the cross scan-corresponding direction. This light beam is focused and formed as a linear image extending in the main scan-corresponding direction in the vicinity of the deflecting reflecting face.

The image-forming reflecting mirror 6 and the elongated topic lens 11 set positions of the deflecting reflecting face and the scanned face in a conjugate relation in geometrical optics with respect to the cross scan-corresponding direction. The image-forming reflecting mirror 6 converges the deflected light beam onto the scanned face with respect to the main scan-corresponding direction.

An incident side face of the elongated topic lens 11 on a side of the image-forming reflecting mirror 6 is constructed by a barrel type topic face explained with reference to FIG. 78. A light emitting side face of the elongated topic lens 11 on a side of the scanned face is constructed by a normal topic face is similar to the above Concrete examples 64 and 65, $R_{3m}$ is set to a radius of curvature of the incident side face of the elongated topic lens 11 with respect to the main scan-corresponding direction. The main scan-corresponding direction is set to a longitudinal direction of the elongated toric lens 11. $R_{3S}$ is set to a radius of curvature of the incident side face of the elongated toric lens 11 with respect to the cross scan-corresponding direction. $R_{4m}$ is set to a radius of curvature of the light emitting side face of the elongated toric lens 11 with respect to the main scan-corresponding direction. $R_{4S}$ is set to a radius of curvature of the light emitting side face of the elongated toric lens 11 with respect to the cross scan-corresponding direction. $d_{2'}$ is set to a thickness of the toric lens 11. $n'$ is set to a refractive index of a material of the toric lens 11. $d_{3'}$ is set to a distance between the light emitting side face of the toric lens 11 and the scanned face.

CONCRETE EXAMPLE 66

| | | | |
|---|---|---|---|
| $R_{1M} = \infty$ | $R_{1S} = 21.277$ | $d_2 = 2.128$ | $n = 1.51118$ |
| $R_{2M} = \infty$ | $R_{2S} = \infty$ | $d_3 = 40.213$ | |
| | | $d_0 = 69.504$ | |
| $R = -200$ | | $d_1 = -78.014$ | |
| $K = -0.3$ | | | |
| $R_{3m} = 496.454$ | $R_{3S} = 18.085$ | $d_{2'} = -2.128$ | |
| $n' = 1.57210$ | | | |
| $R_{4m} = 496.454$ | $R_{4S} = 6.950$ | $d_{3'} = -19.858$ | |
| $S_0 = \infty$ (parallel light beam), | | $\theta = \pm 45.0$ | |
| $\omega = -6.0$ | $Z_3 = -24.419$ | $Z_4 = -10.094$ | |

FIGS. 87a and 87b respectively show field curvature and scanning characteristics when this Concrete example 66 is ideally embodied. As mentioned above, no scanning line is curved.

When the Concrete example 66 is embodied and a position of the cylindrical lens 3 is shifted by +0.3 mm in the cross scan-corresponding direction by an error in optical arrangement, the scanning line is curved as shown in FIG. 88a and a curving amount of the scanning line is equal to 40 μm at its maximum. The shifting amount $dh_1$ of this scanning line from the position of an ideal scanning line is equal to −0.046 mm.

When each of the image-forming reflecting mirror 6 and the elongated toric lens 11 is moved by +0.51 mm in a direction perpendicular to the deflecting scanning face, a curving amount of the scanning line is preferably corrected until 24 μm at its maximum as shown in FIG. 88b. At this time, the shifting amount $dh_1'$ is equal to +0.567 mm. In this case, the deflecting scanning face is bent by the beam splitter 8a. The deflecting scanning face is used even in such a bending case.

When the image-forming reflecting mirror 6 and the elongated toric lens 11 are respectively moved by +0.5 mm and +1.01 mm independently in the direction perpendicular to the deflecting scanning face, a curving amount of the scanning line is very preferably corrected until 1.8 μm at its maximum as shown in FIG. 88c. At this time, the shifting amount $dh_1'$ is equal to +1.053 mm.

In the following Concrete examples 67 to 70, a face of the imager forming reflecting mirror is constructed by a barrel type toric face explained with reference to FIG. 78. In each of the Concrete examples 67 to 69, a linear image formed by the cylindrical lens 3 is located in the vicinity of the deflecting reflecting face.

In an optical arrangement of the optical scanner in the Concrete example 67, the elongated toric lens is removed from the optical arrangement shown in FIG. 86. The light beam emitted from the light source device is set to a convergent light beam. The linear image formed by the cylindrical lens 3 is located in the vicinity of the deflecting reflecting face. The image-forming reflecting mirror 6 sets positions of the deflecting reflecting face and the scanned face in a conjugate relation in geometrical optics by an anamorphic barrel type toric face with respect to the cross scan-corresponding direction.

Similar to the Concrete example 66, optical paths of the light beam are separated from each other by using the beam splitter 8a. Accordingly, no scanning line is curved in a designed optical arrangement.

CONCRETE EXAMPLE 67

| | | | |
|---|---|---|---|
| $R_{1M} = \infty$ | $R_{1S} = 19.468$ | $d_2 = 3.632$ | n = 1.51118 |
| $R_{2M} = \infty$ | $R_{2S} = \infty$ | $d_3 = 32.228$ | |
| | | $d_0 = 60.385$ | |
| Rm = −200.0 | Rs = −66.830 | $d_1 = -74.077$ | |
| K = −0.4 | | | |
| $S_0 = 285.769$ | θ = ±50.0 | | |

FIGS. 89a and 89b respectively show field curvature and scanning characteristics when this Concrete example 67 is ideally embodied. As mentioned above, no scanning line is curved.

When the Concrete example 67 is embodied and a position of the cylindrical lens 3 is shifted by +0.4 mm in the cross scan-corresponding direction by an error in optical arrangement, the scanning line is greatly curved as shown in FIG. 90a and a curving amount of the scanning line is equal to 91 μm at its maximum. A shifting amount $dh_1$ of this scanning line from the position of an ideal scanning line is equal to −0.436 mm. This shifting amount is large.

When the image-forming reflecting mirror 6 is moved by +0.27 mm in a direction perpendicular to the deflecting scanning face, the curving amount of the scanning line is very preferably corrected until 3.5 μm at its maximum as shown in FIG. 90b. At this time, a shifting amount $dh_1'$ is equal to +0.162 mm so that the shifting amount is improved.

In Concrete example 68, a half mirror 5A is used as an optical path separating means as shown in FIG. 91. A light beam from a light source device is set to a parallel light beam. The half mirror 5A as the optical path separating means is constructed by a rectangular plane parallel plate extending in a direction perpendicular to a paper face and having a refractive index n'. A mirror layer 5M is formed on one side of the half mirror 5A along its longitudinal direction on the side of an optical deflector 4. The half mirror 5M is inclined an angle α with respect to a deflecting scanning face. An Optical axis of the image-forming reflecting mirror 6 is parallel to the deflecting scanning face and is shifted by a distance Δ from the deflecting scanning face. A deflected light beam is transmitted through the half mirror 5A and is reflected on the image-forming reflecting mirror 6. The reflected light beam is then transmitted through the half mirror 5A in an opposite direction and is reflected on the mirror layer 5M. This light beam is incident onto a scanned face as shown in FIG. 91. An entire optical arrangement of the optical scanner is similar to that shown in FIG. 75.

When optical distances $d_0$, $d_1'$, $d_2'$ and $d_3'$ are set as shown in FIG. 91, parameters such as curvature radii, etc. are provided as follows in the Concrete example 68.

CONCRETE EXAMPLE 68

| | | | |
|---|---|---|---|
| $R_{1M} = \infty$ | $R_{1S} = 15.614$ | $d_2 = 4.024$ | n = 1.51118 |
| $R_{2M} = \infty$ | $R_{2S} = \infty$ | $d_3 = 27.879$ | |
| | | $d_0 = 24.950$ | |
| | | $d_1' = 3.622$ | n' = 1.51118 |
| Rm = −200.0 | Rs = −74.849 | $d_2' = 32.193$ | |
| K = −0.93 | | $d_3' = 65.874$ | |
| $S_0 = \infty$ | θ = ±50.0 | Δ = +0.306 | α = 45.0 |

FIGS. 92a to 92c respectively show field curvature, scanning characteristics and the curve of a scanning line when this Concrete example 68 is ideally embodied. A curving amount of the scanning line is equal to 26 μm at its maximum.

When the Concrete example 68 is embodied and a position of the cylindrical lens 3 is shifted by +0.5 mm in the cross scan-corresponding direction by an error in optical arrangement, the scanning line is curved as shown in FIG. 93a and a curving amount of the scanning line is equal to 77 μm at its maximum. A shifting amount $dh_1$ of this scanning line from the position of an ideal scanning line is equal to −0.791 mm. This shifting amount is large.

When the image-forming reflecting mirror 6 is moved by +0.16 mm in a direction perpendicular to the deflecting scanning face, the curving amount of the scanning line is corrected until 40 μm as shown in FIG. 93b. At this time, a shifting amount $dh_1'$ is equal to +0.369 mm so that the shifting amount is improved.

In a modified embodiment shown in FIG. 94, a mirror layer 5m of a half mirror 5B is formed on a side of the image-forming reflecting mirror 6. Further, another half mirror can be used instead of the half mirror 5B.

In the following Concrete example 69, a prism 5C having a refractive index n' is used as an optical path separating means as shown in FIG. 95. An entire optical arrangement of the optical scanner is shown in FIG. 99.

A light beam emitted from a light source device is divergent. In FIG. 95, $\alpha$ (degree) is set to an inclination angle of an incident side face of the prism 5C from a direction perpendicular to a deflecting reflecting face. This angle a is set to be positive in the clockwise direction $\beta$ (degree) is set to an inclination angle of the optical axis of an image-forming reflecting mirror 6 with respect to the deflecting reflecting face. This angle $\beta$ is also set to be positive in the clockwise direction.

When optical distances $d_0$, $d_1'$, $d_2'$ and $d_3'$ are set as shown in FIG. 95, parameters such as curvature radii, etc. are provided as follows in the Concrete example 69.

CONCRETE EXAMPLE 69

| | | | |
|---|---|---|---|
| $R_{1M} = \infty$ | $R_{1S} = 12.605$ | $d_2 = 4.669$ | $n = 1.51118$ |
| $R_{2M} = \infty$ | $R_{2S} = \infty$ | $d_3 = 4.207$ | |
| | | $d_0 = 18.775$ | |
| | | $d_1' = 7.470$ | $n' = 1.51118$ |
| Rm = −200.0 | Rs = −104.575 | $d_2' = 35.481$ | |
| K = −1.75 | | $d_3' = -167.638$ | |
| $S_0 = -296.247$ | $\theta = \pm 45.0$ | | |
| $\alpha = +10$ | $\beta = -3.0$ | | |

FIGS. 97a to 97c respectively show field curvature, scanning characteristics and the curve of a scanning line when this Concrete example 69 is ideally embodied. A curving amount of the scanning line is equal to 63 $\mu$m at its maximum.

When the Concrete example 69 is embodied and the position of a cylindrical lens 3 is shifted by +0.3 mm in the cross scan-corresponding direction by an error in optical arrangement, the scanning line is greatly curved as shown in FIG. 98a and a curving amount of the scanning line is equal to 147 $\mu$m at its maximum. A shifting amount $dh_1$ of this scanning line from the position of an ideal scanning line is equal to −0.836 mm. This shifting amount is large.

When the image-forming reflecting mirror 6 is moved by +0.34 mm in a direction perpendicular to a deflecting scanning face, the curving amount of the scanning line is corrected until 70 $\mu$m as shown in FIG. 98b. At this time, a shifting amount $dh_1'$ is equal to +0.275 mm so that the shifting amount is improved.

In a modified embodiment shown in FIG. 98, a prism 5C is used by turning this prism upside down.

In a final Concrete example 70, a plane parallel plate 9 having a refractive index n is used as an optical path separating means as shown in FIG. 100. An entire optical arrangement of the optical scanner is shown in FIG. 103. A light beam emitted from alight source device is set to a divergent light beam. In FIG. 100, $\psi$ (degree) is set to an inclination angle of the plane parallel plate 9 with respect to a deflecting scanning face and is set to be positive in the clockwise direction. Further, $\Delta$ designates a distance (mm) of the optical axis of an image-forming reflecting mirror 6 from the deflecting scanning face. This optical axis is parallel to the deflecting scanning face.

When optical distances $d_0$, $d_1''$, $d_2'$ and $d_3'$ are set as shown in FIG. 100 and $d_1'$ is set to a thickness of the plane parallel plate 9, $d_1 = d_1'' \sin \psi$ is formed. Concrete parameters such as curvature radii, etc. are provided as follows in the Concrete example 70.

CONCRETE EXAMPLE 70

| | | | |
|---|---|---|---|
| $R_{1M} = \infty$ | $R_{1S} = 11.455$ | $d_2 = 4.575$ | $n = 1.51118$ |

-continued

| | | | |
|---|---|---|---|
| $R_{2M} = \infty$ | $R_{2S} = \infty$ | $d_3 = 41.171$ | |
| | | $d_0 = 18.397$ | |
| | | $d_1' = 13.724$ | $n' = 1.51118$ |
| Rm = −200.0 | Rs = −99.543 | $d_2' = 28.362$ | |
| K = −1.89 | | $d_3' = -121.017$ | |
| $S_0 = -267.465$ | $\theta = \pm 45.0$ | | |
| $\phi = 56.506$ | $\Delta = 0.549$ | | |

FIGS. 101a to 101c respectively show field curvature, scanning characteristics and the curve of a scanning line when this Concrete example 70 is ideally embodied. A curving amount of the scanning line is equal to 60 $\mu$m at its maximum. When the Concrete example 70 is embodied and the position of a cylindrical lens 3 is shifted by +0.3 mm in the cross scan-corresponding direction by an error in optical arrangement, the scanning line is greatly curved as shown in FIG. 102a and a curving amount of the scanning line is equal to 144 $\mu$m at its maximum. A shifting amount $dh_1$ of this scanning line from the position of an ideal scanning line is equal to −0.774 mm. This shifting amount is large. When the image-forming reflecting mirror 6 is moved by +0.36 mm in a direction perpendicular to the deflecting scanning face, the curving amount of the scanning line is corrected until 69 $\mu$m as shown in FIG. 102b. At this time, a shifting amount $dh_1'$ is equal to +0.375 mm so that the shifting amount is improved.

In each of the concrete examples, the distance $dh_1'$ between an ideal scanning line and the scanning line after the curve correction is improved in comparison with the distance between the ideal scanning line and the scanning line before the curve correction. When the distance $dh_1'$ is small, there is no problem when a writing operation is performed by using a single optical scanner. However, there is a case in which a clear color shift is caused by a shift in position of the scanning line in a two-color printer, etc. for performing the Writing operation by using two or more optical scanners.

In such a case, for example, the optical path bending mirror 5 shown in FIG. 76 b is arranged such that this optical path bending mirror can be rotated around an axis parallel to a longitudinal direction of this mirror. The above distance $dh_1'$ is corrected and set to zero by adjusting the inclination of a reflecting face of this optical path bending mirror 5.

In the above explanation, rotation and movement of the image-forming reflecting mirror are separately adjusted. The above distance $dh_1'$ can be more precisely corrected by both of such rotating and moving adjustments.

As mentioned above, in accordance with the above novel optical scanner of the present invention, the curve of a scanning line caused by errors in manufacture and assembly of each of optical elements constituting the optical scanner can be corrected easily and reliably to such an extent that no practical problems are caused.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner in which deflecting means has a deflecting reflecting face rotated at an equal speed;
    a light beam from a light source is deflected on a plane by the deflecting means at an equal angular velocity and is incident to a reflective image-forming element through a half mirror inclined with respect to a beam deflecting face; and the light beam reflected on said reflective image-forming element is reflected on said half mirror and is converged by an image-forming action of said reflective image-forming element as a light spot on a scanned face to perform an optical scanning operation;

said reflective image-forming element having a function for substantially performing the optical scanning operation using said light spot at an equal speed; and said reflective image-forming element being arranged such that the reflective image-forming element is shifted by a predetermined shifting amount in a direction perpendicular to said beam deflecting face to Correct the curve of a scanning line on the scanned face.

2. An optical scanner in which deflecting means has a deflecting reflecting face rotated at an equal speed;

a light beam from a light source is deflected on a plane by the deflecting means at an equal angular velocity and is incident to a reflective image-forming element through a half mirror inclined with respect to a beam deflecting face; and the light beam reflected on said reflective image-forming element is reflected on said half mirror and is converged by an image-forming action of said reflective image-forming element as a light spot on a scanned face to perform an optical scanning operation;

said reflective image-forming element having a function for substantially performing the optical scanning operation using said light spot at an equal speed; and said reflective image-forming element being arranged such that an optical axis of the reflective image-forming element is inclined a predetermined tilt angle with respect to said beam deflecting face to correct the curve of a scanning line on the scanned face.

3. An optical scanner in which deflecting means has a deflecting reflecting face rotated at an equal speed;

a light beam from a light source is deflected on a plane by the deflecting means at an equal angular velocity and is incident to a reflective image-forming element through a half mirror inclined with respect to a beam deflecting face; and the light beam reflected on said reflective image-forming element is reflected on said half mirror and is converged by an image-forming action of said reflective image-forming element as a light spot on a scanned face to perform an optical scanning operation;

said reflective image-forming element having a function for substantially performing the optical scanning operation using said light spot at an equal speed; and said half mirror having a semi-transparent mirror face on a side of the deflecting means.

4. An optical scanner as claimed in claim 3, wherein the reflective image-forming element is arranged such that the reflective image-forming element is shifted by a predetermined shifting amount in a direction perpendicular to the beam deflecting face to correct the curve of a scanning line on the scanned face.

5. An optical scanner as claimed in claim 3, wherein the reflective image-forming element is arranged such that an optical axis of the reflective image-forming element is inclined a predetermined tilt angle with respect to the beam deflecting face to correct the curve of a scanning line on the scanned face.

6. An optical scanner as claimed in claim 5, wherein the reflective image-forming element is arranged such that the optical axis of the reflective image-forming element is inclined the predetermined tilt angle with respect to the beam deflecting face, and the reflective image-forming element is shifted by a predetermined shifting amount in a direction perpendicular to the beam deflecting face to correct the curve of the scanning line on the scanned face.

7. An optical scanner as claimed in any one of claims 3 to 6, wherein the deflecting reflecting face of the deflecting means is parallel to a rotational axis thereof;

the reflective image-forming element sets positions of the deflecting reflecting face of the deflecting means and the scanned face in a conjugate relation in geometrical optics in a cross scan-corresponding direction; and the light beam from the light source is focused and formed as a linear image extending in a main scan-corresponding direction in the vicinity of said deflecting reflecting face in the cross scan-corresponding direction.

8. An optical scanner in which deflecting means has a deflecting reflecting face rotated at an equal speed;

a light beam from a light source is deflected on a plane by the deflecting means at an equal angular velocity and is reflected on an anamorphic reflective image-forming element; and the reflected light beam is converged by an image-forming action of said reflective image-forming element as a light spot on a scanned face to perform an optical scanning operation;

said reflective image-forming element having a function for substantially performing the optical scanning operation using said light spot at an equal speed;

a transparent plane parallel plate being arranged between the deflecting means and the reflective image-forming element such that the plane parallel plate is inclined a finite inclination angle with respect to a rotational axis of said deflecting means;

the plane parallel plate separating an optical path from the deflecting means to the reflective image-forming element from an optical path from the reflective image-forming element to a scanned face; and a material, a thickness and the inclination angle of said plane parallel plate being determined such that the curve of a scanning line is corrected.

9. An optical scanner as claimed in claim 8, wherein the deflected light beam incident to the reflective image-forming element and the light beam reflected on the reflective image-forming element are transmitted through the plane parallel plate.

10. An optical scanner as claimed in claim 8, wherein only the deflected light beam incident to the reflective image-forming element is transmitted through the plane parallel plate with respect to the deflected light beam incident to the reflective image-forming element and the light beam reflected on the reflective image-forming element.

11. An optical scanner as claimed in claim 8, 9 or 10, wherein the inclination angle of the plane parallel plate is determined such that an incident angle of the deflected light beam incident to the plane parallel plate is set to approximately satisfy a Brewster angle.

12. An optical scanner as claimed in claim 9, wherein a reflecting film is formed in a face portion of the plane parallel plate on a side of the deflecting means such that only the light beam reflected on the reflective image-forming element and transmitted through the plane parallel plate is selectively reflected on said reflecting film.

13. An optical scanner as claimed in claim 10, wherein a reflecting film is formed in a face portion of the plane parallel plate on a side of the reflective image-forming element such that only the light beam reflected on the reflective image-forming element is selectively reflected on said reflecting film.

14. An optical scanner as claimed in any one of claims 8 to 10, 12 and 13, wherein the deflecting reflecting face of the deflecting means is parallel to the rotational axis thereof;
   the light beam from the light source is focused and formed as a linear image extending in a main scan-corresponding direction in the vicinity of said deflecting reflecting face; and
   the reflective image-forming element approximately sets positions of said deflecting reflecting face and the scanned face in a conjugate relation in geometrical optics with respect to a cross scan-corresponding direction.

15. An optical scanner in which a light beam from a light source is deflected on a plane by deflecting means at an equal angular velocity and is reflected on a reflective image-forming element, and the reflected light beam is converged by an image-forming action of said reflective image-forming element as a light spot on a scanned face to perform an optical scanning operation;
   said reflective image-forming element having a function for substantially performing the optical scanning operation using said light spot at an equal speed;
   an elongated prism having a wedge shape in cross section and arranged in parallel with a main scan-corresponding direction between the deflecting means and the reflective image-forming element; and
   the elongated prism separating an optical path from the deflecting means to the reflective image-forming element from an optical path from the reflective image-forming element to the scanned face.

16. An optical scanner as claimed in claim 15, wherein said reflective image-forming element is arranged such that the reflective image-forming element is shifted by a predetermined shifting amount in a direction perpendicular to a beam deflecting face to correct the curve of a scanning line on the scanned face.

17. An optical scanner as claimed in claim 15, wherein said reflective image-forming element is arranged such that an optical axis of the reflective image-forming element is inclined a predetermined tilt angle with respect to a beam deflecting face to correct the curve of a scanning line on the scanned face.

18. An optical scanner as claimed in claim 16, wherein a reflecting face of the reflective image-forming element is constructed by a coaxial spherical or aspherical surface.

19. An optical scanner as claimed in any one of claims 15 to 17, wherein the deflecting means has a deflecting reflecting face parallel to a rotational axis thereof;
   the reflective image-forming element is anamorphic and sets positions of the deflecting reflecting face of the deflecting means and the scanned face in a conjugate relation in geometrical optics in a cross scan-corresponding direction; and
   the light beam from the light source is focused and formed as a linear image extending in the main scan-corresponding direction in the vicinity of said deflecting reflecting face in the cross scan-corresponding direction.

20. An optical scanner in which deflecting means has a deflecting reflecting face rotated at an equal speed;
   a light beam from a light source is deflected on a plane by the deflecting means at an equal angular velocity and is reflected on an anamorphic reflective image-forming element; and
   the reflected light beam is converged by an image-forming action of said reflective image-forming element as a light spot on a scanned face to perform an optical scanning operation;
   said reflective image-forming element having a function for substantially performing the optical scanning operation using said light spot at an equal speed;
   a transparent plane parallel plate being arranged between the deflecting means and the reflective image-forming element such that the plane parallel plate is inclined a finite inclination angle with respect to a rotational axis of said deflecting means;
   the plane parallel plate separating an optical path from the deflecting means to the reflective image-forming element from an optical path from the reflective image-forming element to a scanned face;
   said reflective image-forming element being inclined a predetermined tilt angle with respect to a beam deflecting face; and
   a material, a thickness and the inclination angle of said plane parallel plate and the tilt angle of the reflective image-forming element with respect to the beam deflecting face being determined such that the curve of a scanning line is corrected.

21. An optical scanner as claimed in claim 20, wherein the deflected light beam incident to the reflective image-forming element and the light beam reflected on the reflective image-forming element are transmitted through the plane parallel plate.

22. An optical scanner as claimed in claim 20, wherein only the deflected light beam incident to the reflective image-forming element is transmitted through the plane parallel plate with respect to the deflected light beam incident to the reflective image-forming element and the light beam reflected on the reflective image-forming element.

23. An optical scanner as claimed in claim 20, 21 or 22, wherein the inclination angle of the plane parallel plate is determined such that an incident angle of the deflected light beam incident to the plane parallel plate is set to approximately satisfy a Brewster angle.

24. An optical scanner as claimed in claim 21, wherein a reflecting film is formed in a face portion of the plane parallel plate on a side of the deflecting means such that only the light beam reflected on the reflective image-forming element and transmitted through the plane parallel plate is selectively reflected on said reflecting film.

25. An optical scanner as claimed in claim 22, wherein a reflecting film is formed in a face portion of the plane parallel plate on a side of the reflective image-forming element such that only the light beam reflected on the reflective image-forming element is selectively reflected on said reflecting film.

26. An optical scanner as claimed in any one of claims 20 to 22, 24 and 25, wherein the deflecting reflecting face of the deflecting means is parallel to the rotational axis thereof;

the light beam from the light source is focused and formed as a linear image extending in a main scan-corresponding direction in the vicinity of said deflecting reflecting face; and the reflective image-forming element approximately sets positions of said deflecting reflecting face and the scanned face in a conjugate relation in geometrical optics with respect to a cross scan-corresponding direction.

27. An optical scanner in which a light beam from a light source is deflected by deflecting means having a deflecting reflecting face rotated at an equal speed and is reflected on an anamorphic reflective image-forming element; and the reflected light beam is converged by an image-forming action of said reflective image-forming element as a light spot on a scanned face to perform an optical scanning operation;

said reflective image-forming element having a function for substantially performing the optical scanning operation using said light spot at an equal speed;

a transparent plane parallel plate being arranged between the deflecting means and the reflective image-forming element such that the plane parallel plate is inclined a finite inclination angle with respect to a rotational axis of said deflecting means;

the light beam incident to the deflecting reflecting face of said deflecting means being set such that this light beam is slantingly incident to a beam deflecting face;

the plane parallel plate separating an optical path from the deflecting means to the reflective image-forming element from an optical path from the reflective image-forming element to the scanned face;

said reflective image-forming element being arranged such-that an optical axis of the reflective image-forming element is inclined a predetermined tilt angle with respect to said beam deflecting face; and a material, a thickness and the inclination angle of said plane parallel plate and the tilt angle of said reflective image-forming element being determined such that the curve of a scanning line is corrected.

28. An optical scanner in which a light beam from a light source is deflected by deflecting means having a deflecting reflecting face rotated at an equal speed and is reflected on an anamorphic reflective image-forming element; and the reflected light beam is converged by an image-forming action of said reflective image-forming element as a light spot on a scanned face to perform an optical scanning operation;

said reflective image-forming element having a function for substantially performing the optical scanning operation using said light spot at an equal speed;

a transparent plane parallel plate being arranged between the deflecting means and the reflective image-forming element such that the plane parallel plate is inclined a finite inclination angle with respect to a rotational axis of said deflecting means;

the light beam incident to the deflecting reflecting face of said deflecting means being set such that this light beam is slantingly incident to a beam deflecting face;

the plane parallel plate separating an optical path from the deflecting means to the reflective image-forming element from an optical path from the reflective image-forming element to the scanned face; and a material, a thickness and the inclination angle of said plane parallel plate and a shifting amount of the deflected light beam with respect to said reflective image-forming element being determined such that the curve of a scanning line is corrected.

29. An optical scanner as claimed in claim 28, wherein said reflective image-forming element is arranged such that an optical axis of the reflective image-forming element is inclined a predetermined tilt angle with respect to the beam deflecting face; and the material, the thickness and the inclination angle of said plane parallel plate, the light beam shifting amount and the tilt angle of the reflective image-forming element are determined such that the curve of the scanning line is corrected.

30. An optical scanner as claimed in claim 28 or 29, wherein the deflected light beam incident to the reflective image-forming element and the light beam reflected on the reflective image-forming element are transmitted through the plane parallel plate.

31. An optical scanner as claimed in claim 28 or
wherein only the deflected light beam incident to the reflective image-forming element is transmitted through the plane parallel plate with respect to the deflected light beam incident to the reflective image-forming element and the light beam reflected on the reflective image-forming element.

32. An optical scanner as claimed in claim 28 or 29, wherein the inclination angle of the plane parallel plate is determined such that an incident angle of the deflected light beam incident to the plane parallel plate is set to approximately satisfy a Brewster angle.

33. An optical scanner as claimed in claim 30, wherein a reflecting film is formed in a face portion of the plane parallel plate on a side of the deflecting means such that only the light beam reflected on the reflective image-forming element and transmitted through the plane parallel plate is selectively reflected on said reflecting film.

34. An optical scanner as claimed in claim 30, wherein a reflecting film is formed in a face portion of the plane parallel plate on a side of the reflective image-forming element such that only the light beam reflected on the reflective image-forming element is selectively reflected on said reflecting film.

35. An optical scanner as claimed in claim 28 or 29, wherein the deflecting reflecting face of the deflecting means is parallel to the rotational axis thereof;

the light beam from the light source is focused and formed as a linear image extending in a main scan-corresponding direction in the vicinity of said deflecting reflecting face; and the reflective image-forming element approximately sets positions of said deflecting reflecting face and the scanned face in a conjugate relation in geometrical optics with respect to a cross scan-corresponding direction.

36. An optical scanner comprising:
a light source device for emitting a light beam for performing an optical scanning operation;
a linear image-forming optical system for focusing and forming the light beam from the light source device as a linear image extending in a main scan-corresponding direction;
an optical deflector for reflecting the light beam from this linear image-forming optical system on a deflecting reflecting face and deflecting the light beam at an equal angular velocity;
a light spot image-forming optical system for guiding the deflected light beam onto a scanned face and converging the deflected light beam as a light spot on the scanned face; and
an adjusting mechanism for adjusting a posture of this light spot image-forming optical system;
said light spot image-forming optical system having an image-forming reflecting mirror which has a function for converging the deflected light beam onto the scanned face in at least the main scan-corresponding direction and performing the optical scanning operation at an equal speed; and
said adjusting mechanism adjusting rotation of said image-forming reflecting mirror around an axis parallel to a deflecting scanning face and perpendicular to an optical axis.

37. An optical scanner as claimed in claim 36, wherein the image-forming reflecting mirror has an aspherical reflecting mirror face.

38. An optical scanner as claimed in claim 3, wherein a position of the linear image-forming optical system is set such that the linear image extending in the main scan-corresponding direction is formed in the vicinity of the deflecting reflecting face of the optical deflector; and
the light spot image-forming optical system approximately sets positions of the deflecting reflecting face and the scanned face in a conjugate relation in geometrical optics with respect to a cross scan-corresponding direction.

39. An optical scanner as claimed in claim 36, wherein the light spot image-forming optical system has a reflecting mirror rotatable around an axis parallel to the main scan-corresponding direction.

40. An optical scanner as claimed in claim 37, wherein the image-forming reflecting mirror is constructed by a reflecting mirror which is coaxial and aspherical.

41. An optical scanner as claimed in claim 36, wherein the light beam incident to the deflecting reflecting face of the optical deflector is a divergent light beam in the main scan-corresponding direction.

42. An optical scanner as claimed in claim 37, wherein the light source device is constructed by a semiconductor laser.

43. An optical scanner as claimed in claim 36, wherein the light beam incident to the deflecting reflecting face of the optical deflector is a convergent light beam in the main scan-corresponding direction.

44. An optical scanner as claimed in claim 38, wherein the image-forming reflecting mirror is constructed by an an anamorphic concave mirror having different image-forming functions in the main scan-corresponding direction and the cross scan-corresponding direction.

45. An optical scanner as claimed in claim 44, wherein the light spot image-forming optical system has an optical element for separating optical paths from each other and arranged between the optical deflector and the image-forming reflecting mirror;
the separating optical element separates the light beam deflected by the optical deflector from the light beam reflected on the image-forming reflecting mirror; and
the separating optical element is constructed by a half mirror of a glass plate partially having a mirror face formed by evaporation.

46. An optical scanner as claimed in claim 44, wherein the light spot image-forming optical system has an optical element for separating optical paths from each other and arranged between the optical deflector and the image-forming reflecting mirror;
the separating optical element separates the light beam deflected by the optical deflector from the light beam reflected on the image-forming reflecting mirror; and
the separating optical element is constructed by a prism.

47. An optical scanner as claimed in claim 38, wherein the optical deflector is constructed by a rotary polygon mirror, a pyramidal mirror or a rotary unifacial mirror.

48. An optical scanner as claimed in claim 44, wherein the light spot image-forming optical system has an optical element for separating optical paths from each other and arranged between the optical deflector and the image-forming reflecting mirror;
the separating optical element separates the light beam deflected by the optical deflector from the light beam reflected on the image-forming reflecting mirror; and
the separating optical element is constructed by a transparent plane parallel plate slantingly arranged with respect to the deflecting scanning face.

49. An optical scanner as claimed in claim 36, wherein the light beam incident to the deflecting reflecting face of the optical deflector is approximately parallel to the main scan-corresponding direction.

50. An optical scanner comprising:
a light source device for emitting a light beam for performing an optical scanning operation;
a linear image-forming optical system for focusing and forming the light beam from the light source device as a linear image extending in a main scan-corresponding direction;
an optical deflector for reflecting the light beam from this linear image-forming optical system on a deflecting reflecting face and deflecting the light beam at an equal angular velocity;
a light spot image-forming optical system for guiding the deflected light beam onto a scanned face and converging the deflected light beam as a light spot on the scanned face; and
an adjusting mechanism for adjusting a posture of this light spot image-forming optical system;
said light spot image-forming optical system having an image-forming reflecting mirror which has a function for converging the deflected light beam onto the scanned face in at least the main scan-corresponding direction and performing the optical scanning operation at an equal speed;

said adjusting mechanism adjusting rotation of said image-forming reflecting mirror around an axis parallel to a deflecting scanning face and perpendicular to an optical axis; and said adjusting mechanism adjusting movement of said image-forming reflecting mirror in a direction perpendicular to the deflecting scanning face.

51. An optical scanner comprising:

a light source device for emitting a light beam for performing an optical scanning operation;

a linear image-forming optical system for focusing and forming the light beam from the light source device as a linear image extending in a main scan-corresponding direction;

an optical deflector for reflecting the light beam from this linear image-forming optical system on a deflecting reflecting face and deflecting the light beam at an equal angular velocity;

a light spot image-forming optical system for guiding the deflected light beam onto a scanned face and converging the deflected light beam as a light spot on the scanned face; and an adjusting mechanism for adjusting a posture of this light spot image-forming optical system;

said light spot image-forming optical system having an image-forming reflecting mirror which has a function for converging the deflected light beam onto the scanned face in at least the main scan-corresponding direction and performing the optical scanning operation at an equal speed; and said adjusting mechanism adjusting movement of said image-forming reflecting mirror in a direction perpendicular to a deflecting scanning face.

52. An optical scanner as claimed in claim 51, wherein the optical scanner further comprises an inclination correcting optical element for correcting an inclination of the deflecting reflecting face of the optical deflector; and the adjusting mechanism adjusts movement of this inclination correcting optical element in the same direction as the image-forming reflecting mirror.

53. An optical scanner as claimed in claim 52, wherein the adjusting mechanism can adjust the movement of the inclination correcting optical element independently of the image-forming reflecting mirror.

* * * * *

UNITED STATES PATENT AND TRADEMARK OFFICE
CERTIFICATE OF CORRECTION

PATENT NO. : 5,426,298
DATED : June 20, 1995
INVENTOR(S) : Nobuo Sakuma et al.

It is certified that error appears in the above-indentified patent and that said Letters Patent is hereby corrected as shown below:

Column 64,
In Claim 31, line 1, please change "in Claim 28 or" to —in Claim 28 or 29—.

Column 65,
In Claim 38, line 1, please change "in Claim 3" to —in Claim 37—.

Signed and Sealed this

Twenty-first Day of November, 1995

Attest:

BRUCE LEHMAN

Attesting Officer    Commissioner of Patents and Trademarks